(12) United States Patent
Sun et al.

(10) Patent No.: US 11,786,065 B2
(45) Date of Patent: Oct. 17, 2023

(54) FOOD PROCESSOR

(71) Applicant: GUANGDONG MIDEA CONSUMER ELECTRIC MANUFACTURING CO., LTD., Foshan (CN)

(72) Inventors: Yi Sun, Foshan (CN); Ruoyu Mei, Foshan (CN); Yuansheng Deng, Foshan (CN); Yonggang Zhang, Foshan (CN); Bofeng He, Foshan (CN); Xiaokai Liu, Foshan (CN); Ya Zhou, Foshan (CN); Shanshan Cao, Foshan (CN)

( * ) Notice: Subject to any disclaimer, the term of this patent is extended or adjusted under 35 U.S.C. 154(b) by 529 days.

(21) Appl. No.: 16/967,415

(22) PCT Filed: Aug. 24, 2018

(86) PCT No.: PCT/CN2018/102328
§ 371 (c)(1),
(2) Date: Aug. 5, 2020

(87) PCT Pub. No.: WO2019/153713
PCT Pub. Date: Aug. 15, 2019

(65) Prior Publication Data
US 2021/0212498 A1 Jul. 15, 2021

(30) Foreign Application Priority Data

Feb. 6, 2018 (CN) .......................... 201810118965.9
Feb. 6, 2018 (CN) ........................ 201810119036.X
(Continued)

(51) Int. Cl.
*A47J 19/02* (2006.01)
*B30B 9/12* (2006.01)
(52) U.S. Cl.
CPC .............. *A47J 19/025* (2013.01); *B30B 9/12* (2013.01)

(58) Field of Classification Search
CPC ........ A47J 19/025; A47J 19/027; A47J 19/02; A47J 19/06; A47J 43/042; A47J 43/046;
(Continued)

(56) References Cited

U.S. PATENT DOCUMENTS 5,613,430 A 3/1997 Lee
2014/0053741 A1* 2/2014 Chou ....................... A23N 1/02
99/513
(Continued)

FOREIGN PATENT DOCUMENTS

CN 2868100 Y 2/2007
CN 2904869 Y 5/2007
(Continued)

OTHER PUBLICATIONS

WO 2013159665 (Year: 2013).*
(Continued)

*Primary Examiner* — Tu B Hoang
*Assistant Examiner* — Vy T Nguyen
(74) *Attorney, Agent, or Firm* — KILPATRICK TOWNSEND & STOCKTON, LLP

(57) ABSTRACT

Embodiment provides a food processor, comprising: a base assembly; a food processing cup mounted on the base assembly, and including a cup body and a working screw rotatably mounted in the cup body, the cup body can be used to store food juice, and a first slag outlet is provided on the cup body; a feeding assembly is sealed and mounted on the cup mouth end of the cup body; a slag receiving device is hermetically connected to the first slag outlet for collecting food waste; a sealed cavity formed between the cup body, the feeding assembly, and the slag receiving device to conduct them to each other; and an extraction assembly can communicate with the sealed cavity and is used for extracting air in the sealed cavity.

8 Claims, 34 Drawing Sheets

(30) Foreign Application Priority Data

| Feb. 6, 2018 | (CN) | 201810119037.4 |
| Feb. 6, 2018 | (CN) | 201810119388.5 |
| Feb. 6, 2018 | (CN) | 201810119389.X |
| Feb. 6, 2018 | (CN) | 201810119391.7 |
| Feb. 6, 2018 | (CN) | 201820206536.2 |
| Feb. 6, 2018 | (CN) | 201820207013.X |
| Feb. 6, 2018 | (CN) | 201820207014.4 |
| Feb. 6, 2018 | (CN) | 201820207649.4 |
| Feb. 6, 2018 | (CN) | 201820207650.7 |
| May 9, 2018 | (CN) | 201810438278.5 |
| May 9, 2018 | (CN) | 201810438371.6 |
| May 9, 2018 | (CN) | 201810439192.4 |
| May 9, 2018 | (CN) | 201820685982.6 |
| May 9, 2018 | (CN) | 201820685998.7 |
| May 9, 2018 | (CN) | 201820686836.5 |
| Jun. 2, 2018 | (CN) | 201820207651.1 |

(58) Field of Classification Search
CPC .. A23N 1/02; A23N 1/00; B30B 9/128; B30B 9/12; B30B 9/121; B30B 9/14
USPC ......... 99/510, 512, 495, 501, 502, 509, 513, 99/511; 100/117, 115, 131; 241/152, 241/186, 188, 246, 258, 79, 24, 260, 282, 241/82; 366/133, 186, 157, 194, 249, 366/266, 318
See application file for complete search history.

(56) References Cited

U.S. PATENT DOCUMENTS

| 2016/0113429 A1* | 4/2016 | Kim | A47J 19/025 |
| | | | 99/513 |
| 2019/0008307 A1* | 1/2019 | Kim | A47J 19/025 |

FOREIGN PATENT DOCUMENTS

| CN | 201230809 Y | 5/2009 |
| CN | 201260596 Y | 6/2009 |
| CN | 201530138 U | 7/2010 |
| CN | 202312788 U | 7/2012 |
| CN | 102613873 A | 8/2012 |
| CN | 202537099 U | 11/2012 |
| CN | 202653867 U | 1/2013 |
| CN | 202760966 U | 3/2013 |
| CN | 103110333 A | 5/2013 |
| CN | 103110333 B | 5/2013 |
| CN | 203074248 U | 7/2013 |
| CN | 103393339 A | 11/2013 |
| CN | 103767046 A | 5/2014 |
| CN | 203676816 U | 7/2014 |
| CN | 203693241 U | 7/2014 |
| CN | 103976630 A | 8/2014 |
| CN | 103976632 A | 8/2014 |
| CN | 204015918 U | 12/2014 |
| CN | 104274057 A | 1/2015 |
| CN | 104367169 A | 2/2015 |
| CN | 204260499 U | 4/2015 |
| CN | 204274098 U | 4/2015 |
| CN | 204336595 U | 5/2015 |
| CN | 104825045 A | 8/2015 |
| CN | 204635938 U | 9/2015 |
| CN | 204683294 U | 10/2015 |
| CN | 204698307 U | 10/2015 |
| CN | 204839065 U | 12/2015 |
| CN | 205162705 U | 4/2016 |
| CN | 205162707 U | 4/2016 |
| CN | 205234236 U | 5/2016 |
| CN | 205306700 U | 6/2016 |
| CN | 205338553 U | 6/2016 |
| CN | 105902131 A | 8/2016 |
| CN | 205457985 U | 8/2016 |
| CN | 105962750 A | 9/2016 |
| CN | 205568612 U | 9/2016 |
| CN | 205866572 U | 1/2017 |
| CN | 205866577 U | 1/2017 |
| CN | 205903152 U | 1/2017 |
| CN | 205923686 U | 2/2017 |
| CN | 206102351 U | 4/2017 |
| CN | 106667227 A | 5/2017 |
| CN | 106955009 A | 7/2017 |
| CN | 206354850 U | 7/2017 |
| CN | 206354851 U | 7/2017 |
| CN | 206371817 U | 8/2017 |
| CN | 206423953 U | 8/2017 |
| CN | 206423954 U | 8/2017 |
| CN | 107115002 A | 9/2017 |
| CN | 107212771 A | 9/2017 |
| CN | 107213962 A | 9/2017 |
| CN | 206491640 U | 9/2017 |
| CN | 206499388 U | 9/2017 |
| CN | 107296474 A | 10/2017 |
| CN | 206565833 U | 10/2017 |
| CN | 107319904 A | 11/2017 |
| CN | 107374302 A | 11/2017 |
| CN | 206612693 U | 11/2017 |
| CN | 107440465 A | 12/2017 |
| CN | 206761314 U | 12/2017 |
| CN | 107569081 A | 1/2018 |
| CN | 208371479 U | 1/2019 |
| CN | 208905521 U | 5/2019 |
| DE | 4428014 A1 | 2/1996 |
| EP | 0078259 B1 | 9/1986 |
| EP | 2497393 A1 | 9/2012 |
| JP | S61132917 U | 8/1986 |
| JP | 2016087266 A | 5/2016 |
| JP | 2017520379 A | 7/2017 |
| JP | 2017524387 A | 8/2017 |
| KR | 1020000066499 A | 11/2000 |
| KR | 1020130117977 A | 10/2013 |
| KR | 1020170074820 A | 6/2017 |
| WO | 2010115306 A1 | 10/2010 |
| WO | 2013143430 A1 | 10/2013 |
| WO | WO-2013159665 A1 * | 10/2013 ............... A23N 1/00 |
| WO | 2014054301 A1 | 4/2014 |
| WO | 2018006607 A1 | 1/2018 |

OTHER PUBLICATIONS

Rejection decision of CN Application No. 201810119037.4.
Second OA of CN Application No. 201810438371.6.
Supplementary Search of CN Application No. 201810438371.6.
First OA of JP Application No. 2020-542233.
First OA of KR Application No. 10-2020-7022569.
The third OA of CN application No. 201810119037.4.
Supplementary search of 201810438278.5.
International Search Report of PCT/CN2018/102328.
Second Office Action of KR Application 10-2020-7022569 dated Mar. 25, 2022.
OA2 of CN Application No. 201810119037.4.
Second Search of CN Application No. 201810119037.4.
OA2 of CN Application No. 201810119388.5.
Second Search of CN Application No. 201810119388.5.
OA2 of CN Application No. 201810438278.5.
Second Search of CN Application No. 201810438278.5.
Notification of Reexamination dated Feb. 8, 2023 of CN Application No. 201810438278.5.

* cited by examiner outlet of suction pump

FOOD PROCESSOR

CROSS-REFERENCES TO RELATED APPLICATIONS

The present disclosure is a national phase application of International Application No. PCT/CN2018/102328, filed on Aug. 24, 2018, which claims the priority of Chinese Application No. 201810119388.5, 201820207649.4, 201810118965.9, 201820207651.1, 201810119389.X, 201820207014.4, 201810119037.4, 201820207013.X, 201810119036.X, 201820206536.2, 201810119391.7, 201820207650.7, filed in the Chinese Patent Office on Feb. 6, 2018, and priority of Chinese Application No. 201820685998.7, 201810438371.6, 201810438278.5, 201820685982.6, 201810439192.4 and 201820686836.5, filed in the Chinese Patent Office on May 9, 2018, the entireties of which are herein incorporated by reference.

FIELD

The present disclosure relates to the field of household appliances, and more particularly, to a food processor.

BACKGROUND

At present, although the original juice machine or slow juicer products take measures to reduce the pressing of fruits and vegetables, and the oxidation problem after squeezing, the effect of squeezing under normal pressure is not significant.

Therefore, how to design a juice machine that can significantly reduce the pressing of fruits and vegetables, and the oxidation problem after squeezing has become an urgent problem to be solved.

SUMMARY

The present disclosure aims to solve at least one of the problems existing in the prior art.

For this reason, an object of the present disclosure is to provide a food processor.

To achieve the above object, an embodiment of the first aspect of the present disclosure provides a food processor, including a base assembly; a food processing cup can be mounted on the base assembly, and including a cup body and a working screw rotatably mounted in the cup body, the cup body can be used to store food juice, and a first slag outlet is provided on the cup body or a second slag outlet is provided in the cup body; a feeding assembly sealed and mounted on the cup mouth end of the cup body; a slag receiving device hermetically connected to the first slag outlet for collecting food waste, or the slag receiving device is located in the cup body and connected to the second slag outlet for collecting food waste; a sealed cavity formed between the cup body, the feeding assembly, and the slag receiving device to conduct them to each other; and an extraction assembly can communicate with the sealed cavity and is used for extracting air in the sealed cavity.

The food processor provided according to the embodiment of the present disclosure includes the base assembly, the food processing cup, the feeding assembly, the slag receiving device, and the extraction assembly. In one embodiment, the base assembly is used to supply power to the entire product, control the work of the entire product, and support and install the food processing cup, the feeding assembly, and the slag receiving device. The food processing cup is used for pulverizing food materials and separating the juice from the slag of the food materials through the cooperation of the cup body and the working screw. The feeding assembly is used to feed the food materials, that is, to put the food materials into the food processing cup, and the extraction assembly is used to extract air from the sealed cavity formed by the entire feeding assembly, the extraction assembly, and the slag receiving device to achieve the purpose of vacuuming. In this setting, the extraction assembly can be started first to extract the air in the product so that the cup body can be roughly formed into a vacuum state. After that, the working screw can be started to process the food materials, so that the processing of the food materials can be realized in a roughly vacuum state, and the oxidation of the processed food can be relieved to prevent the loss of nutrients in the food and ensure the color and taste of the food juice. At the same time, in this application, the structure of the cup body can be set reasonably, so that the cup body can be used to collect food juice, so that there is no need to set an additional juice receiving structure, which can simplify the structure of the cup body and reduce the costs of the product. In addition, this kind of setting is in the whole process of the food processing of the product, and the food juice can be stored in the cup first, that is, the food juice does not need to be drained while squeezing, so that during the entire food processing process, there is no need to open the juice outlet as in the prior art, so that outside air cannot enter the cup body through the juice outlet during the entire food processing process, improving the sealing performance in the cup body, so that the internal vacuum of the cup body can always be maintained. In addition, compared with the scheme of an additional hermetically mounted juice cup on the cup body, this setup can use the ready-made cup body to collect food juice, thus improving the use of the cup body, it can also simplify the structure of the product and reduce the processing costs of the product. At the same time, the cup body is used to collect food juice, the oxygen content in the sealed cavity is low after the pressing is completed, which can better ensure the freshness of the food juice, only when the user needs to drink the food juice to be exported, which can ensure that the drinker can drink the freshest food juice. By setting the slag receiving device, the slag receiving device can be installed integrally with the food processing cup or the slag receiving device 4 can be directly set in the cup body 22, so that there is no need to open the slag outlet, that is, the slag outlet can always be sealed during the slag discharge process of the product. In the prior art, because slag receiving parts are additionally provided outside the product, the slag outlet is always open during the entire juice extraction process, so the oxygen of the product can always enter the sealed cavity through the slag outlet, causing oxidation of the food juice. In this application, by setting the slag receiving device that is hermetically mounted with the first slag outlet or by directly setting the slag receiving device in the cup body, it is not necessary to seal the slag outlet when the product is working, and the collection of food slag can also be realized, that is, the application can keep the slag outlet always sealed during the working process of the product, so that outside air cannot enter the sealed cavity during the working process of the product, the pressing process of the food materials can be realized under the vacuum state, and the food juice can be collected under the vacuum state, therefore, the oxidation of food juice can be significantly slowed down, and the taste of the squeezed food can be ensured.

In one embodiment, the cross-sectional area of the working screw is increased from one end of the working screw near the cup mouth of the cup body 22 to the other end of the working screw, and may be gradually increased, so that the gap between the cup body and the working screw gradually decreases from the opening of the cup body to the bottom of the food processing cup, so that the pressing force on food materials can be increased in order to be able to squeeze the food materials more and more broken, so that can improve juice extraction rate.

In one embodiment the slag receiving device is used to collect food slag after the juice is separated from slag of food materials. The slag receiving device can be installed inside the cup body or outside the cup body. By setting the slag receiving device in the cup body, the slag receiving device can be hidden and installed in the cup body, so that it will not be installed outside the cup body prominently, thus improving the aesthetics of the product, in addition, the slag receiving device is installed in the cup body, it only takes up a part of the space, and other spaces in the cup body can be used reasonably, so the space utilization rate can be improved. In addition, the slag receiving device is installed in the cup body, which can save the connection structure between the slag receiving device and the cup body, so that the structure of the cup body and the slag receiving device can be made simpler. In addition, by installing the slag receiving device in the cup body, there is no need to provide an additional slag outlet on the cup body, so that the sealing performance of the food processor can be improved and significantly alleviate the oxidation problems of food materials during and after juice extraction when the food processor is set as a vacuum food processor. Of course, in other embodiments, a first body slag outlet may also be set on the cup body, and the slag receiving device is installed outside the cup body, and communicates with the inside of the cup body through the first slag outlet.

In one embodiment, the base assembly comprises: a driving device connected to the working screw and is used to drive the working screw to rotate; a control device connected to the driving device and the extraction assembly; and is used to control the extraction assembly to perform air extraction or control the work of the driving device, and/or controlling the extraction assembly to perform air extraction, and after the extraction assembly performed air extraction, control the driving device to start working.

In some embodiments, the working screw can be driven by the driving device to crush and squeeze food materials, and the control device is used to control the driving device and the extraction assembly. Specifically, the control device can individually control the driving device or the extraction assembly to work alone, or it can first control the extraction assembly to work for a period of time in order to complete the pumping operation first, and then start the driving device to work, for food processing. And the method of food processing after pumping down can separate the juice from slag of the food materials after the pumping is completed, in this way, all the food materials are processed in a vacuum state, so all food materials are not easily oxidized, which can significantly reduce food oxidation. Conversely, if the food materials are processed before the gas is pumped, because some air remains in the cup body, the food materials that are processed first are easily oxidized by the residual air, which will cause some food materials to be oxidized, which cannot significantly reduce the oxidation of food juice and so on.

In some embodiments, the food processor further includes a reservation device connected to the control device for enabling the control device to control the driving device and the extraction assembly after a preset time.

In some embodiments, a reservation device can be set on the product, so that the reservation function of the product can be implemented through the reservation device, reducing the user's waiting time, specifically, for example, the reservation device includes a collection device for collecting a user's reservation parameter and a timing device is used for timing according to the reservation parameter, and after the timing is completed, the control device starts to work.

In some embodiments, the cup body is provided with a juice outlet, the juice outlet is sealed and covered with a juice cover, and the juice cover is used to open or close the juice outlet; and a first seal is further provided between the juice outlet and the juice cover, and the first seal is used for hermetically connecting the juice cover and the juice outlet.

In some embodiments, one juice outlet can be set on the cup body and a first seal and the juice cover provided on the juice outlet, and the first seal and the juice cover are used to seal the juice outlet during the work process of the product. After the food processing is completed, when the user wants to use the food juice, the juice outlet can be opened through the juice cover so that the food juice can be accessed through the juice outlet, after the user takes out the required food juice, the juice outlet can be closed through the juice cover to store the remaining food juice in the cup body in a sealed manner, reducing the oxidation of the remaining food juice.

Of course, in other embodiments, the juice outlet may not be provided, and after the food processing is finished, the food juice is directly poured out through the cup mouth of the cup body.

In some embodiments, the cup body is provided with a juice outlet, and the juice outlet is provided with a valve for controlling the opening or closing of the juice outlet.

In some embodiments, one valve can also be set at the juice outlet, so that the juice outlet can be opened and closed through the valve. Specifically, for example, a faucet-like valve can be set at the juice outlet, so that the juice outlet can be opened and stopped like a faucet, so that obtaining food juice is faster and more convenient.

In some embodiments, the feeding assembly comprises: a feeding barrel, one end of the feeding barrel is hermetically mounted to the cup mouth end of the cup body; a feeding cover sealed and covered on the other end of the feeding barrel and used to open or close the feeding barrel; and an auxiliary feeding device can be mounted in the feeding barrel for auxiliary feeding, for example, the auxiliary feeding device can be rotatably installed in the feeding barrel.

In some embodiments, the feeding barrel is used for feeding, and the feeding cover is used to seal the opening of the feeding barrel, and, a third seal may be provided between the feeding barrel and the feeding cover, so that the sealing between the feeding barrel and the feeding cover can be achieved through the third seal. One rotating auxiliary feeding device is provided in the feeding barrel, so that the auxiliary feeding can be realized through the rotation of the auxiliary feeding device, to control the feeding speed and prevent food from being blocked. Specifically, for example, operations such as pre-cutting food materials or pushing food materials stored in the feeding barrel into the cup body can be achieved by using the auxiliary feeding device.

In some embodiments, the food processor further comprising: a cover body covered and mounted outside the feeding barrel, one end of the cover body is open, and the other end of the cover body is closed, the open end of the cover body is mounted on the cup body; a fourth seal provided at the connection between the cover body and the cup body, and making the connection between the cover body and the cup body a sealed connection; and a supporting structure provided on an outer side wall of the cup body, and the open end of the cover body is hermetically mounted on the supporting structure.

In some embodiments, the cover body covers outside the feeding barrel and hermetically mounted to the cup body, so that the feeding barrel can be hermetically covered in the cover body, when the entire product is sealed for vacuum extraction, as long as the cover body and the cup body are hermetically connected, the cup body and the cover body can form a tightly sealed closed space, so that there is no need to seal the opening at the upper end of the feeding barrel when vacuuming juice, and when the feeding barrel and the cup body are separate structures, there is no need to seal the connection between the feeding barrel and the cup body, this reduces the number of places that need to be sealed and improve the sealing effect, so that the effect of vacuum juice extraction can be significantly improved, and the oxidation of food juice can be more significantly slowed down to ensure the taste of the squeezed food. In addition, this kind of structure only has an additional cover body on the traditional food processor, so that the traditional form of the food processor can be retained to reduce manufacturing difficulty and improve product production efficiency, and remove the cover body when vacuum juice extraction is not needed, its structure and use method are basically the same as those of the traditional juice machine, so that the food processor can perform vacuum juice extraction and ordinary juice extraction.

At the same time, a supporting structure can be provided on the side wall of the cup body, so that the cover body can cover part of the cup body, and can be hermetically mounted on the supporting structure on the side wall of the cup body. In this kind of setting the cover body is hermetically mounted to the supporting structure, so that the end face of the upper part of the cup body can be reserved for mounting the feeding barrel, so that the feeding barrel and the cover body can be fixedly installed on different parts of the cup body respectively, it can prevent the feeding barrel and the cover body from interfering, so that the overall structure and layout of the product can be more reasonable and compact.

In some embodiments, a gap is provided between a top wall of the cover body and an end surface of one end of the feeding barrel away from the cup body; and/or a gap is provided between a side wall of the cover body and a side wall of the feeding barrel.

In some embodiments, a gap is provided between a top wall of the cover body and an end surface of one end of the feeding barrel away from the cup body; and/or a gap is provided between a side wall of the cover body and a side wall of the feeding barrel, so that the top and side walls of the cover body can be prevented from directly contacting the feeding barrel, the displacement of the feeding barrel due to unbalanced force during pressing cannot be easily transmitted to the cover body, not to affect the overall sealing of the cover body to the product, enabling the cover body to always be reliably sealed with the cup body.

In some embodiments, the outer wall surface of the cup body includes a plurality of first planes disposed along an axial direction of the cup body, and a plurality of the first planes are spaced from each other along the circumferential direction of the cup body; and two adjacent first planes are connected by the first curved surface.

In some embodiments, the outer wall surface of the cup body includes a plurality of first planes arranged along the axial direction of the cup body, so that the cup body can be roughly formed into a polygon, which can make the cup body closer to a square, and two adjacent first planes are connected by the first curved surface, which can make the side wall of the cup body more smoothly connected. The cup body is closer to a square, compared to the traditional round or conical cup, the square cup body can make the positioning between the cover body and the feeding barrel more easily and convenient, and the circular or conical is symmetrical structure, so that the positioning direction of the cup cannot be quickly identified during installation, the user needs to distinguish carefully to find the positioning direction, and the square cup can refer to the length and width, the positioning direction can be found faster and easier when positioning, which can make the positioning between the cup body, the feeding barrel and the cover body easier and more intuitive, making the product more convenient to use.

In some embodiments, the top wall of the cover body is arc-shaped; and/or rounded corners are provided on the edge of the outer surface of the top wall of the cover body; and/or the side wall of the cover body comprises four of second curved surfaces pairwise arranged opposite to each other and evenly distributed along the circumferential direction of the cover body, and the four of the second curved surfaces are provided at intervals from each other and two adjacent second curved surfaces are connected by a third curved surface.

In some embodiments, the top wall of the cover body can be flat or curved, and an arc design, according to one embodiment, because this setting can effectively prevent the cover body from being deformed due to internal negative pressure, specifically, for example, the outer wall can resist compression and the inner wall can resist stretching, so that the deformation of the cover body can be reduced and the force applied by the vacuum negative pressure to the cover body can be reduced when the product is working. Similarly, the side wall of the cover body can also be set as an arc shape, for example, the four curved surfaces of the front, back, left, and right sides of the cover body can be set as second curved surfaces, and set four of third curved faces on the four corners of front, back, left and right, which can improve the pressure resistance of the cover body's sidewall and increase the strength of the cover body's sidewall. A rounded corner is provided on the edge of the outer surface of the top wall of the cover body, which can make the structure of the cover body smoother, further improving the overall strength of the cover body.

In some embodiments, the top wall of the cover body is a plane, and the side wall of the cover body includes a plurality of second planes spaced apart along the circumferential direction of the cover body, and two adjacent second planes are connected by a fourth curved surface, and the fourth curved surface is a circular-arc surface with the center of the top wall of the cover body as a circle center.

In some embodiments, the top of the cover body can also be set as a plane, so that when the cover body is set as transparent, light can be incident and reflected in parallel, avoiding the user from deforming and distorting images when watching through the cover body, which can ensure the user's viewing experience. Similarly, several side walls of the cover body can also be roughly set as planes to ensure that the sample light can enter and reflect from the side walls in parallel, avoiding the user from deforming and distorting images when watching through the cover body. By setting the arc surface can make the smooth connection between the side walls of the cover body, which can make the structure of the cover body smoother, the arc surface on the side wall is a circular arc centered on the center of the top wall of the cover body, which can further ensure that the image is not deformed when the internal juice extraction process is viewed through the top of the cover body. At this time, the side wall of the cover body can be set as an arc-shaped or arc-like structure, so that the structure of the cover body can be made smoother, and the strength and anti-deformation ability of the cover body can also be improved.

In some embodiments, the wall thickness of the cover body at each position is equal; and/or the cover body is a transparent cover; and/or the wall thickness of the cover body is greater than or equal to 2 mm and less than or equal to 4 mm; and/or the cover body is an axisymmetric structure; and/or the end surface of the open end of the cover body is camber or arc-shaped.

In some embodiments, the wall thickness of the cover body at each position is equal, so that the cover body's force capacity is consistent everywhere, so that the force can be uniform, and the situation of weak parts of the force can be prevented, at the same time, the equal wall thickness of the cover body at various locations also makes the structure of the cover body simpler, so that the cover body can process better. The cover body can be a transparent cover body, specifically, for example, the cover body can be processed by using transparent materials such as transparent polycarbonate and Plexiglass, so that when the product is working, the user can watch the inside situation of the cover body through the cover body, can enhance the user experience. The wall thickness of the cover body is greater than or equal to 2 mm and less than or equal to 4 mm, so that the thickness of the cover body is not too thick or too thin. The cover body is an axisymmetric structure, which can further simplify the structure of the cover body, and thus further increase the strength of the cover body. The end surface of the open end of the cover body is camber or arc-shaped, which makes the end surface of the open end of the cover body smooth, so that when the end surface of the cover body is sealed, the cover body and the first seal are bonded better to ensure the sealing effect and prevent the cover body from piercing the seal.

In some embodiments, the auxiliary feeding device is drivingly connected to the working screw and can be rotated under the action of the working screw.

In some embodiments, the auxiliary feeding device can be drivingly connected to the working screw, so that the auxiliary feeding device can be driven by the working screw, so that an additional mechanism for driving the auxiliary feeding device is not required, so can simplify the structure of the product and reduce the costs of the product. Of course, the auxiliary feeding device cannot be connected to the working screw, at this time, an additional driving member can be provided to realize the driving of the auxiliary feeding device.

In some embodiments, a mounting plate and a feeding inlet are provided in the feeding barrel, the mounting plate is mounted to the inner side wall of the feeding barrel, a first mounting hole is provided on the mounting plate, and one end of the auxiliary feeding device is located on a side of the mounting plate away from the cup body, the working screw is located on a side of the mounting plate near the cup body, and the other end of the auxiliary feeding device is inserted into the first mounting hole and drivingly connected to the working screw, and the feeding inlet is provided on the mounting plate or the feeding inlet is surrounded by the mounting plate and a side wall of the feeding barrel.

In some embodiments, a mounting plate can be provided in the feeding barrel, so that the supporting installation of the auxiliary feeding device can be achieved through the mounting plate, on the other hand, a portion of the food materials can be stored through the mounting plate. In addition, the mounting plate can be used to cut food materials together with the auxiliary feeding device so that the food materials can be processed into small pieces in advance. Specifically, for example, during the rotation process, the auxiliary feeding device can drive the food materials to move together, and when the processed food materials are large, the food materials will be partially stuck in the feeding inlet, but the auxiliary feeding device will continue to rotate, so the food materials can be squeezed between the auxiliary feeding device and the edge of the feeding inlet, so that a pressing force can be applied to the food materials, so that the food materials can be squeezed into small pieces to achieve the initial processing of food materials. In addition, a cutting edge can be provided on the auxiliary feeding device so that food materials can be cut by the cutting edge, and the feeding inlet can be directly set on the mounting plate, or it can be enclosed by the side walls of the mounting plate and the feeding barrel.

In some embodiments, the auxiliary feeding device comprises a first auxiliary feeding device, and the first auxiliary feeding device comprises: a first dial can be rotatably mounted on a side of the mounting plate away from the cup body; and a first drive shaft, one end of the first drive shaft is drivingly connected to the working screw, and the other end of the first drive shaft is inserted into and passed through the first mounting hole to be drivingly connected to the first dial.

In some embodiments, a first dial, such as a rotatable dial sheet, a dial lever, can be provided above the mounting plate, and drivingly connected to the working screw through the first drive shaft, so that when the working screw rotating, the first dial can be driven to rotate, so that the food materials placed in the feeding barrel can be moved from the feeding inlet into the cup body by the movement of the first dial, and when the processed food materials are larger, the food materials will be partially stuck in the feeding inlet, but the first dial will continue to rotate, therefore, the food materials can be squeezed between the edge of the first dial and the feeding inlet, so that a pressing force can be applied to the food materials, so that the food materials can be squeezed into small pieces to achieve the preliminary processing of the food materials. In addition, a cutting edge can be set on the first dial so that the cutting of the food materials can be achieved by the cutting edge. In this way, by setting the first dial, processing such as cutting and dialing of food materials can be realized, increasing the feeding speed of food materials, preventing the feeding barrel from being blocked, and improving the processing efficiency of food materials.

In some embodiments, the first dial is provided with a first through hole, and one end of the first drive shaft away from the working screw is sequentially inserted into and passed through the first mounting hole and the first through hole, and the first auxiliary feeding device further includes: a sealing cover mounted on one end of the first drive shaft protruding from the first through hole.

In some embodiments, the first dial can be installed through the first through hole on the end of the first drive shaft protruding from the first mounting hole and passed through the first dial, to improve the installation reliability between first dial and the first drive shaft. By setting the sealing cover, the upper end of the first drive shaft can be limited to the upper side of the first dial, so that the first drive shaft can be prevented from slipping out of the first through hole, which can further improve the connection reliability between the first dial and the first drive shafts.

In some embodiments, at least one driving protrusion is provided on the first drive shaft, and the driving protrusion can cooperate with the working screw to rotate under the driving of the working screw.

In some embodiments, one or more of the first drive protrusions can be provided on the lower end surface of the first drive shaft, so that through the first drive protrusion match with the side of the upper end of the working screw to achieve the drive connection between the working screws. Of course, the first drive shaft can also be drivingly connected to the working screw through other structures.

In some embodiments, the first dial and the first drive shaft are separate structures, or the first dial and the first drive shaft are an integrated structure.

In some embodiments, the first dial and the first drive shaft are separate structures, such as two parts, which facilitates separate maintenance and replacement of each part of the first dial and the first drive shaft separately. In some embodiments, the first dial and the first drive shaft can also be an integrated structure, so that the connection strength of the first dial and the first drive shaft can be improved, so that the first dial and the first drive shaft are not easily damaged, and the seamless connection between the first dial and the first drive shaft can be achieved, so that a gap can be prevented from being formed between the first dial and the first drive shaft, which is convenient for cleaning.

In one embodiment, the first dial is mounted symmetrically on the first drive shaft. This arrangement can make the structure of the product more reasonable and compact, and can also make the structure of the product simpler.

In some embodiments, the feeding inlet is surrounded by the mounting plate and the side wall of the feeding barrel, and the number of the feeding inlets is two, two of the feeding inlets and the mounting plate are all about the axis of the feeding barrel is symmetric.

In some embodiments, the feeding inlet may be surrounded by the mounting plate and the side wall of the feeding barrel, which can simplify the structure of the mounting plate and reduce costs. The number of the feeding inlets is optionally two, which can make each feeding inlet larger, which is convenient for the product to process some large pieces of food materials. Two of the feeding inlets and the mounting plate are symmetrical about the axis of the feeding barrel, so that the mounting portion can be mounted just to the center of the working screw, and the interior of the feeding barrel can be made more reasonable and compact.

In one embodiment the mounting plate is composed of a circular plate and two fan-shaped plates symmetrically disposed on both sides of the circular plate, and the first mounting hole is disposed in the middle of the circular plate.

In some embodiments, the feeding barrel is straight.

In some embodiments, the feeding barrel is optionally straight, that is, the feeding barrel is not bent, so that food materials can flow smoothly from top to bottom. Of course, the feeding barrel can also be bent, and, the inner wall and outer wall of the feeding barrel are both arranged vertically.

In some embodiments, the first dial is a dial lever or a dial sheet.

In some embodiments, the shape of the first dial can be arbitrarily set, it can be a dial lever or a dial sheet.

In some embodiments, the first drive shaft is provided with one of a first positioning groove and a first positioning protrusion, the working screw is provided with the other one of the first positioning groove and the first positioning protrusion, and the first positioning protrusion can be inserted into the first positioning groove to position the working screw; and the first wear part is provided in the first positioning groove.

In some embodiments, a first positioning protrusion or a first positioning groove or positioning hole may be provided on the upper end surface of the working screw, and a first positioning protrusion or a first positioning groove or positioning hole may be correspondingly provided on the lower end surface of the first drive shaft, so that the positioning of the working screw can be achieved through the cooperation of the first positioning protrusion and the positioning hole or the first positioning protrusion and the positioning shaft, improving the stability of the working screw after installation and reducing the shaking of the working screw. By setting the first wear part in the first positioning groove, the wear between the first positioning protrusion and the first positioning groove can be reduced.

In some embodiments, a hollow pillar with openings at both ends is provided on a side of the mounting plate near the cup body, and the hollow pillar communicates with the feeding inlet; one end of the working screw extends from the bottom of the feeding barrel into the hollow pillar and can cooperate with the side wall of the hollow pillar to crush food materials, and one end of the hollow pillar away from the mounting plate is connected to the side wall of the feeding barrel, or one end of the hollow pillar away from the mounting plate is suspended.

In some embodiments, one hollow pillar that can communicate with the feeding inlet can be set under the mounting plate, and the hollow pillar can be sleeved and installed on the upper end of the working screw, so that after the food materials enter the lower part of the mounting plate from the feeding inlet, it can be extruded or cut under the effect of the side wall of the hollow pillar and the working screw, that is, before food materials enter the cup body, the food materials go through an additional crushing process, which can improve the processing effect of the product on food materials and increase the juice extraction rate. By setting the hollow pillar, the effective inner diameter of the lower end of the feeding barrel can be reduced, and the channel formed between the working screw and the side wall of the lower end of the feeding barrel can be made smaller, so the processing power of food materials can be increased. In one embodiment, the end of the hollow pillar away from the mounting plate may be connected to the side wall of the feeding barrel, so that the hollow pillar can further support the mounting plate, improving the strength of the mounting plate, in another embodiment, the end of the hollow pillar away from the mounting plate can also be suspended, that is, it is not connected to the side wall of the feeding barrel.

In one embodiment, the hollow pillar is tapered. The upper end of the screw and other structures will increase in order from top to bottom; therefore, the hollow pillar is set as tapered so that the hollow pillar can be adapted to the upper end of the working screw, so that the working screw can better cooperate with the hollow pillar to achieve the processing of food materials.

In some embodiments, the mounting plate can be detachably mounted to an inner side wall of the feeding barrel, or the mounting plate and the inner side wall of the feeding barrel are an integrated structure.

In some embodiments, the mounting plate can be detachably installed in the feeding barrel, so that the storage table can be detached for cleaning the cup body and the storage table, and at the same time, this setting can install the mounting plate and the dial as a whole for installation, maintenance and sales. Of course, the mounting plate and the inner wall of the feeding barrel is also an integrated structure, that is, the mounting plate can also be directly processed on the feed, which can enhance the connection strength of the mounting plate and the feeding barrel.

In some embodiments, the feeding barrel can be detachably sealed and mounted to the cup mouth end of the cup body, or the feeding barrel and the cup body are an integrated structure.

In some embodiments, the feeding barrel and the cup body are an integrated structure, so that the feeding and processing of food materials can be achieved through a large cup, this kind of setting does not require an additional feeding barrel or a structure similar to the feeding barrel on the cup body which can simplify the number of parts of the product, in addition, this structure has only one cup body, therefore, there is only one opening of the cup body, therefore, when sealing the cup, it is only necessary to seal the opening of the cup body, in the prior art, the connection between the cup body and the feeding barrel and the opening of the cup body need to be sealed, so at least two places need to be sealed, therefore, compared with the prior art, this structure can also reduce the difficulty of sealing the product. At the same time, in the prior art, there is a possibility of leakage which is located at the connection between the cup body and the feeding barrel and at the opening of the cup body, and because the use of the feeding barrel is removed in this application, the entire position of the side wall of the cup body may be strictly sealed, so that the sealing performance of the product is relatively enhanced, so that the product can more effectively alleviate oxidation when the vacuum juice extraction is realized. The feeding barrel and the cup body can be detachably connected, so that the food materials can be crushed and the slag and juice of the food materials can be separated through the cup body, at the same time, the feeding barrel can be used to add food materials to the cup body, this enables the feeding and processing of food materials to be divided into two cup bodies, which can reduce the height of each cup body, so that the product can be better processed and cleaned.

In some embodiments, the working screw is provided with a first transmission structure, and the auxiliary feeding device includes a second auxiliary feeding device, and the second auxiliary feeding device includes: a storage table mounted in the feeding barrel, and the feeding table is provided with a feeding channel; and a second dial rotatably mounted in the feeding barrel, and located on a side of the storage table away from the working screw, the second dial is provided with a second transmission structure, and the second transmission structure can cooperate with the first transmission structure to drivingly connect the working screw with the second dial.

In some embodiments, the storage table is installed in the feeding barrel for storing food materials, and the second dial can be rotatably installed in the feeding barrel and above the storage table, and when the second dial is rotating, the food materials stored on the storage table can be processed by extruding, cutting, etc., and can be pushed into the feeding channel after processing such as extruding, cutting, so that the food materials can enter the cup body, in this way, manual feeding can be avoided, so when the product is actually used, the user can put all the food materials into the feeding barrel through the mouth of the feeding barrel at one time and store it on the storage table, after that, the food materials can be automatically and gradually fed under the action of the second dial. By setting the first transmission structure on the second dial and setting the second transmission structure on the working screw, the cooperation between the first transmission structure and the second transmission structure can be used to make the second dial drivingly connected to the working screw and rotating under the driving of the working screw, this driving method can realize the driving of the second dial through the working screw, so that there is no need to provide an additional mechanism for driving the second dial, can simplify the structure of the product to reduce product costs. On the other hand, in this driving method, the working screw and the second dial are directly driven and connected through two transmission structures, so that the transmission can be made more stable, on the other hand, without using any other connection shaft and other structures, it can further simplify product structure and reduce product costs.

In some embodiments, the cup body and the feeding barrel are an integrated structure, or the cup body and the feeding barrel are separate structures, when the cup body and the feeding barrel are an integrated structure, the storage table can be detachably mounted in the feeding barrel, when the cup body and the feeding barrel are separate structures, the storage table can be detachably mounted in the feeding barrel, or the storage table and the feeding barrel are an integrated structure.

In some embodiments, the feeding barrel and the cup body are an integrated structure, so that the feeding and processing of food materials can be achieved through a large cup, this kind of setting does not require additionally set a structure similar to the feeding barrel on the cup body which can simplify the number of parts of the product, in addition, this structure has only one cup body, therefore, there is only one opening of the cup body, therefore, when sealing the cup, it is only necessary to seal the opening of the cup body, in the prior art, the connection between the cup body and the feeding barrel and the opening of the cup body need to be sealed, so at least two places need to be sealed, therefore, compared with the prior art, this structure can also reduce the difficulty of sealing the product. At the same time, in the prior art, there is a possibility of leakage which is located at the connection between the cup body and the feeding barrel and at the opening of the cup body, and because the use of the feeding barrel is removed in this application, the entire position of the side wall of the cup body may be strictly sealed, so that the sealing performance of the product is relatively enhanced, so that the product can more effectively alleviate oxidation when the vacuum juice extraction is realized. The feeding barrel and the cup body can be detachably connected, so that the food materials can be crushed and the slag and juice of the food materials can be separated through the cup body, at the same time, the feeding barrel can be used to add food materials to the cup body, this enables the feeding and processing of food materials to be divided into two cup bodies, which can reduce the height of each cup body, so that the product can be better processed and cleaned.

Meanwhile, when the feeding barrel and the cup body are set as a large cup, the storage table can be detachably installed in the feeding barrel, so that the storage table can be detached for cleaning the cup body and the storage table. When the feeding barrel and the cup body are set as two cups, the storage table can be detachably installed in the feeding barrel, or the storage table can be integrally installed in the feeding barrel.

In some embodiments, the storage table is provided with a second mounting hole, the first transmission structure is one of a transmission hole and a second drive shaft, and the second transmission structure is the other one of the transmission hole and the second drive shaft, the second drive shaft can be inserted into the transmission hole through the second mounting hole, so that the working screw is drivingly connected to the second dial.

In some embodiments, a second mounting hole may be provided on the storage table, so that the working screw and the dial can be connected to each other through the second mounting hole, and the first transmission structure may be one transmission hole or a second drive shaft, that is, either one transmission hole or a second drive shaft can be provided on the dial, and the working screw can be provided with a second drive shaft or one transmission hole, so that the cooperation of the transmission hole and the second drive shaft can realize the direct driving of the dial by the working screw, so that the dial can be driven to rotate above the storage table in the feeding barrel, cutting, squeezing or pushing of food materials can be realized, so automatic feeding can be achieved.

In some embodiments, a first mounting groove is provided on a side of the storage table near the working screw and around the second mounting hole, and the food processor further includes: a second wear part mounted in the first mounting groove and sleeved on the second drive shaft, and located between contact surface of the working screw and the storage table.

In some embodiments, one circle of the first mounting groove can be set around the second mounting hole on the lower surface of the storage table, so that the positioning and installation of the second wear part can be achieved through the first mounting groove, and the second wear part is arranged between the storage table and the upper end surface of the working screw, which can reduce the mutual wear between the working screw and the storage table, improving the service life of the working screw and the storage table.

In some embodiments, the transmission hole is a polygonal hole, and the second drive shaft is a polygonal shaft adapted to the polygonal hole; and/or the first transmission structure is the second drive shaft, and the second transmission structure is the transmission hole.

In some embodiments, the transmission hole is a polygonal hole, and the second drive shaft is a polygonal shaft adapted to the polygonal hole, in this way, the driving between the working screw and the dial can be achieved through a non-circular surface, enabling increasing the contact area between the transmission hole and the second drive shaft to increase the driving force, improving the transmission efficiency and ensuring the reliability of the transmission. And a second drive shaft is provided on the working screw, and one transmission hole is correspondingly provided on the dial, so that the working screw can better cooperate with the dial.

In some embodiments, the auxiliary feeding device comprises a third auxiliary feeding device, and the third auxiliary feeding device comprises: a storage base mounted in the feeding barrel and located at a side of the working screw away from the bottom of the cup body, the storage base is provided with a storage cavity, and the storage cavity has an opening at the end away from the working screw, and the storage base is provided with at least one of the feeding hole, and the feeding hole is in communication with the storage cavity and the cup body; and a third dial can be rotatably mounted in the storage cavity, and rotated at an angle greater than or equal to 30°, and the storage base is used to store food materials, the third dial is used to cut and/or squeeze food materials in the storage cavity, and push food materials stored in the storage cavity into the feeding hole.

In some embodiments, the third auxiliary feeding device includes a storage base located above the working screw, and a third dial rotatably installed in the storage base. The storage base is also provided with a feeding hole, so in actual use, food materials can be directly placed into the storage base to actually use the storage base to store food materials, and the third dial can be rotatably installed in the storage base, and the storage base is also provided with a feeding hole communicating with the storage cavity, so that the rotation of the third dial can push the food materials stored on the storage base to rotate, and during the rotation of food materials, preliminary cutting and/or extrusion processing of the food materials is achieved by friction and squeezing between food materials and food materials, or by friction and squeezing between food materials and the side wall of the feeding barrel, or by friction and squeezing between food materials and the third dial, so that the smaller food materials after preliminary cutting and/or extrusion processing can fall from the feeding hole to the lower part of the storage base under the action of the third dial, and the larger food materials will be stuck at the feeding hole, at this time, the third dial does not stop rotating, that is, the third dial will continue to rotate, so that the third dial can form a pinching force on the food materials between the side wall of the feeding hole, and then it can apply a squeezing or cutting force to food materials stuck in the feeding hole, which can squeeze or cut food materials into smaller pieces, through continuous rotation of the third dial, after squeezing or cutting food materials into a size block in turn, food materials pass through the feeding hole and enter the cup body in turn, and the food materials entering the cup body can be crushed or cut under the dual action of the working screw and the side wall of the cup body, then the separation of the juice from slag of food materials can be achieved through the filter or the double cup body double screw. In the third auxiliary feeding device, when the juice is actually squeezed, the user can put all the food materials into the storage base at one time and store them in the storage base, after that, the food materials can be automatically and gradually fed under the action of the third dial, so that the user does not need to gradually feed in the actual juice extraction, so one-time feeding can be achieved, and in the actual process, all the food materials can be put into the storage base first, then control the product through the reservation assembly and so on to make it temporarily inoperative, but can start to work after a fixed period of time, so that the advance reservation processing of food materials can be realized, which can reduce the user's waiting time and improve the user experience, that is, this structure provides the possibility for the product to realize the reserved juice extraction, so that a reservation assembly can be set on the food processor to realize the reservation function. At the same time, this kind of setting can realize automatic feeding under the action of the third dial after one-time feeding, so there is no need to use a push rod or the like to implement manual push, so that the user's operation amount can be reduced, make the juice extraction function of the product more convenient and simple, so that it can improve the user experience, and eliminate the structure of the push rod, to avoid a series of problems with the use of the push rod, such as the placement of the push rod and the use of potential safety hazards of the rod. In addition, this kind of setting can cut or squeeze the food materials in advance through the third dial when the food materials fall into the cup body through the feeding hole, so that the food materials entering the cup body are small, so the difficulty of the working screw can be reduced, the wear of the working screw can be reduced, the processing effect of food materials can be improved, and the juice extraction rate can be improved. In addition, this setting can also effectively prevent the working screw from being stuck and prevent the slag outlet from being blocked. In addition, the storage cavity is set in the storage base, so that the third auxiliary feeding device itself has the function of containing food materials, therefore, when the food materials are put in, the third auxiliary feeding device can be moved to the position of the food materials, and it is not necessary to move the food materials to the product for feeding, thus making the operation of placing food materials more convenient and faster. In addition, in this kind of setting when the food materials are cut and/or squeezed, the side walls of the storage cavity can be directly used to block and squeeze the food materials, so there is no need to rely on the side walls of the feeding barrel, so the part of the storage base corresponding to the side wall of the feeding barrel will not directly contact to the food materials, so the processing requirements of the side wall of the feeding barrel can be reduced to reduce product costs, and to ensure that the feeding barrel is clean, reduce the difficulty of cleaning the feeding barrel. There is also a setting of the storage cavity in the storage base, compared with the scheme of setting the storage base as a stock plate; it can also prevent food materials from getting stuck between the stock plate and the side wall of the feeding barrel, thus, the waste of food materials can be prevented.

In one embodiment, the angle that the third dial can rotate is greater than or equal to 30°, so that the third dial has a more reasonable rotation angle, so that the food materials on the storage base can be fully crushed and pushed into the feeding hole, in order to improve the smoothness of the feeding of the product, the rotation angle of the third dial can be prevented from being too small, which may cause the feeding failure.

In some embodiments, the storage base is further provided with a third mounting hole, and the third auxiliary feeding device further comprises: a third drive shaft, one end of the third drive shaft is located in the storage cavity, and drivingly connected to the third dial, and the other end of the third drive shaft protrudes from the third mounting hole, and drivingly connected to the working screw.

In some embodiments, a third dial such as a rotatable paddle, a dial lever, and the like can be provided in the storage cavity and drivingly connected to the working screw through the third drive shaft, so that when the working screw rotates, the third dial is driven to rotate by the third drive shaft, to achieve cutting and/or extrusion of food materials. After cutting and/or squeezing, the food materials can further enter the cup body from the feeding hole under the action of the third dial. Of course, the third dial can drivingly connected to the working screw in other ways, or the third dial may not be connected to the working screw, but additionally be provided with a driving structure for driving its rotation.

In some embodiments, a receiving groove is provided on the outer bottom wall of the storage base, one end of the working screw can be extended into the receiving groove, and a mounting protrusion is provided on the inner bottom wall of the storage base, the third mounting hole runs through the mounting protrusion and the receiving groove, and one end of the third drive shaft is located in the receiving groove for drivingly connected to the working screw, the other end of the third drive shaft extends into the storage cavity through the third mounting hole and drivingly connected to the third dial.

In some embodiments, a mounting protrusion is provided on the inner bottom wall surface of the storage base, on the one hand, the third dial can be installed higher by using the mounting protrusion, and in addition, this arrangement can also increase the area of the inner wall of the storage base, so that the third dial can cooperate with a larger area of the inner wall to achieve cutting and/or extrusion processing of food materials, increase the squeezing force of the third auxiliary feeding device on the food materials at work, and further improve the processing effect of food materials. At the same time, after setting the mounting protrusion, the receiving groove can be set corresponding to the mounting protrusion, so that the thickness of the bottom wall of the storage base will not be increased, and the strength of the bottom wall of the storage base can be ensured. The receiving groove is provided on the outer bottom wall surface of the storage base, so that the storage base is covered on one end of the working screw, so that the working screw can also cooperate with the side wall of the receiving groove to achieve further cutting and/or extrusion processing of food materials, therefore the processing effect of food materials can be further improved.

In some embodiments, the feeding hole extends from one edge of an end surface of the mounting protrusion away from the storage cavity to a bottom of the storage base.

In some embodiments, the feeding hole extends from the edge of one end surface of the mounting protrusion away from the storage cavity to the bottom of the storage base, so that the feeding hole is opened larger, so the feeding smoothness can be improved.

In one embodiment, the number of the feeding holes is one or more, and when the number of the feeding holes is plural, the plurality of the feeding holes are symmetrically disposed.

In some embodiments, the side wall surface of the mounting protrusion is inclined outward from one end of the mounting protrusion away from the bottom wall of the storage base to one end of the mounting protrusion near the bottom wall of the storage base; and/or a shape of the receiving groove is adapted to a shape of one end of the working screw protruding into the receiving groove.

In some embodiments, the outer wall of the mounting protrusion is inclined outward from the opening of the storage cavity to the bottom wall of the storage cavity, so that after cutting and/or squeezing the food materials, the food materials can flow down along the outer side wall of the mounting protrusion, so that food materials can also accelerate downward movement under the action of gravity, so that food materials can be smoothly fed through the feeding hole. In addition, this setting also enables the receiving groove to better cooperate with the upper end of the working screw, and also makes the structure of the third auxiliary feeding device more reasonable.

In some embodiments, the bottom wall of the storage base is recessed into the storage cavity to form the receiving groove and the mounting protrusion.

In some embodiments, the bottom wall of the storage base can be recessed into the storage base to form a mounting protrusion on the inner bottom wall surface and a receiving groove on the outer bottom wall surface, this structure can quickly and simply process the mounting protrusion and the receiving groove on the bottom wall of the storage base, so that it can reduce the processing difficulty and reduce the processing costs.

In some embodiments, the third dial includes: a fixed seat located on the mounting protrusion, and mounted to the third drive shaft; and a dialing structure, one end of the dialing structure is connected to the fixed seat, and the other end of the dialing structure extends to the bottom wall of the storage cavity; and the dialing structure is a dial sheet, a dial lever or a dial stick.

In some embodiments, the third dial includes a base and a dialing structure, and the base is used to connect with the third drive shaft and implement the installation of the dialing structure, and the dialing structure is used for cutting and/or squeezing food materials and dialing food materials. When the mounting protrusion is provided in the storage cavity, the third dial can be installed on the top of the mounting protrusion, so that one end of the third dial can be installed higher, and the other end of the third dial can be drooped to the bottom of the storage cavity, so that the third dial can cut and/or squeeze food materials of different heights in the storage cavity, which can improve the processing effect of food materials and increase the juice extraction rate. Conversely, if the storage cavity is not provided with the mounting protrusion on the bottom wall, the third dial can only be installed on the bottom wall of the storage cavity, so that the height at which the third dial can process food materials is limited by the height of the dialing structure, so when the dialing structure is set short, it will reduce its processing effect on food materials, but if the entire dialing structure is set higher, in order to ensure the strength of the dialing structure, the height of the mounting base has to be set higher at the same time, which will cause the structure of the third dial to be more complicated, and also reduce the connection strength between the third drive shaft and it.

In one embodiment, the dialing structure may be sheet-shaped, pole-shaped, or stick-shaped, specifically, the shape of the dialing structure may be selected according to actual conditions.

In some embodiments, at least one of a second drive protrusion is provided on the third drive shaft, and the second drive protrusion can cooperate with the working screw to rotate under the driving of the working screw.

In some embodiments, one or more of second drive protrusions can be provided on the lower end surface of the third drive shaft, so that the second drive protrusion can be matched with the upper side of the working screw to achieve the drive connection between the third drive shaft and the working screw, of course, the third drive shaft can also be drivingly connected to the working screw through other structures.

In some embodiments, the third dial and the third drive shaft are separate structures, or the third dial and the third drive shaft are an integrated structure.

In some embodiments, the third dial and the third drive shaft can be separate structures, such as two parts, which facilitates separate maintenance and replacement of each part of the third dial and the third drive shaft separately. In some embodiments, the third dial and the third drive shaft can also be an integrated structure, so that the connection strength of the third dial and the third drive shaft can be improved, so that the third dial and the third drive shaft are not easily damaged, and the seamless connection between the third dial and the third drive shaft can be realized, so that a gap can be prevented from being formed between the third dial and the third drive shaft, which is convenient for cleaning.

In some embodiments, one of the second positioning groove and the second positioning protrusion is provided on the third drive shaft, the other one of the second positioning groove and the second positioning protrusion is provided on the working screw, and the second positioning protrusion can be inserted into the second positioning groove to position the working screw; and the third wear part is provided in the second positioning groove.

In some embodiments, a second positioning protrusion or a second positioning groove may be provided on the upper end surface of the working screw, and a second positioning protrusion or a second positioning groove may be provided correspondingly on the lower end of the third drive shaft, in this way, the positioning of the working screw can be achieved through the second positioning protrusion and the cooperation of the second positioning protrusion with the positioning axis, improving the stability of the working screw after installation and reducing the shaking of the working screw. By setting the third wear part in the second positioning groove, the wear between the second positioning protrusion and the second positioning groove can be reduced.

In some embodiments, the third auxiliary feeding device can be detachably mounted in the feeding barrel, or the third auxiliary feeding device is located in the feeding barrel, and the storage base of the third auxiliary feeding device and the side wall of the feeding barrel is an integrated structure, or the third buckle is provided on the inner side wall of the feeding barrel, the fourth buckle is provided on the outer side wall of the storage base, and the storage base can be snap-fitted in the feeding barrel through cooperation of the third buckle and the fourth buckle; and/or the side wall of the storage cavity is inclinedly arranged from the opening of the storage cavity to the bottom of the storage cavity into the storage cavity.

In some embodiments, the third auxiliary feeding device is installed in the feeding barrel and above the working screw, so that the third auxiliary feeding device can be installed through the feeding barrel, and at the same time, it can be installed in the feeding barrel, the feeding barrel can also be used to prevent food materials in the third auxiliary feeding device from splashing out, preventing waste of food materials. At the same time, the storage base and the feeding barrel of the third auxiliary feeding device can be set as an integrated structure, and the storage base of the third auxiliary feeding device can be detachably installed in the feeding barrel. When the feeding barrel and the cup body are combined to be a large cup, the third auxiliary feeding device can be detachably installed in the feeding barrel.

Further, the fourth buckle may be provided on the outer side wall of the storage base, and the third buckle may be provided on the inner side wall of the feeding barrel, so that through cooperation between the third buckle and the fourth buckle, the third auxiliary feeding device is snap-fitted in the feeding barrel. This setting enables the third auxiliary feeding device to be detached from the feeding barrel at will, facilitating cleaning and maintenance of the third auxiliary feeding device.

In some embodiments, the food processing cup further comprises: a filter set between the cup body and the working screw, and a positioning step surface is provided on an inner side wall of the feeding barrel corresponding to one end of the filter near the feeding barrel, and the positioning step surface is used to cooperate with the filter to position the filter.

In some embodiments, when the food processor is a single cup body and a single working food screw, one filter can be set between the cup body and the working screw so that the filter can be used to realize the separation of slag and juice of food materials after the food materials are crushed. In addition, one positioning step surface on the inner wall of the feeding barrel corresponding to the upper end of the filter, so that press the filter using the positioning step surface to achieve the axial positioning and installation of the filter, this can improve the installation reliability of the filter.

In some embodiments, the food processor further comprises: a pressure relief hole provided on any one or more of the cup body, the feeding assembly, and the slag receiving device, and can communicate with the sealed cavity; and a pressure relief plug can be mounted at the pressure relief hole to open or seal the pressure relief hole.

In some embodiments, a pressure relief hole communicating with the sealed cavity can be provided on any one or more of the cup body, the feeding assembly, and the slag receiving device, and the pressure relief plug can be used to open or seal the pressure relief hole. In this setting, the pressure relief plug can be closed before the product is started to seal the pressure relief hole, so that the inside of the cup body, the feeding assembly and the slag receiving device can be completely sealed, so that the extraction assembly removes the air to form a vacuum, and food materials can be processed in a vacuum or near vacuum state, preventing oxidation of food materials. After the food materials are processed, the pressure relief hole can be opened through the pressure relief plug to make the product communicate with the outside, and then the negative pressure in the cup body, the feeding assembly, and the slag receiving device can be gradually unloaded, pressure relief can be easily and quickly achieved. Of course, in other embodiments, the pressure can also be relieved in other ways, such as delivering air inward through the extraction assembly to achieve pressure relief.

In some embodiments, the extraction assembly comprises: a suction pump; and an extraction channel, one end of the extraction channel is connected to the suction pump, and the other end of the extraction channel communicates with the sealed cavity.

In some embodiments, one suction pump can be used to extract air, and the extraction channel is used to expel air.

In some embodiments, the extraction assembly further comprises: an exhaust channel connected to the outlet of the suction pump for expelling air; and a noise reduction device provided on the exhaust channel.

In some embodiments, by setting an exhaust channel to perform expelling air, and the exhaust channel can be an exhaust pipe. The noise reduction device can reduce the noise of the extraction assembly and improve the user experience.

In some embodiments, the suction pump is provided on any one of the base assembly, the cup body, and the feeding assembly, or the suction pump is independently disposed with respect to the base assembly, the cup body, and the feeding assembly.

In some embodiments, the suction pump can be set at any position, specifically, such as on the base assembly, the cup body, or the feeding assembly, of course, the suction pump can also be independently disposed with respect to the base assembly, the cup body and the feeding assembly, that is, the suction pump can also be peripheral to the base assembly, the cup body, and the feeding assembly.

In some embodiments, the extraction channel is a suction pipe.

In some embodiments, the extraction channel is a suction pipe, of course, the extraction channel may also be other channel structure provided on the housing of the food processor.

In some embodiments, the suction pump is an electric pump or a manual pump or a foot pump.

In some embodiments, the suction pump is an electric pump, which can be used to drive the suction pump with electricity, so that manual suction is not required, of course, the suction pump can also be a manual pump or a foot pump.

In some embodiments, the suction pump is a vacuum pump.

In some embodiments, the suction pump is a vacuum pump, because the vacuum pumps are more common, they are easy to purchase, in addition, the vacuum pump has a strong ability to vacuum, so it can extract a large amount of air inside the food processor to ensure that vacuum effect in the cup body when processing food materials.

In some embodiments, a first slag outlet is provided on the cup body, and the slag receiving device is hermetically connected to the first slag outlet, the slag receiving device includes: a slag receiving cup, which can be detachably sealed and mounted at the first slag outlet, and the side wall of the slag receiving cup is provided with a slag inlet, and the slag inlet and the first slag outlet conduct to each other; a slag receiving cover sealed and covered on the open end of the slag receiving cup; and a second seal provided at the connection between the slag receiving cover and the slag receiving cup, for hermetically connecting the slag receiving cover and the slag receiving cup; and a mounting post is provided on one of the slag receiving cup and the cup body, and a mounting sleeve is provided on the other one of the slag receiving cup and the cup body, the slag receiving cup can be detachably sealed and mounted at the first slag outlet through the cooperation of the mounting post and the mounting sleeve.

In some embodiments, a first slag outlet is provided on the cup body, and when the slag receiving device is installed outside the cup body, the slag receiving device is set as structure include the slag receiving cup and the slag receiving cover, so that the slag receiving cup can perform the slag receiving process, and the slag receiving cup can be opened and closed by the slag receiving cover. The slag receiving cup can be detachably connected to the cup body, which is convenient for removing the slag receiving cup from the cup body for slag pouring or cleaning. At the same time, a mounting sleeve can be set on one of the slag receiving cup and the cup body, and a mounting post can be set on the other, so that, the detachable installation between the slag receiving cup and the cup body can be achieved through the sleeved installation of the mounting sleeve and the mounting post. At the same time, a second seal may be provided between the mounting sleeve and the mounting post, so that the mounting sleeve and the mounting post can be hermetically connected.

Of course, the slag receiving device may also be other types of structures, such as a slag receiving bag, or other cavity structures.

In some embodiments, a slag discharge pressure adjusting assembly provided at the first slag outlet for adjusting the slag discharge pressure at the first slag outlet.

In some embodiments, a slag discharge pressure adjusting assembly can be provided at the first slag outlet, so that the slag outlet pressure at the first slag outlet can be adjusted by the slag discharge pressure adjusting assembly so that the slag outlet pressure can be controlled reasonably, therefore, the food slag can be further squeezed before being discharged, so that the juice is separated from slag more completely. Specifically, the slag discharge pressure adjusting assembly may have only one gear pressure, that is, the slag discharge pressure is a fixed value, and after the product is assembled the user cannot change the slag discharge pressure. Of course, the slag discharge pressure adjusting assembly can also have multiple gear pressures, that is, the slag discharge pressure includes multiple gear values, in the actual process, the user can operate the slag discharge pressure adjusting assembly to make the product have multiple slag discharge pressures, so that when processing different food materials, the slag pressure can be adjusted freely according to the type of food materials and the needs of the user, so that on the one hand it can better meet the various needs of users, and on the other hand it can adjust the slag pressure based on the type of food materials reasonably to prevent some soft food materials, such as grapes, from being crushed too much, resulting in loss of nutrients and poor taste, and prevent some crude fiber food materials, such as sugar cane, ginger, and carrots are insufficiently squeezed, resulting in a low juice extraction rate, this can ensure the nutrition and taste of the food materials and increase the juice extraction rate of the product. In one embodiment, the slag pressure can be adjusted by a damping silicone. The specific structure of the slag discharge pressure adjusting assembly may be a structure for adjusting the slag discharge pressure on the existing juice machine, juicer and the like.

In some embodiments, one end of the feeding assembly can be detachably snap-fitted into the open end of the cup body.

In some embodiments, a first buckle can be provided on cooperating with the first buckle is provided on the inner side wall of the upper end of the cup body, so that one end of the feeding assembly can be hermetically installed in the open end of the cup body through the snap-fitting of the first buckle and the second buckle.

In some embodiments, the cup body includes a crushing cup and a squeezing cup, the feeding assembly is hermetically covered on the mouth end of the crushing cup, and the other end of the crushing cup is provided with a communication port, the squeezing cup communicates with the crushing cup through the communication port, the working screw includes a crushing screw mounted in the crushing cup and a squeezing screw mounted in the squeezing cup, and the first slag outlet is provided on the cup body, and when the slag receiving device is hermetically connected to the first slag outlet, the first slag outlet is provided on the squeezing cup, and the slag receiving device communicates with the squeezing cup through the first slag outlet, the base assembly is provided with a first driving shaft and a second driving shaft, and the first driving shaft is drivingly connected to the crushing screw for driving the crushing screw to crush food, and the second driving shaft drivingly connected to the squeezing screw for driving the squeezing screw to squeeze food materials to separate the juice from slag of the food materials.

In some embodiments, after the food materials entered into the crushing cup, the crushing screw is driven by the first driving shaft to cooperate with the side wall of the crushing cup to crush the food, the crushed food materials enters the squeezing cup under the action of crushing screw, and the squeezing screw squeezes the food materials under the driving of the second driving shaft to separate the juice from slag of the food materials. This embodiment separates the crushing process and juice squeezing and discharging process of food materials, in the crushing process, since the juice squeezing and discharging process is not required, there is no need to set the filter and rotating brush and other parts the crushing cup, so that the food materials in the crushing cup can be crushed under the combined effect of the crushing cup and the crushing screw, at the same time, the squeezing screw can be set approximately horizontally during the juice squeezing and discharging process, and the juice squeezing and discharging system can be set as horizontal, so it is very easy to separate the juice from slag of food materials, this kind of setting can ensure the juice extraction rate of the food processor on the one hand, and can avoid using the filter, rotating brush and other parts, which makes the structure of the food processor simple and easy to install, and because the filter is eliminated, it can reduce the cleaning difficulty for the user, improving the user experience.

In some embodiments, the angle between the axis of the squeezing cup and the axis of the crushing cup is greater than or equal to 75° and less than or equal to 180°, or the angle between the axis of the squeezing cup and the axis of the crushing cup is greater than or equal to 90° and less than or equal to 135°.

In one embodiment, an angle can be set between the squeezing cup and the crushing cup, as long as food materials can enter the crushing cup from the squeezing cup, and, the angle between the axis of the squeezing cup and the axis of the crushing cup is greater than or equal to 75° and less than or equal to 180°, the squeezing cup is set horizontally or obliquely downward, therefore when the food materials enter the squeezing cup or flow to the first slag outlet in the squeezing cup, at least the gravity of the food materials need not to be overcome, which makes the flow of the food materials smoother, and the angle between the axis of the squeezing cup and the axis of the crushing cup is greater than 90° and less than or equal to 135°, in this kind of setting, in addition to the food materials flowing out by the squeeze force of the squeeze screw, the food materials can also rely on the gravity of the food materials to flow out, therefore, on the one hand, it can speed up the flow rate of food materials to increase the speed of juice, on the other hand, it can fully squeeze the food materials to improve the juice extraction rate, at the same time, this setting combines vertical and horizontal machines, so that the product can have both the advantages of good crushing effect of the vertical machine and the advantages of sufficient extrusion of the horizontal machine, which can then make the food materials fully crushed and can be fully squeezed, which can improve juice extraction rate.

Further, an angle between the axis of the squeezing cup and the axis of the crushing cup is 90°.

In one embodiment, an angle between the axis of the squeezing screw and the axis of the crushing screw is greater than or equal to 75° and less than or equal to 180°, or an angle between the axis of the squeezing screw and the axis of the crushing screw is greater than or equal to 90° and less than or equal to 135°. This setting enables the squeezing cup to be set horizontally or obliquely downward, so that the food materials enter the squeezing cup or flow to the first slag outlet in the squeezing cup, at least the gravity of the food materials need not to be overcome, which makes the flow of the food materials smoother.

Further, an angle between the axis of the squeezing screw and the axis of the crushing screw is 90°.

In one embodiment, the base assembly further includes a base and a housing assembly, and the housing assembly is installed on the base.

In some embodiments, the cup body is provided with a first slag outlet, and the slag receiving device is hermetically connected to the first slag outlet, the food processor further includes: a first pressure relief channel, one end of the first pressure relief channel communicates with the cup body, and the other end of the first pressure relief channel communicates with the outside; a second pressure relief channel, one end of the second pressure relief channel communicates with the slag receiving device, and the other end of the second pressure relief channel communicates with the outside; and a fifth seal mounted on one end of the first pressure relief channel communicating with the outside and one end of the second pressure relief channel communicating with the outside, for opening or closing the first pressure relief channel and the second pressure relief channel.

In some embodiments, when the slag receiving device is set outside the cup body, a first pressure relief channel communicating with the cup body is set, the pressure can be released from the cup body through the first pressure relief channel after the vacuum extraction is completed, and a second pressure relief channel communicating with the slag receiving device is set, the pressure can be released from the slag receiving device through the second pressure relief channel after the vacuum extraction is completed, a fifth seal is hermetically connected to the end where the first pressure relief channel and the second pressure relief channel communicate with the outside, in this way, whether the first pressure relief channel and the second pressure relief channel are communicate with the outside can be controlled by turning on or off the fifth seal, when the juice is vacuumed, the first pressure relief channel and the second pressure relief channel can be closed to ensure that the cup body can be sealed, after the juice extraction is finished, the fifth seal can be opened to make the first pressure relief channel and the second pressure relief channel open, so that the pressure of the cup body and the slag receiving device can be relieved simultaneously, in this kind of setting, since the cup body and the slag receiving device are provided with corresponding pressure relief channels, the cup body and the slag receiving device can be relieved when the pressure is released, respectively, in this way, regardless of whether the first slag outlet of the cup body is blocked by food slag, the slag receiving device can release pressure in time, so that the slag receiving device can be easily and conveniently disassembled for slag pouring or cleaning after the juice extraction is completed, which can solve a series of problems caused by the slag receiving device's failure to release pressure in time due to the clogging of food slag, which can improve the overall performance of the product and improve user experience.

In some embodiments, one end of the first pressure relief channel communicating with the outside and one end of the second pressure relief channel communicating with the outside are merged into the same channel; a connection channel is provided in a side wall of the cup body, and one end of the connection channel extends to the first slag outlet and communicates with the first slag outlet, the inner side wall of the connection channel is provided with a second through hole communicating with the cup body, a third through hole is provided on the outer side wall of the connection channel, and the fifth seal can be opened or hermetically mounted at the third through hole.

In some embodiments, combining one end of the first pressure relief channel and the second pressure relief channel communicate with the outside, that is, the air intake end to form one channel, so that only a fifth seal is needed to realize the simultaneous opening or closing of the first pressure relief channel and the second pressure relief channel, so when the cup body and the slag receiving device are closed for vacuuming, it is only needed to install the fifth seal in place, when the pressure is released, it is only necessary to open the fifth seal, which can simplify the operation of the user during juice extraction and pressure relief, reduce the workload of the user when using the product, and improve the user experience.

At the same time, a connection channel is provided in a side wall of the cup body, so that the end where the first pressure relief channel communicates with the outside and the end where the second pressure relief channel communicates with the outside can be merged into the same channel. Specifically, one end of the connection channel communicates with the first slag outlet, so that the connection channel can communicate with the slag receiving device, the second through hole is set on the side wall of the connection channel, so that the connection channel can communicate with the cup body, so that the connection channel can be used as the channel shared by the first pressure relief channel and the second pressure relief channel, so that the cup body and the slag receiving device can simultaneously close and release pressure through the connection channel. The third through hole on the outer wall of the connection channel is an air inlet that connects the channel and communicates with the outside, by opening and closing the third through hole, the cup body and the slag receiving device can be sealed or relieve pressure at the same time.

Of course, other structures can also be used to achieve the purpose of merging one end of the first pressure relief channel communicating with the outside and one end of the second pressure relief channel communicating with the outside into the same channel, such as a shunt tube including an inlet and two outlets can be embedded in the side wall of the cup body, so that the pressure relief of the cup body and the slag receiving device can be realized through the shunt tube at the same time.

In some embodiments, the fifth seal is a sealing plug, and the food processor further comprises: a valve stem, one end of the valve stem is inserted and mounted in the third through hole, and can move along the axis of the third through hole, and the other end of the valve stem is located outside the cup body, the sealing plug is sleeved on one end of the valve stem located outside the cup body, and can be hermetically mounted at the third through hole or open the third through hole under the action of the valve stem; and a return spring provided in the cup body or the connection channel and connected to the valve stem for resetting the valve stem after the valve stem is moved.

In some embodiments, the fifth seal can be set as a sealing plug, such as a rubber plug and a silicone plug, so that the third through hole can be opened and closed through a sealing plug, thus, the entire pressure relief channel can be opened and closed. The valve stem is used to implement the installation of the sealing plug and drive the sealing plug along the axis of the third through hole, so that the sealing plug can be opened and closed by the movement of the valve stem. The return spring is used for resetting the valve stem after the pressure relief is completed, so that the valve stem and the sealing plug can be automatically reset to the initial position after the pressure relief, to achieve the sealing of the third through hole, in this kind of setting, after the pressure is released, the valve stem can be reset automatically, so the user does not need to close the third through hole, which simplifies the workload of the user, and also prevents the user from forgetting to reset the valve stem when the next juice is pressed, which will cause the product not to be sealed and vacuum extraction not to occur.

In some embodiments, one end of the valve stem inserted into the third through hole is inserted into the second through hole and extended into the cup body, an internal thread is provided on the inner side wall of the second through hole, the side wall of the valve stem cooperating with the second through hole is provided with an external thread, and the valve stem is mounted in the second through hole through the cooperation of the external thread and the internal thread.

In some embodiments, the internal thread is provided in the second through hole, and the external thread is correspondingly provided on the side wall where the valve stem is matched with the second through hole, so that the valve stem can be installed on the cup body by means of a threaded connection, so that the valve stem can be rotated in and out by rotation, and the valve stem can be moved back and forth along the axis of the third through hole, so that the sealing plug opens and closes the third through hole. With this structure, the valve stem can be simply and conveniently mounted on the cup body by means of a threaded connection, so that the sealing plug can open and close the third through hole simply and conveniently, enabling the overall structure of the product relatively simple.

In some embodiments, one end of the valve stem inserted into the third through hole is inserted into the second through hole and extended into the cup body, and a second mounting groove is provided on one end of the valve stem inserted into the cup body, and the inner side wall of the connection channel is further provided with a fourth through hole, the return spring is the torsion spring, and the torsion spring is sleeved and mounted on one end of the valve stem extended into the cup body, the first torsion spring arm of the torsion spring is mounted in the second mounting groove, and the second torsion spring arm of the torsion spring is inserted and mounted in the fourth through hole and can slide along the axial direction of the fourth through hole.

In some embodiments, the valve stem can be extended into the third through hole, and continue to pass through the first through hole and extend into the cup body, and the return spring is a torsion spring, so that after the valve stem turning, the torsion spring can reset the valve stem automatically. The torsion spring is sleeved on the end of the valve stem that extended into the cup body, so that the torsion spring can be installed in the cup body, which can more easily install the torsion spring. The end of the valve stem is provided with a second mounting slot, so that the torsion spring can be fixed through the cooperation of the second mounting slot and the first torsion spring arm, preventing the torsion spring from rotating with the valve stem, and the fourth through hole is used to fix and guide the second torsion spring arm, so that when the valve stem rotates, the torsion spring can normally twist and deform, so that the corresponding elastic potential energy can be gathered, so that after the valve stem is released, the valve stem can return to its original position under the action of elastic potential energy.

In some embodiments, a pressure plate is provided on one end of the valve stem located outside the cup body, and the pressure plate can press the sealing plug to be mounted at the third through hole, and the pressure plate is provided with an operating handle.

In some embodiments, by setting the pressure plate at the end of the valve stem, the sealing plug can be pressed at the third through hole through the pressure plate, so that the sealing plug can reliably seal the third through hole. An operating handle is provided on the pressure plate, and the valve stem can be rotated directly through the operating handle when in use, facilitating the user's operation.

In some embodiments, the food processor is a juice machine or a juicer. Of course, the food processor can also be other structures besides a juice machine and a juicer, such as a fruit juice machine, a wall breaking machine, etc.

The additional aspects and advantages of the present disclosure will be given in the following description section, part of which will become apparent from the following description, or be learned through practice of the present disclosure.

BRIEF DESCRIPTION OF THE DRAWINGS

The above-mentioned and/or additional aspects and advantages of the present disclosure will become apparent in the description which follows.

Figure 1:
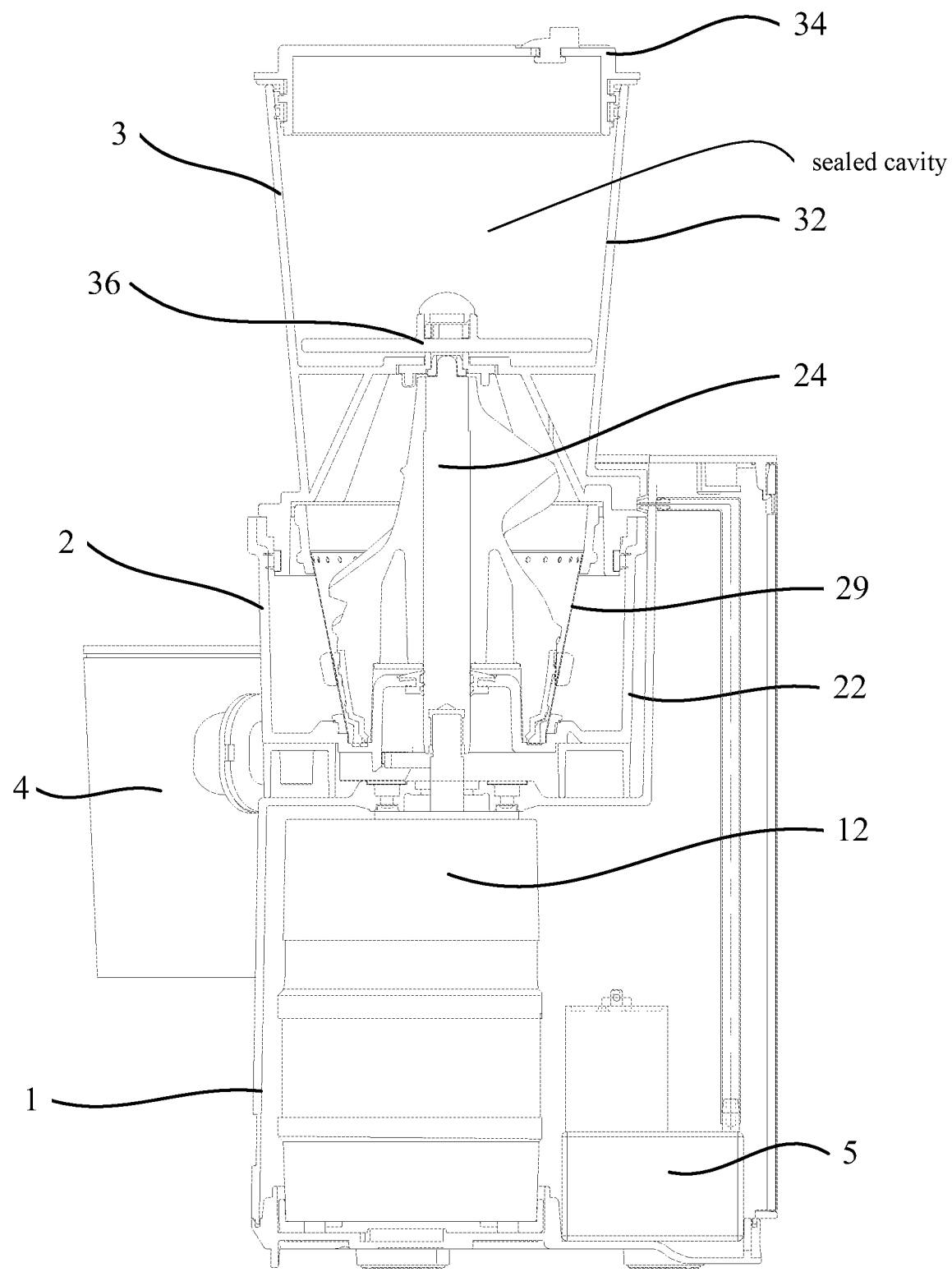
FIG. 1 is a schematic structural diagram of the food processor according to an embodiment of the present disclosure.

Therein, the corresponding relationship between the reference numerals and the assembly names in FIGS. 1 to 38 are as follows:

1 a base assembly, 12 a driving device, 14 a control device, 16 a housing assembly, 18 a base, 2 a food processing cup, 22 a cup body, 220 a second buckle, 222 a first slag outlet, 224 a juice outlet, 226 a mounting post, 228 a third buckle, 24 a working screw, 242 a first positioning protrusion, 244 a first transmission structure, 246 a second positioning protrusion, 26 a juice cover, 27 a supporting structure, 28 a first seal, 29 a filter, 3 a feeding assembly, 30 a third seal, 32 a feeding barrel, 320 a first buckle, 322 a mounting plate, 3222 a first mounting hole, 324 a feeding inlet, 326 a hollow pillar, 328 a positioning step surface, 34 a feeding cover, 36 a first auxiliary feeding device, 362 a first dial, 3622 a first through hole, 364 a first drive shaft, 3642 a first positioning groove, 3644 a first drive protrusion, 366 a sealing cover, 37 a first wear part, 38 a second auxiliary feeding device, 382 a storage table, 3822 a feeding channel, 3824 a second mounting hole, 3826 a first mounting groove, 384 a second dial, 3842 a second transmission structure, 39 a third auxiliary feeding device, 392 a storage base, 3920 a feeding hole, 3922 a storage cavity, 3924 a mounting protrusion, 39242 a third mounting hole, 3926 a receiving groove, 3928 a fourth buckle, 394 a third dial, 3942 a fixed seat, 3944 a dialing structure, 396 a third drive shaft, 3962 a second positioning groove, 3964 a second drive protrusion, 398 a third wear part, 4 a slag receiving device, 42 a slag receiving cup, 422 a slag inlet, 424 a mounting sleeve, 44 a slag receiving cover, 5 an extraction assembly, 52 a suction pump, 54 an extraction channel, 56 an exhaust channel, 58 a noise reduction device, 62 a pressure relief hole, 64 a pressure relief plug, 72 a cover body, 74 a fourth seal, 82 a connection channel, 822 a second through hole, 824 a third through hole, 826 a fourth through hole, 84 a fifth seal, 86 a valve stem, 88 a return spring.

DETAILED DESCRIPTION OF THE INVENTION

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

The food processor provided according to an embodiment of the present disclosure is described below with reference to FIGS. 1 to 38.

As shown in FIGS. 1 to 38, an embodiment of the first aspect of the present disclosure provides a food processor, including a base assembly 1, a food processing cup 2, a feeding assembly 3, a slag receiving device 4, and an extraction assembly 5, and the food processing cup 2 can be installed on the base assembly 1, the food processing cup 2 includes a cup body 22 and a working screw 24 rotatably installed in the cup body 22, the cup body 22 can be used to store food juice, and the cup body 22 is provided with a first slag outlet 222, or a second slag outlet is set in the cup body 22; the feeding assembly 3 is hermetically mounted on the cup mouth end of the cup body 22; the slag receiving device 4 is hermetically connected to the first slag outlet 222, for collecting the food waste or the slag receiving device 4 is located in the cup body 22 and connected to the second slag outlet for collecting food waste, a sealed cavity formed between the cup body 22, the feeding assembly 3, and the slag receiving device 4 to conduct them to each other; and an extraction assembly 5 can be communicated with the sealed cavity and is used for extracting air in the sealed cavity.

The food processor provided according to the embodiment of the present disclosure includes the base assembly 1, the food processing cup 2, the feeding assembly 3, the slag receiving device 4, and the extraction assembly 5. In one embodiment, the base assembly 1 is used to supply power to the entire product, control the work of the entire product, and support and install the food processing cup 2, the feeding assembly 3, and the slag receiving device 4. The food processing cup 2 is used for pulverizing food materials and separating the juice from the slag of the food materials through the cooperation of the cup body 22 and the working screw 24. The feeding assembly 3 is used to feed the food materials, that is, to put the food materials into the food processing cup 2, and the extraction assembly 5 is used to extract air from the sealed cavity formed by the entire feeding assembly 3, the extraction assembly 5, and the slag receiving device 4 to achieve the purpose of vacuuming. In this setting, the extraction assembly 5 can be started first to extract the air in the product so that the cup body 22 can be roughly formed into a vacuum state. After that, the working screw 24 can be started to process the food materials, so that the processing of the food materials can be realized in a roughly vacuum state, and the oxidation of the processed food can be relieved to prevent the loss of nutrients in the food and ensure the color and taste of the food juice. At the same time, in this application, the structure of the cup body 22 can be set reasonably, so that the cup body 22 can be used to collect food juice, so that there is no need to set an additional juice receiving structure, which can simplify the structure of the cup body 22 and reduce the costs of the product. In addition, this kind of setting is in the whole process of the food processing of the product, and the food juice can be stored in the cup body 22 first, that is, the food juice does not need to be drained while squeezing, so that during the entire food processing process, there is no need to open the juice outlet 224 as in the prior art, so that outside air cannot enter the cup body 22 through the juice outlet 224 during the entire food processing process, improving the sealing performance in the cup body, so that the internal vacuum of the cup body 22 can always be maintained. In addition, compared with the scheme of an additional hermetically mounted juice cup on the cup body 22, this setup can use the ready-made cup body to collect food juice, thus improving the use of the cup body 22, it can also simplify the structure of the product and reduce the processing costs of the product. At the same time, the cup body 22 is used to collect food juice, the oxygen content in the sealed cavity is low after the pressing is completed, which can better ensure the freshness of the food juice, only when the user needs to drink the food juice to be exported, which can ensure that the drinker can drink the freshest food juice. By setting the slag receiving device 4, the slag receiving device 4 can be installed integrally with the food processing cup 2 or the slag receiving device 4 can be directly set in the cup body 22, so that there is no need to open the slag outlet, that is, the slag outlet 222 can always be sealed during the slag discharge process of the product. In the prior art, because slag receiving parts are additionally provided outside the product, the slag outlet is always open during the entire juice extraction process, so the oxygen of the product can always enter the sealed cavity through the slag outlet, causing oxidation of the food juice. In this application, by setting the slag receiving device 4 that is hermetically mounted with the first slag outlet 222 or by directly setting the slag receiving device 4 in the cup body 22, it is not necessary to seal the slag outlet when the product is working, and the collection of food slag can also be realized, that is, the application can keep the slag outlet always sealed during the working process of the product, so that outside air cannot enter the sealed cavity during the working process of the product, the pressing process of the food materials can be realized under the vacuum state, and the food juice can be collected under the vacuum state, therefore, the oxidation of food juice can be significantly slowed down, and the taste of the squeezed food can be ensured.

In one embodiment, the cross-sectional area of the working screw 24 is increased from one end of the working screw 24 near the cup mouth of the cup body 22 to the other end of the working screw 24, and may be gradually increased, so that the gap between the cup body 22 and the working screw 24 gradually decreases from the opening of the cup body 22 to the bottom of the food processing cup 2, so that the pressing force on food materials can be increased in order to be able to squeeze the food materials more and more broken, so that can improve juice extraction rate.

Figure 2:
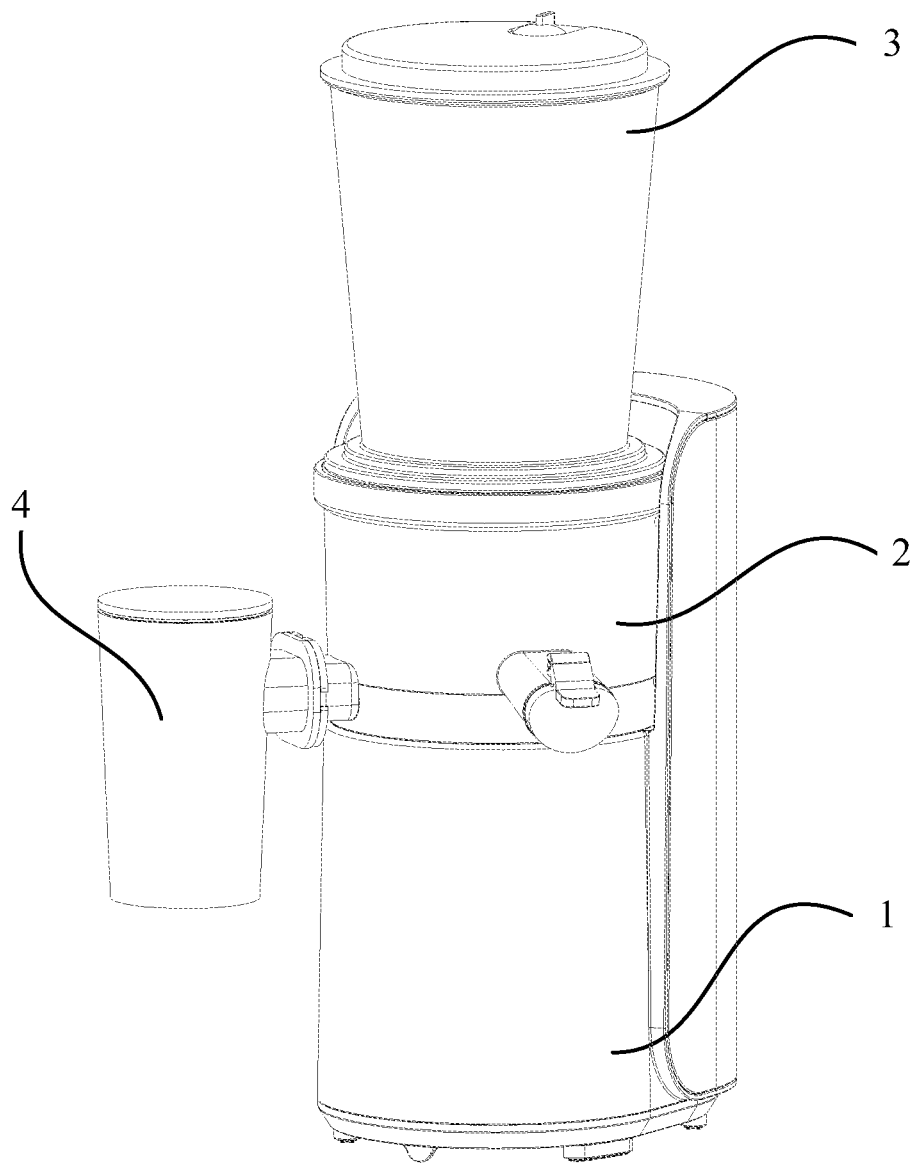
FIG. 2 is another schematic structural diagram of the food processor according to an embodiment of the present disclosure.
Figure 3:
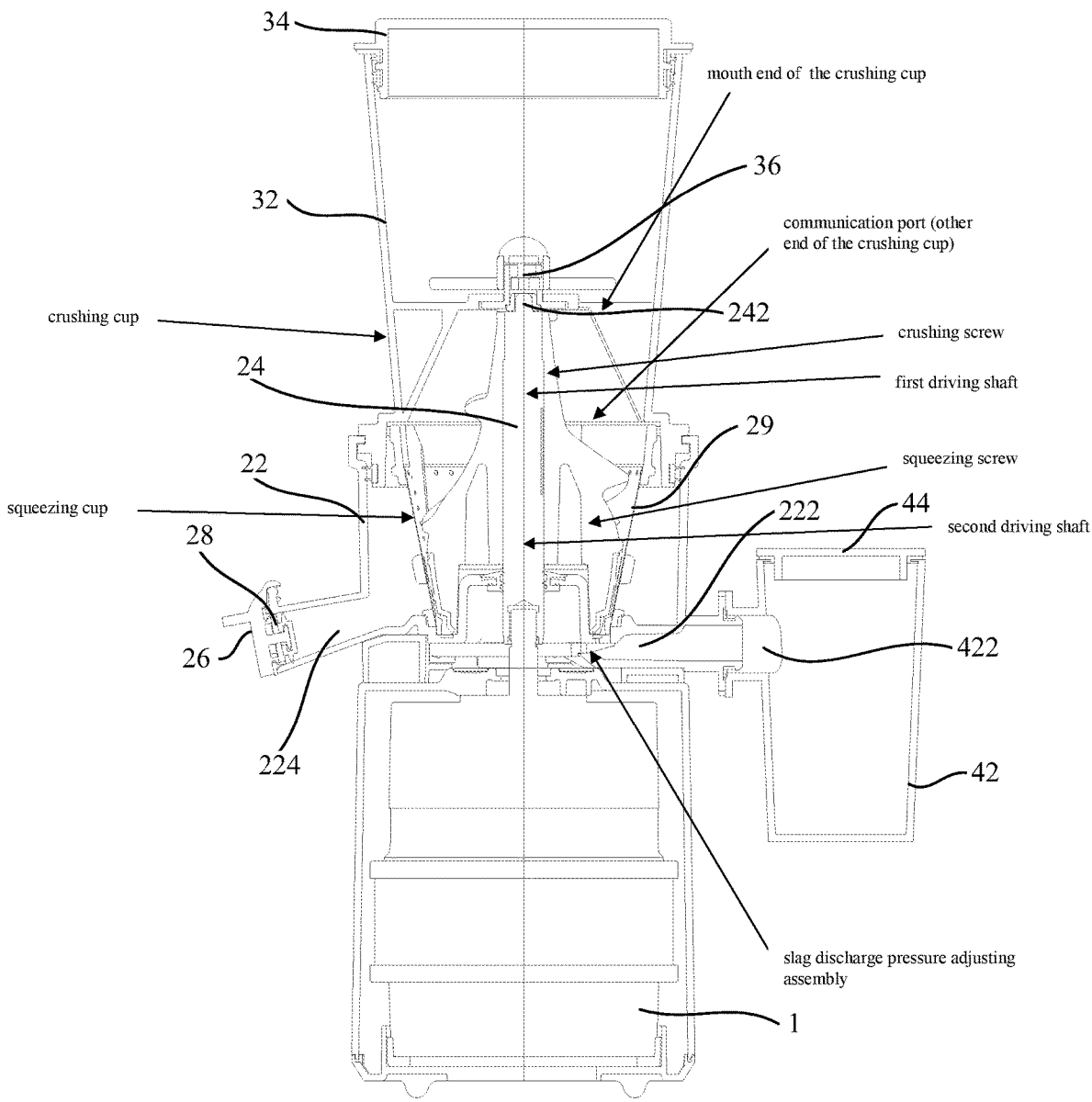
FIG. 3 is another schematic structural diagram of the food processor according to an embodiment of the present disclosure.
Figure 37:
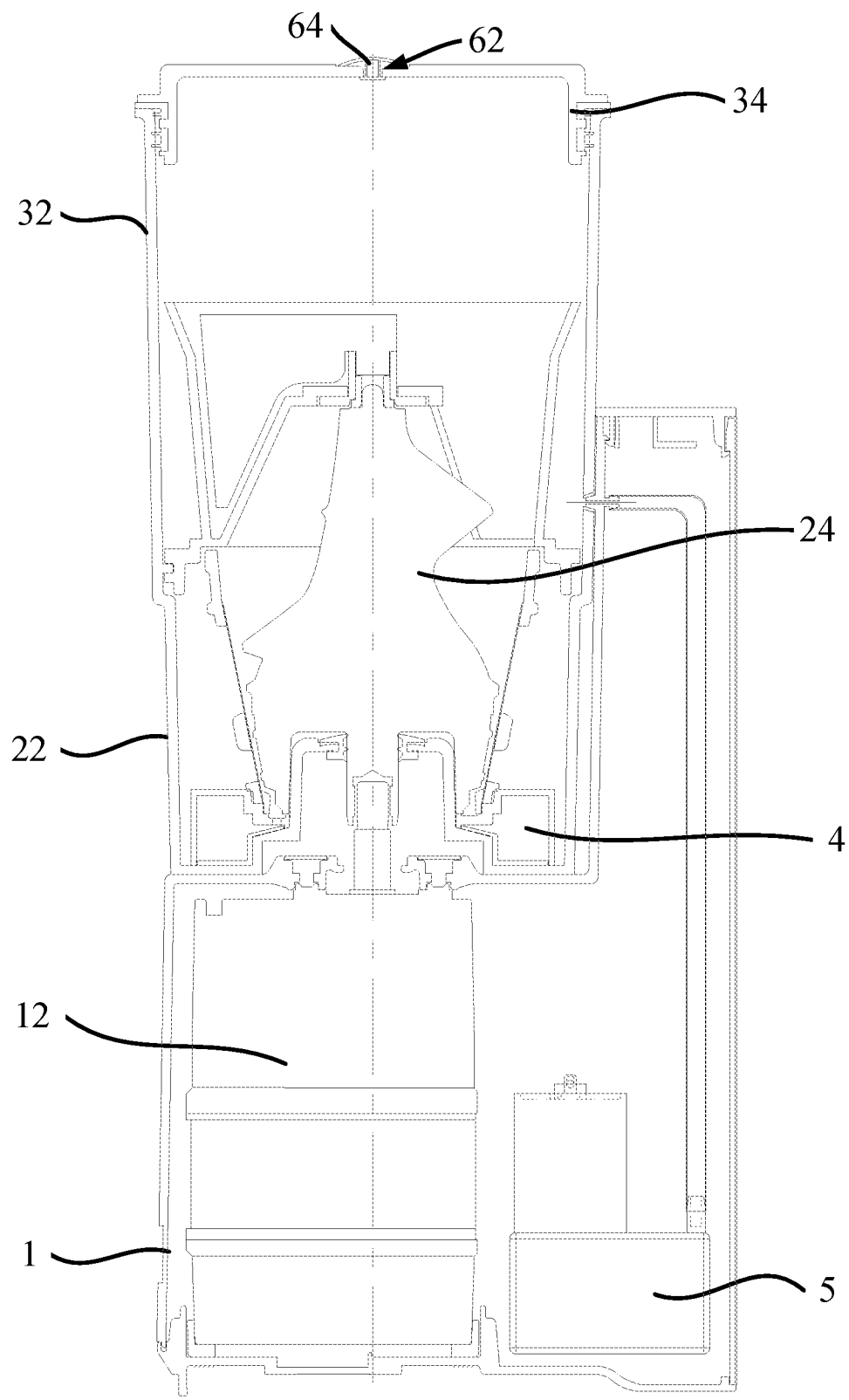
FIG. 37 is a seventh schematic structural diagram of the food processor according to an embodiment of the present disclosure.

In one embodiment the slag receiving device 4 is used to collect food slag after the juice is separated from slag of food materials. The slag receiving device 4 can be installed inside the cup body 22 as shown in FIG. 37 or can be installed outside the cup body 22 as shown in FIGS. 1-3. By setting the slag receiving device 4 in the cup body 22, the slag receiving device 4 can be hidden and installed in the cup body 22, so that it will not be installed outside the cup body 22 prominently, thus improving the aesthetics of the product, in addition, the slag receiving device 4 is installed in the cup body 22, it only takes up a part of the space, and other spaces in the cup body 22 can be used reasonably, so the space utilization rate can be improved. In addition, the slag receiving device 4 is installed in the cup body 22, which can save the connection structure between the slag receiving device 4 and the cup body 22, so that the structure of the cup body 22 and the slag receiving device 4 can be made simpler. In addition, by installing the slag receiving 4 device in the cup body 22, there is no need to provide an additional slag outlet on the cup body, so that the sealing performance of the food processor can be improved and significantly alleviate the oxidation problems of food materials during and after juice extraction when the food processor is set as a vacuum food processor. Of course, in other embodiments, a first body slag outlet may also be set on the cup body 22, and the slag receiving device 4 is installed outside the cup body 22, and communicates with the inside of the cup body 22 through the first slag outlet.

In the above-mentioned embodiment, as shown in FIGS. 1-4, 32 and 33, the base assembly 1 comprises: a driving device 12 connected to the working screw 24 and is used to drive the working screw 24 to rotate; a control device 14 connected to the driving device 12 and the extraction assembly 5; and is used to control the extraction assembly 5 to perform air extraction or control the work of the driving device 12, and/or controlling the extraction assembly 5 to perform air extraction, and after the extraction assembly 5 performed air extraction, control the driving device 12 to start working.

In these above-mentioned embodiments, the working screw 24 can be driven by the driving device 12 to crush and squeeze food materials, and the control device 14 is used to control the driving device 12 and the extraction assembly 5. Specifically, the control device 14 can individually control the driving device 12 or the extraction assembly 5 to work alone, or it can first control the extraction assembly 5 to work for a period of time in order to complete the pumping operation first, and then start the driving device 12 to work, for food processing. And the method of food processing after pumping down can separate the juice from slag of food materials after the pumping is completed, in this way, all the food materials are processed in a vacuum state, so all food materials are not easily oxidized, which can significantly reduce food oxidation. Conversely, if the food materials are processed before the gas is pumped, because some air remains in the cup body 22, the food materials that are processed first are easily oxidized by the residual air, which will cause some food materials to be oxidized, which cannot significantly reduce the oxidation of food juice and so on.

In any of the above-mentioned embodiments, the food processor further includes a reservation device connected to the control device 14 for enabling the control device 14 to control the driving device 12 and the extraction assembly 5 after a preset time.

In these above-mentioned embodiments, a reservation device can be set on the product, so that the reservation function of the product can be implemented through the reservation device, reducing the user's waiting time, specifically, for example, the reservation device includes a collection device for collecting a user's reservation parameter and a timing device is used for timing according to the reservation parameter, and after the timing is completed, the control device 14 starts to work.

Figure 16:
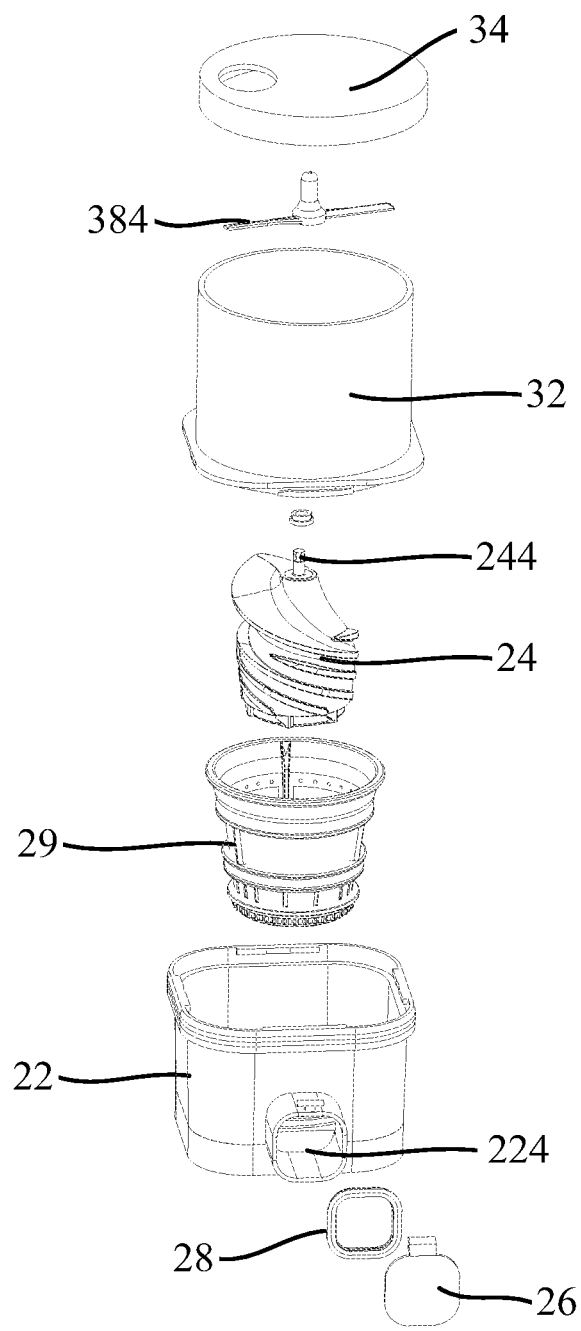
FIG. 16 is an exploded schematic structural diagram of a partial structure of the food processor in FIG. 14.
Figure 29:
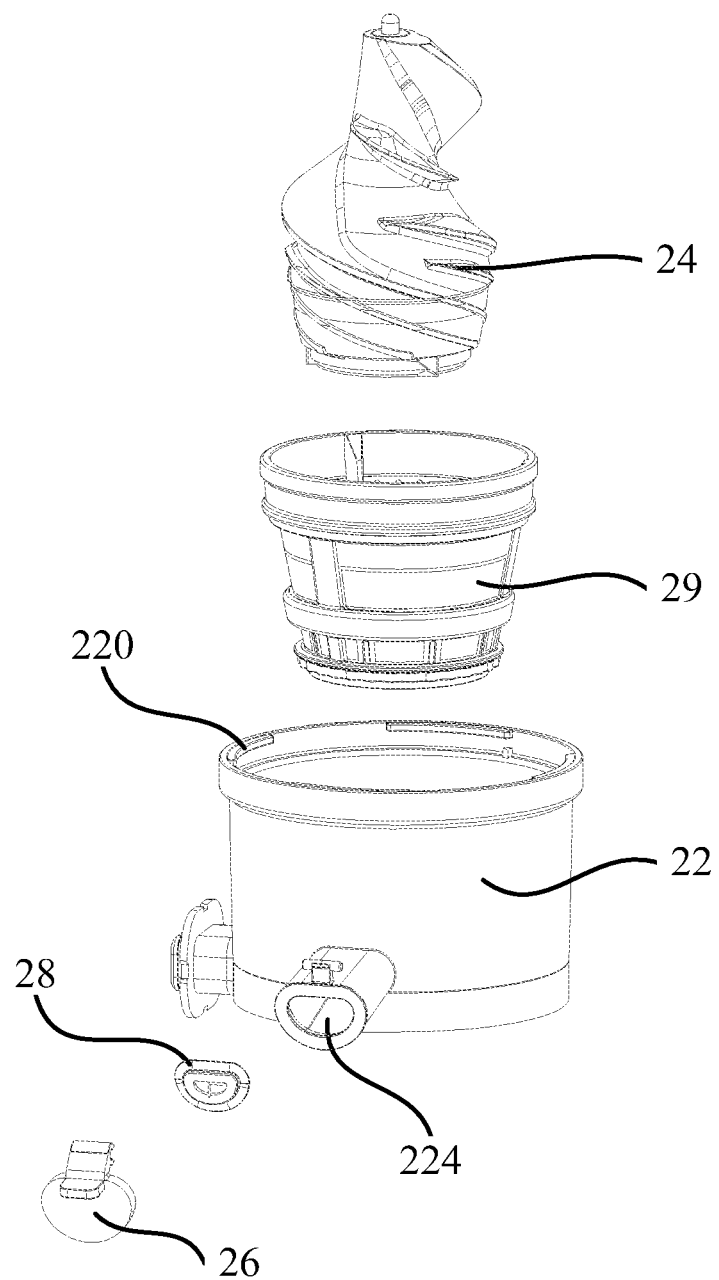
FIG. 29 is an exploded schematic structural diagram of the food processing cup of the food processor according to an embodiment of the present disclosure.

In any of the above-mentioned embodiments, as shown in FIGS. 3, 16, and 29, the cup body 22 is provided with a juice outlet 224, the juice outlet 224 is sealed and covered with a juice cover 26, and the juice cover 26 is used to open or close the juice outlet 224; and a first seal 28 is further provided between the juice outlet 224 and the juice cover 26, and the first seal 28 is used for hermetically connecting the juice cover 26 and the juice outlet 224.

In these above-mentioned embodiments, one juice outlet 224 can be set on the cup body 22 and a first seal 28 and the juice cover 26 provided on the juice outlet 224, and the first seal 28 and the juice cover 26 are used to seal the juice outlet 224 during the work process of the product. After the food processing is completed, when the user wants to use the food juice, the juice outlet 224 can be opened through the juice cover 26 so that the food juice can be accessed through the juice outlet 224, after the user takes out the required food juice, the juice outlet 224 can be closed through the juice cover 26 to store the remaining food juice in the cup body 22 in a sealed manner, reducing the oxidation of the remaining food juice.

Of course, in other embodiments, the juice outlet 224 may not be provided, and after the food processing is finished, the food juice is directly poured out through the cup mouth of the cup body 22.

In any of the above-mentioned embodiments, (this embodiment is not shown in the figures) the cup body 22 is provided with a juice outlet 224, and the juice outlet 224 is provided with a valve for controlling the opening or closing of the juice outlet 224.

In these above-mentioned embodiments, one valve can also be set at the juice outlet 224, so that the juice outlet 224 can be opened and closed through the valve. Specifically, for example, a faucet-like valve can be set at the juice outlet 224, so that the juice outlet 224 can be opened and stopped like a faucet, so that obtaining food juice is faster and more convenient.

In any of the above-mentioned embodiments, as shown in FIGS. 1-8 and 14-18, the feeding assembly 3 comprises: a feeding barrel 32, one end of the feeding barrel 32 is hermetically mounted to the cup mouth end of the cup body 22; a feeding cover 34 sealed and covered on the other end of the feeding barrel 32 and used to open or close the feeding barrel 32; and an auxiliary feeding device (specifically, it may be a first auxiliary feeding device 36 or a second auxiliary feeding device 38) can be mounted in the feeding barrel 32 for auxiliary feeding, for example, the auxiliary feeding device 36 can be rotatably installed in the feeding barrel 32.

In these above-mentioned embodiments, the feeding barrel 32 is used for feeding, and the feeding cover 34 is used to seal the opening of the feeding barrel 32, and, a third seal 30 may be provided between the feeding barrel 32 and the feeding cover 34, so that the sealing between the feeding barrel 32 and the feeding cover 34 can be achieved through the third seal 30. One rotating auxiliary feeding device is provided in the feeding barrel 32, so that the auxiliary feeding can be realized through the rotation of the auxiliary feeding device, to control the feeding speed and prevent food from being blocked. Specifically, for example, operations such as pre-cutting food materials or pushing food materials stored in the feeding barrel 32 into the cup body 22 can be achieved by using the auxiliary feeding device.

Figure 4:
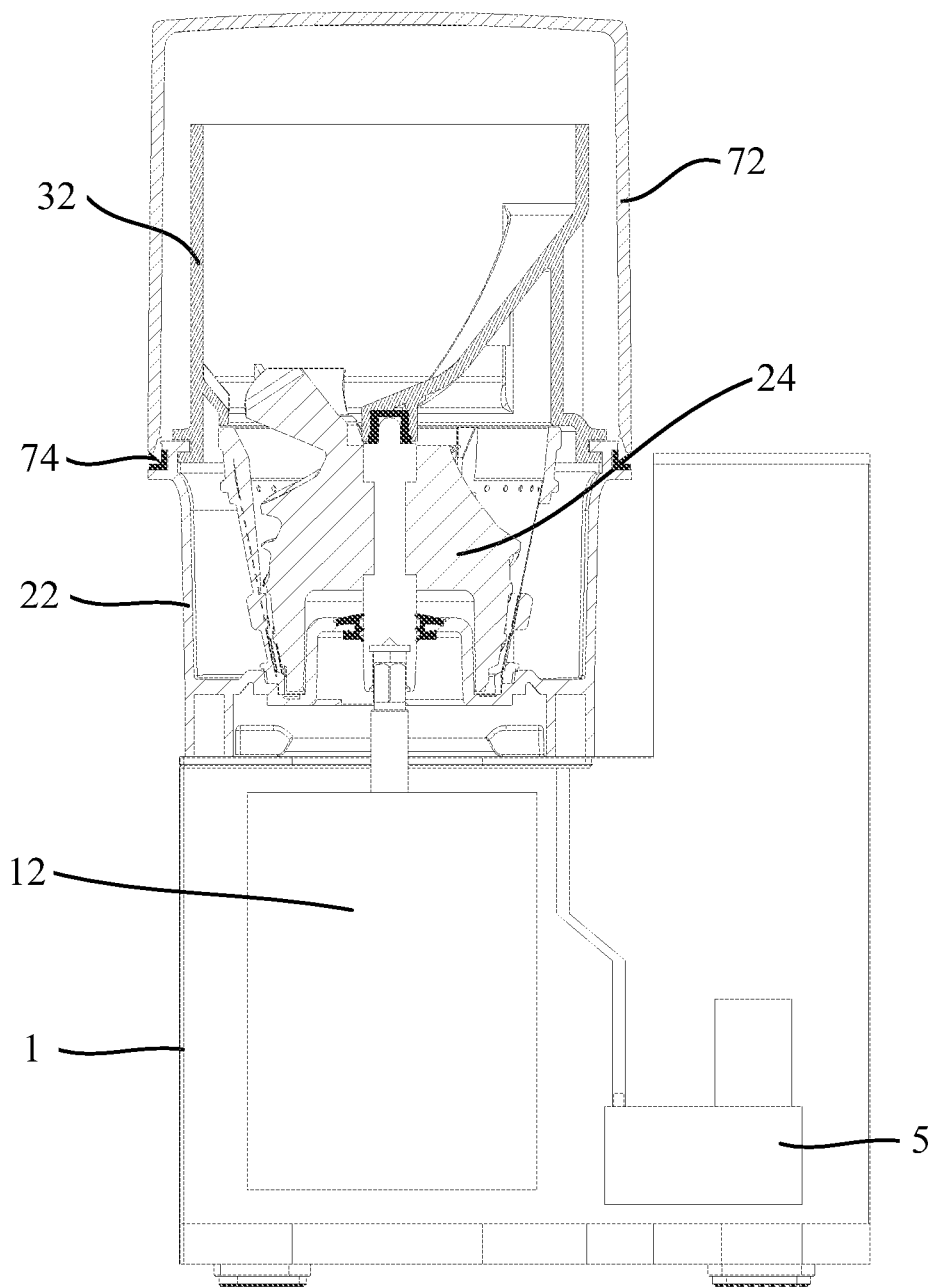
FIG. 4 is further another schematic structural diagram of the food processor according to an embodiment of the present disclosure.
Figure 5:
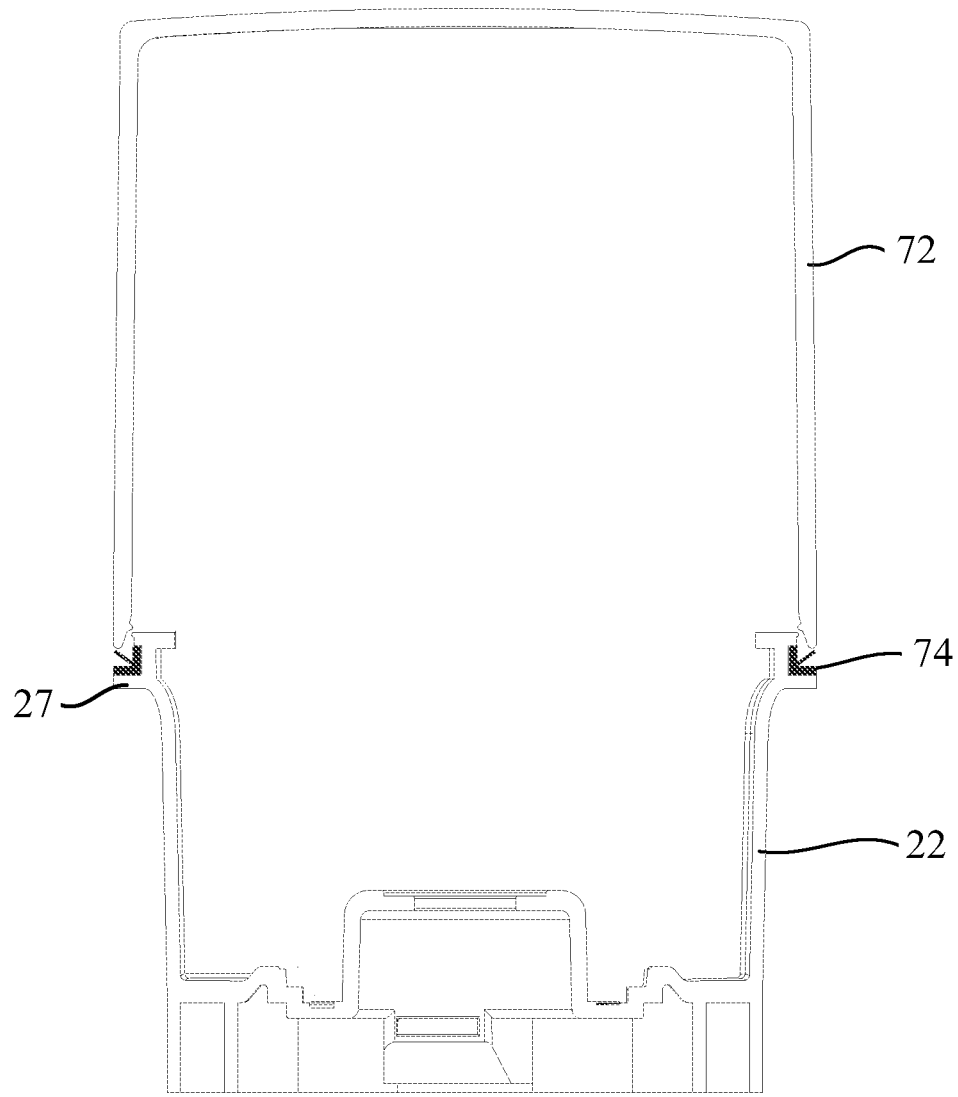
FIG. 5 is a partial schematic structural diagram of the food processor provided in FIG. 4.
Figure 6:
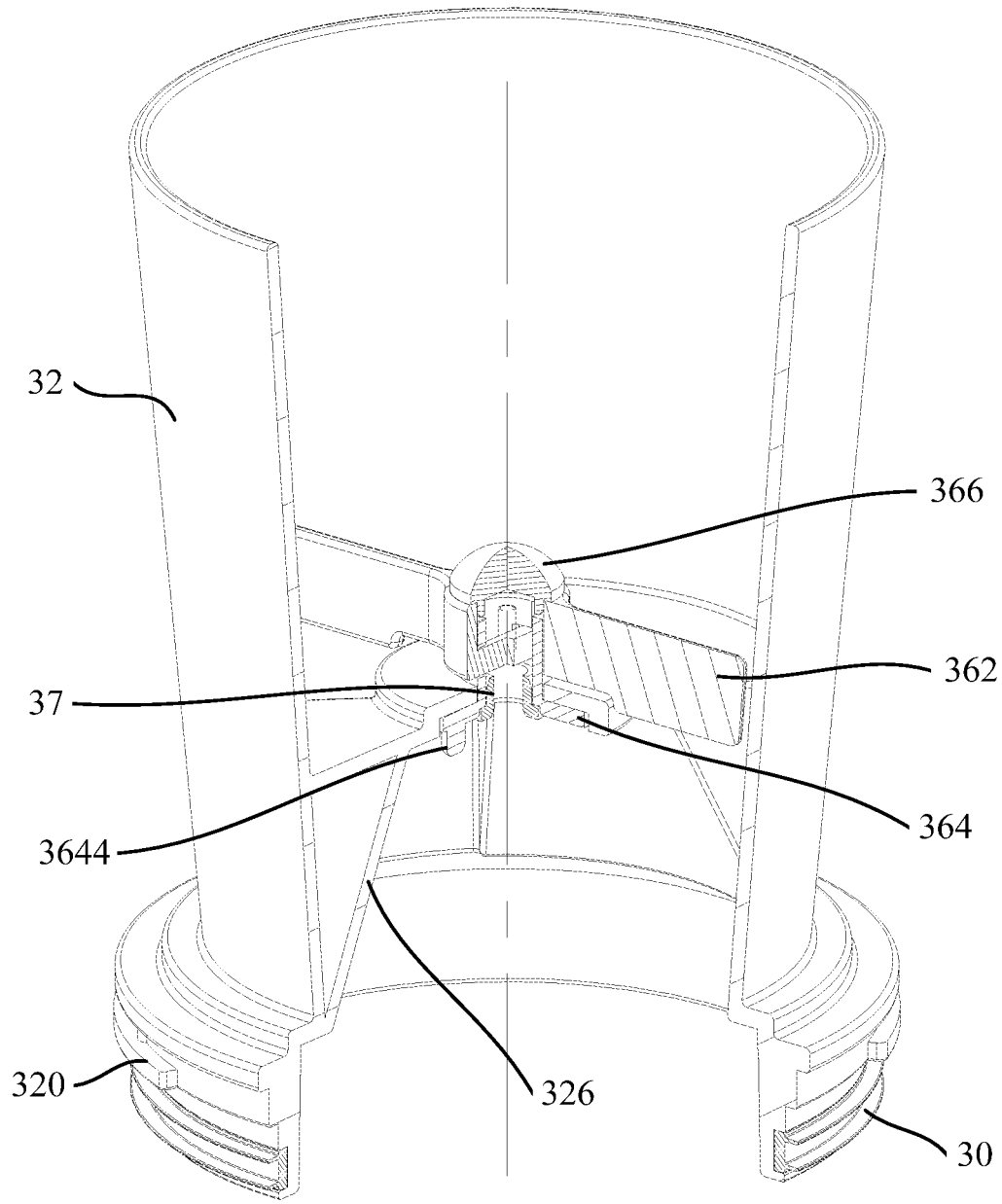
FIG. 6 is a schematic structural diagram of the feeding assembly of the food processor according to an embodiment of the present disclosure.
Figure 7:
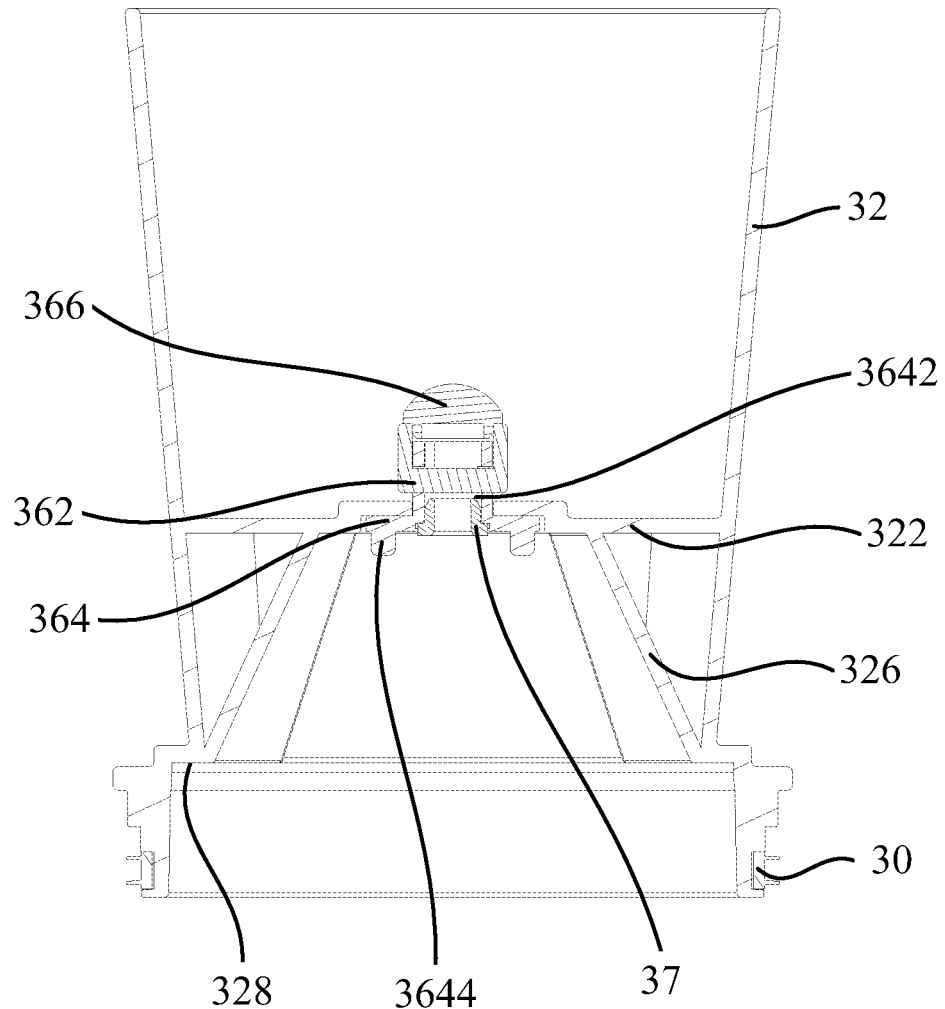
FIG. 7 is another schematic structural diagram of the feeding assembly of the food processor according to an embodiment of the present disclosure.
Figure 8:
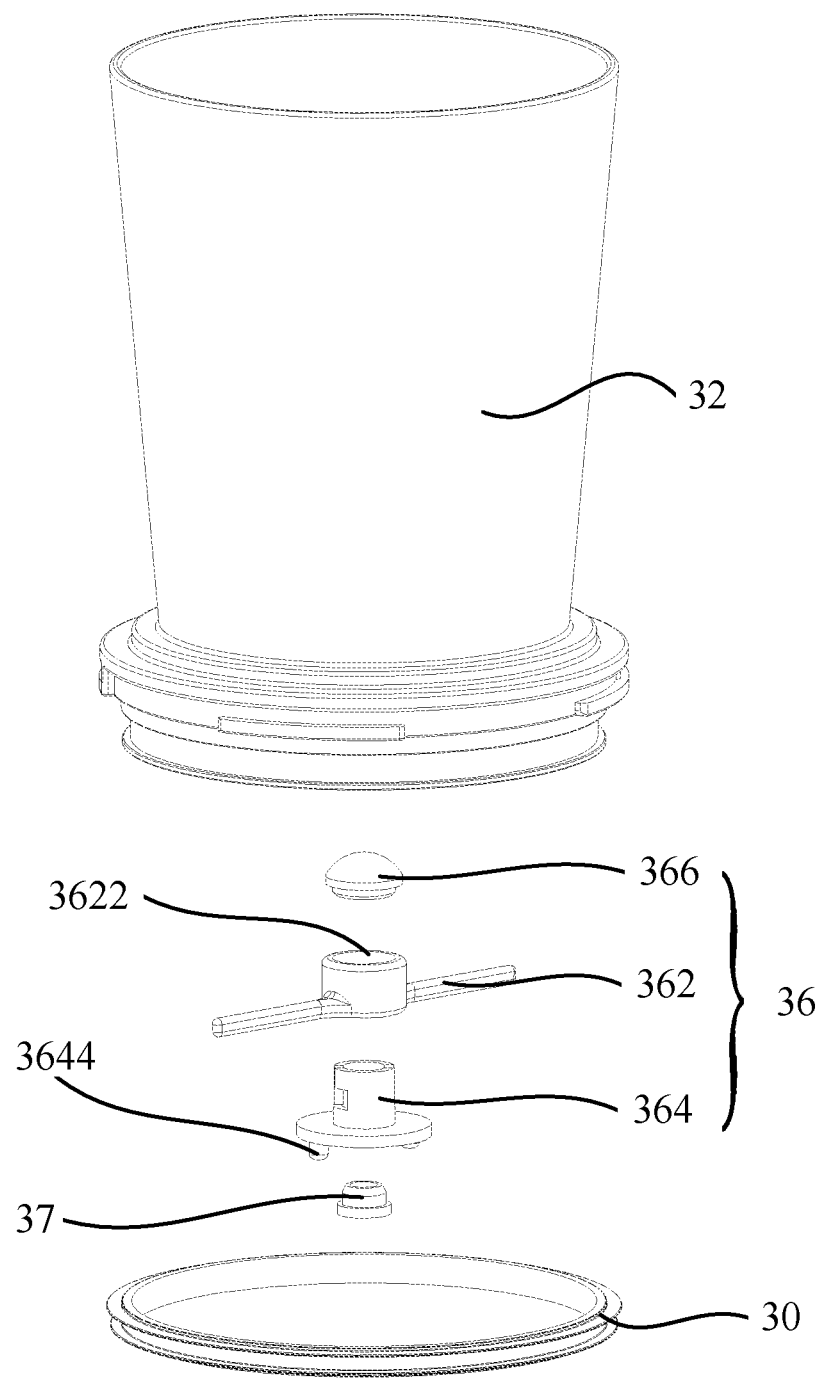
FIG. 8 is an exploded schematic structural diagram of the feeding assembly of the food processor according to an embodiment of the present disclosure.
Figure 9:
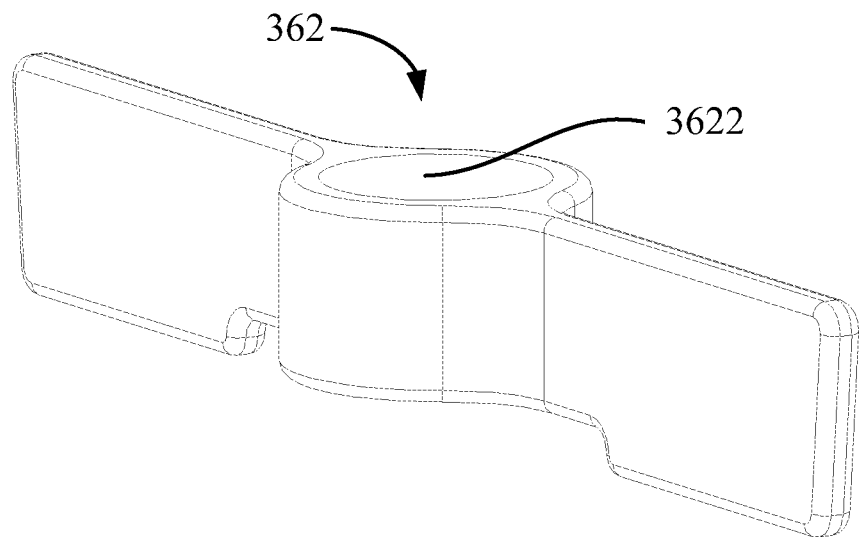
FIG. 9 is a schematic structural diagram of the first dial of the feeding assembly according to an embodiment of the present disclosure.
Figure 10:
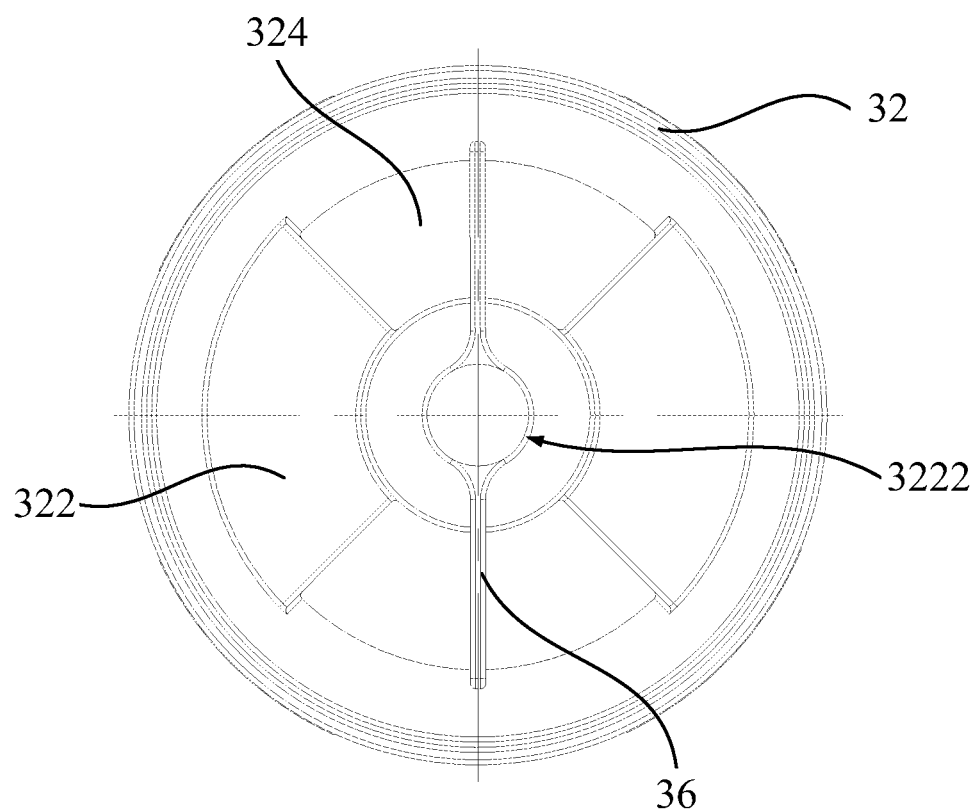
FIG. 10 is further another schematic structural diagram of the feeding assembly of the food processor according to an embodiment of the present disclosure.
Figure 11:
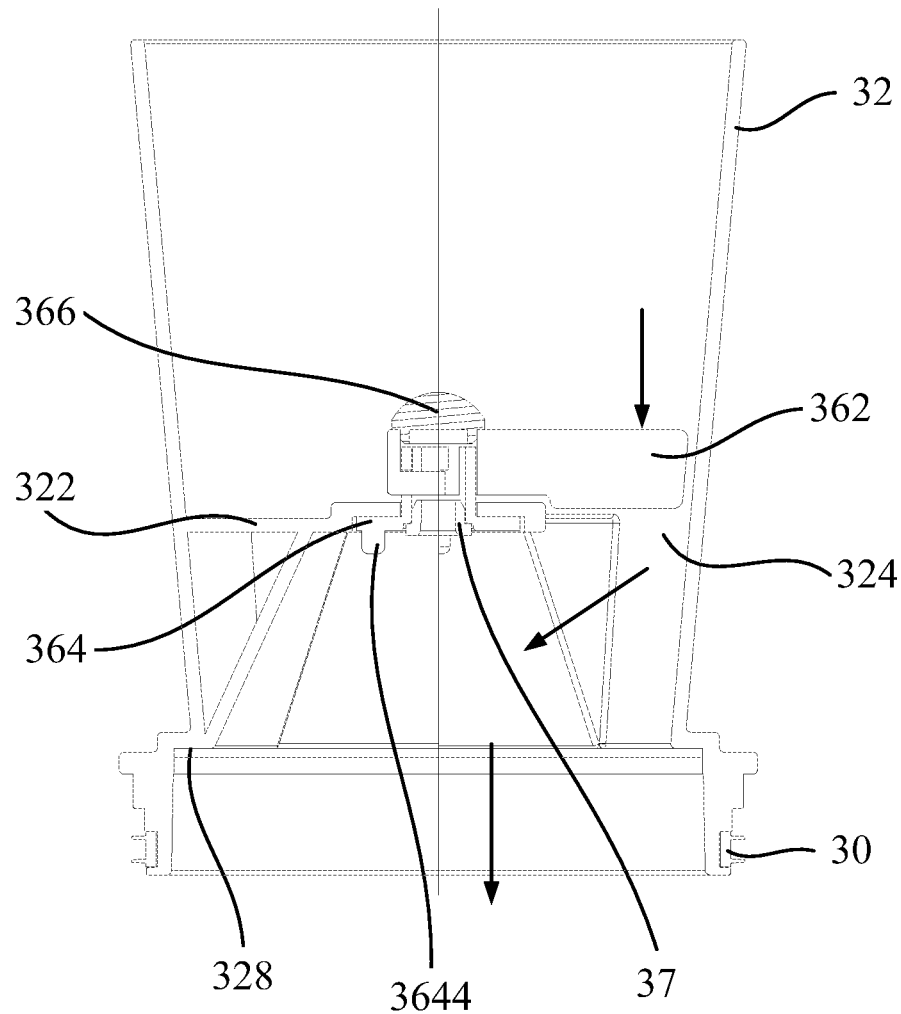
FIG. 11 is still another schematic structural diagram of the feeding assembly of the food processor according to an embodiment of the present disclosure.
Figure 33:
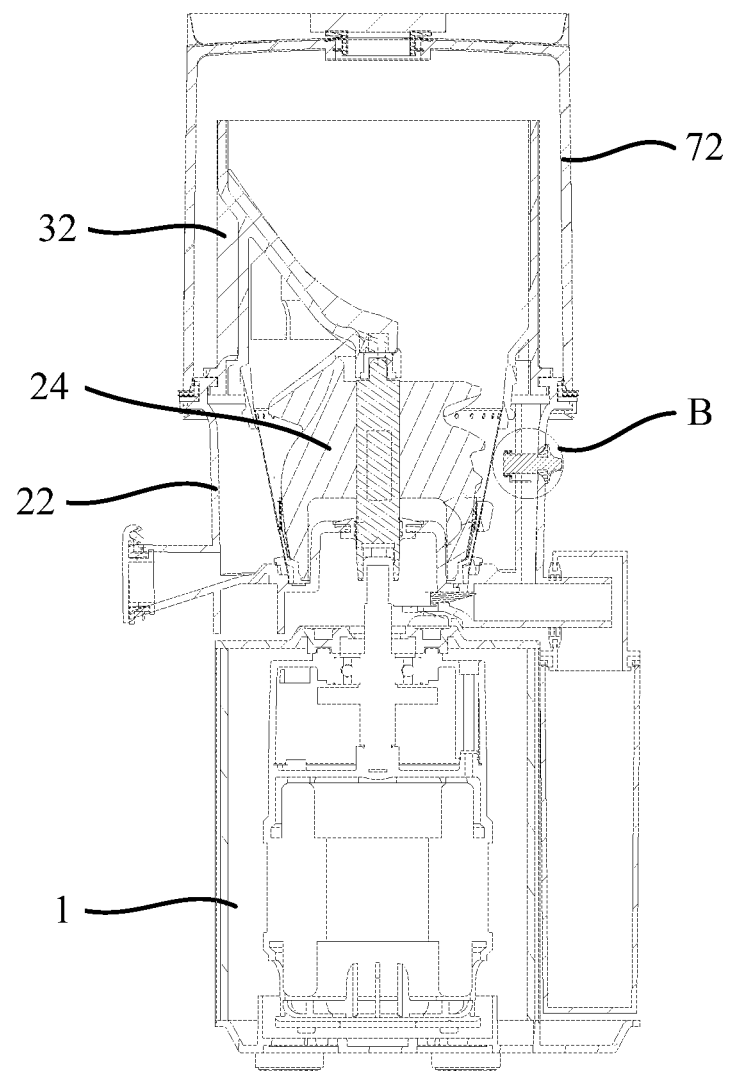
FIG. 33 is a sixth schematic structural diagram of the food processor according to an embodiment of the present disclosure.

In any of the above-mentioned embodiments, as shown in FIGS. 4, 5 and 33, the food processor further comprising: a cover body 72 covered and mounted outside the feeding barrel 32, one end of the cover body 72 is open, and the other end of the cover body 72 is closed, the open end of the cover body 72 is mounted on the cup body 22; a fourth seal 74 provided at the connection between the cover body 72 and the cup body 22, and making the connection between the cover body 72 and the cup body 22 a sealed connection; and a supporting structure 27 provided on an outer side wall of the cup body 22, and the open end of the cover body 72 is hermetically mounted on the supporting structure 27.

In these above-mentioned embodiments, the cover body 72 covers outside the feeding barrel 32 and hermetically mounted to the cup body 22, so that the feeding barrel 32 can be hermetically covered in the cover body 72, when the entire product is sealed for vacuum extraction, as long as the cover body 72 and the cup body 22 are hermetically connected, the cup body 22 and the cover body 72 can form a tightly sealed closed space, so that there is no need to seal the opening at the upper end of the feeding barrel 32 when vacuuming juice, and when the feeding barrel 32 and the cup body 22 are separate structures, there is no need to seal the connection between the feeding barrel 32 and the cup body 22, this reduces the number of places that need to be sealed and improve the sealing effect, so that the effect of vacuum juice extraction can be significantly improved, and the oxidation of food juice can be more significantly slowed down to ensure the taste of the squeezed food. In addition, this kind of structure only has an additional cover body 72 on the traditional food processor, so that the traditional form of the food processor can be retained to reduce manufacturing difficulty and improve product production efficiency, and remove the cover body 72 when vacuum juice extraction is not needed, its structure and use method are basically the same as those of the traditional juice machine, so that the food processor can perform vacuum juice extraction and ordinary juice extraction.

At the same time, a supporting structure 27 can be provided on the side wall of the cup body 22, so that the cover body 72 can cover part of the cup body 22, and can be hermetically mounted on the supporting structure 27 on the side wall of the cup body 22. In this kind of setting the cover body 72 is hermetically mounted to the supporting structure 27, so that the end face of the upper part of the cup body 22 can be reserved for mounting the feeding barrel 32, so that the feeding barrel 32 and the cover body 72 can be fixedly installed on different parts of the cup body 22 respectively, it can prevent the feeding barrel 32 and the cover body 72 from interfering, so that the overall structure and layout of the product can be more reasonable and compact.

In any of the above-mentioned embodiments, as shown in FIGS. 4, 5 and 33, a gap is provided between a top wall of the cover body 72 and an end surface of one end of the feeding barrel 32 away from the cup body 22; and/or a gap is provided between a side wall of the cover body 72 and a side wall of the feeding barrel 32.

In these above-mentioned embodiments, a gap is provided between a top wall of the cover body 72 and an end surface of one end of the feeding barrel 32 away from the cup body 22; and/or a gap is provided between a side wall of the cover body 72 and a side wall of the feeding barrel 32, so that the top and side walls of the cover body 72 are prevented from directly contacting the feeding barrel 32, the displacement of the feeding barrel 32 due to unbalanced force during pressing cannot be easily transmitted to the cover body 72, not to affect the overall sealing of the cover body 72 to the product, enabling the cover body 72 to always be reliably sealed with the cup body 22.

In any of the above-mentioned embodiments, the outer wall surface of the cup body 22 includes a plurality of the first planes disposed along an axial direction of the cup body 22, and a plurality of the first planes are spaced from each other along the circumferential direction of the cup body 22; and two adjacent first planes are connected by the first curved surface.

In these above-mentioned embodiments, the outer wall surface of the cup body 22 includes a plurality of first planes arranged along the axial direction of the cup body 22, so that the cup body 22 can be roughly formed into a polygon, which can make the cup body 22 closer to a square, and two adjacent first planes are connected by the first curved surface, which can make the side wall of the cup body 22 more smoothly connected. The cup body 22 is closer to a square, compared to the traditional round or conical cup, the square cup body 22 can make the positioning between the cover body 72 and the feeding barrel 32 more easily and convenient, and the circular or conical is symmetrical structure, so that the positioning direction of the cup cannot be quickly identified during installation, the user needs to distinguish carefully to find the positioning direction, and the square cup can refer to the length and width, the positioning direction can be found faster and easier when positioning, which can make the positioning between the cup body 22, the feeding barrel 32 and the cover body 72 easier and more intuitive, making the product more convenient to use.

In any of the above-mentioned embodiments, as shown in FIGS. 4, 5 and 33, the top wall of the cover body 72 is arc-shaped; and/or rounded corners are provided on the edge of the outer surface of the top wall of the cover body 72; and/or the side wall of the cover body 72 includes four of second curved surfaces pairwise arranged opposite to each other and evenly distributed along the circumferential direction of the cover body 72, and four of the second curved second surfaces are provided at intervals from each other and two adjacent second curved surfaces are connected by a third curved surface.

In these above-mentioned embodiments, the top wall of the cover body 72 can be flat or curved, and an arc design is according to one embodiment, because this setting can effectively prevent the cover body 72 from being deformed due to internal negative pressure, specifically, for example, the outer wall can resist compression and the inner wall can resist stretching, so that the deformation of the cover body 72 can be reduced and the force applied by the vacuum negative pressure to the cover body 72 can be reduced when the product is working. Similarly, the side wall of the cover body 72 can also be set as an arc shape, for example, the four curved surfaces of the front, back, left, and right sides of the cover body 72 can be set as the second curved surface, and set four third curved faces on the four corners of front, back, left and right, which can improve the pressure resistance of the cover body 72's sidewall and increase the strength of the cover body 72's sidewall. A rounded corner is provided on the edge of the outer surface of the top wall of the cover body 72, which can make the structure of the cover body 72 smoother, further improving the overall strength of the cover body 72.

In any of the above-mentioned embodiments, the top wall of the cover body 72 is a plane, and the side wall of the cover body 72 includes a plurality of the second planes spaced apart along the circumferential direction of the cover body 72, and two adjacent second planes are connected by a fourth curved surface, and the fourth curved surface is a circular-arc surface with the center of the top wall of the cover body 72 as a circle center.

In these above-mentioned embodiments, the top of the cover body 72 can also be set as a plane, so that when the cover body 72 is set as transparent, light can be incident and reflected in parallel, avoiding the user from deforming and distorting images when watching through the cover body 72, which can ensure the user's viewing experience. Similarly, several side walls of the cover body 72 can also be roughly set as planes to ensure that the sample light can enter and reflect from the side walls in parallel, avoiding the user from deforming and distorting images when watching through the cover body 72. By setting the arc surface can make the smooth connection between the side walls of the cover body 72, which can make the structure of the cover body 72 smoother, the arc surface on the side wall is a circular arc centered on the center of the top wall of the cover body 72, which can further ensure that the image is not deformed when the internal juice extraction process is viewed through the top of the cover body 72. At this time, the side wall of the cover body 72 can be set as an arc-shaped or arc-like structure, so that the structure of the cover body 72 can be made smoother, and the strength and anti-deformation ability of the cover body 72 can also be improved.

In any of the above-mentioned embodiments, the wall thickness of the cover body 72 at each position is equal; and/or the cover body 72 is a transparent cover; and/or the wall thickness of the cover body 72 is greater than or equal to 2 mm and less than or equal to 4 mm; and/or the cover body 72 is an axisymmetric structure; and/or the end surface of the open end of the cover body 72 is camber or arc-shaped.

In these above-mentioned embodiments, the wall thickness of the cover body 72 at each position is equal, so that the cover body 72's force capacity is consistent everywhere, so that the force can be uniform, and the situation of weak parts of the force can be prevented, at the same time, the equal wall thickness of the cover body 72 at various locations also makes the structure of the cover body 72 simpler, so that the cover body 72 can process better. The cover body 72 can be a transparent cover body 72, specifically, for example, the cover body 72 can be processed by using transparent materials such as transparent polycarbonate and Plexiglass, so that when the product is working, the user can watch the inside situation of the cover body 72 through the cover body 72, can enhance the user experience. The wall thickness of the cover body 72 is greater than or equal to 2 mm and less than or equal to 4 mm, so that the thickness of the cover body 72 is not too thick or too thin. The cover body 72 is an axisymmetric structure, which can further simplify the structure of the cover body 72, and thus further increase the strength of the cover body 72. The end surface of the open end of the cover body 72 is camber or arc-shaped, which makes the end surface of the open end of the cover body 72 smooth, so that when the end surface of the cover body 72 is sealed, the cover body 72 and the first seal 28 are bonded better to ensure the sealing effect and prevent the cover body 72 from piercing the seal.

In any of the above-mentioned embodiments, as shown in FIGS. 1-17, the auxiliary feeding device is drivingly connected to the working screw 24 and can be rotated under the action of the working screw 24.

In these above-mentioned embodiments, the auxiliary feeding device can be drivingly connected to the working screw 24, so that the auxiliary feeding device can be driven by the working screw 24, so that an additional mechanism for driving the auxiliary feeding device is not required, so it can simplify the structure of the product and reduce the costs of the product. Of course, the auxiliary feeding device cannot be connected to the working screw 24, at this time, an additional driving member can be provided to realize the driving of the auxiliary feeding device.

In any of the above-mentioned embodiments, as shown in FIGS. 6-13, a mounting plate 322 and a feeding inlet 324 are provided in the feeding barrel 32, the mounting plate 322 is mounted to the inner side wall of the feeding barrel 32, a first mounting hole 3222 is provided on the mounting plate 322, and one end of the auxiliary feeding device is located on a side of the mounting plate 322 away from the cup body 22, the working screw 24 is located on a side of the mounting plate 322 near the cup body 22, and the other end of the second auxiliary feeding device 38 is inserted into the first mounting hole 3222 and drivingly connected to the working screw 24, and the feeding inlet 324 is provided on the mounting plate 322 or the feeding inlet 324 is surrounded by the mounting plate 322 and a side wall of the feeding barrel 32.

In these above-mentioned embodiments, a mounting plate 322 can be provided in the feeding barrel 32, so that the supporting installation of the auxiliary feeding device can be achieved through the mounting plate 322, on the other hand, a portion of the food materials can be stored through the mounting plate 322. In addition, the mounting plate 322 can be used to cut food materials together with the auxiliary feeding device so that the food materials can be processed into small pieces in advance. Specifically, for example, during the rotation process, the auxiliary feeding device can drive the food materials to move together, and when the processed food materials are large, the food materials will be partially stuck in the feeding inlet 324, but the auxiliary feeding device will continue to rotate, so the food materials can be squeezed between the auxiliary feeding device and the edge of the feeding inlet 324, so that a pressing force can be applied to the food materials, so that the food materials can be squeezed into small pieces to achieve the initial processing of food materials. In addition, a cutting edge can be provided on the auxiliary feeding device so that food materials can be cut by the cutting edge. In one embodiment, the feeding inlet 324 can be directly set on the mounting plate 322, or it can be enclosed by the side walls of the mounting plate 322 and the feeding barrel 32.

In any of the above-mentioned embodiments, as shown in FIGS. 6-13, the auxiliary feeding device comprises a first auxiliary feeding device 36, and the first auxiliary feeding device 36 comprises: a first dial 362 can be rotatably mounted on a side of the mounting plate 322 away from the cup body 22; and a first drive shaft 364, one end of the first drive shaft 364 is drivingly connected to the working screw 24, and the other end of the first drive shaft 364 is inserted into and passed through the first mounting hole 3222 to be drivingly connected to the first dial 362.

In these above-mentioned embodiments, a first dial 362, such as a rotatable dial sheet, a dial lever, can be provided above the mounting plate 322, and drivingly connected to the working screw 24 through the first drive shaft 364, so that when the working screw 24 is rotating, the first dial 362 can be driven to rotate, so that the food materials placed in the feeding barrel 32 can be moved from the feeding inlet 324 into the cup body 22 by the movement of the first dial 362, and when the processed food materials are larger, the food materials will be partially stuck in the feeding inlet 324 but the first dial 362 will continue to rotate, therefore, the food materials can be squeezed between the edge of the first dial 362 and the feeding inlet 324, so that a pressing force can be applied to the food materials, so that the food materials can be squeezed into small pieces to achieve the preliminary processing of the food materials. In addition, a cutting edge can be set on the first dial 362 so that the cutting of the food materials can be achieved by the cutting edge. In this way, by setting the first dial 362, processing such as cutting and dialing of food materials can be realized, increasing the feeding speed of food materials, preventing the feeding barrel 32 from being blocked, and improving the processing efficiency of food materials.

In any of the above-mentioned embodiments, as shown in FIGS. 6-13, the first dial 362 is provided with a first through hole 3622, and one end of the first drive shaft 364 away from the working screw 24 is sequentially inserted into and passed through the first mounting hole 3222 and the first through hole 3622, and the first auxiliary feeding device 36 further includes: a sealing cover 366 mounted on one end of the first drive shaft 364 protruding from the first through hole 3622.

In these above-mentioned embodiments, the first dial 362 can be installed through the first through hole 3622 on the end of the first drive shaft 364 protruding from the first mounting hole 3222 and passed through the first dial 362, to improve the installation reliability between first dial 362 and the first drive shaft 364. By setting the sealing cover 366, the upper end of the first drive shaft 364 can be limited to the upper side of the first dial 362, so that the first drive shaft 364 can be prevented from slipping out of the first through hole 3622, which can further improve the connection reliability between the first dial 362 and the first drive shaft 364.

In any of the above-mentioned embodiments, as shown in FIGS. 6-13, at least one of a first driving protrusion 3644 is provided on the first drive shaft 364, and the driving protrusion 3644 can cooperate with the working screw 24 to rotate under the driving of the working screw 24.

In these above-mentioned embodiments, one or more of the first drive protrusions 3644 can be provided on the lower end surface of the first drive shaft 364, so that through the first drive protrusion 3644 match with the side of the upper end of the working screw 24 to achieve the drive connection between the working screw 24. Of course, the first drive shaft 364 can also be drivingly connected to the working screw 24 through other structures.

In any of the above-mentioned embodiments, as shown in FIGS. 6-13, the first dial 362 and the first drive shaft 364 are separate structures, or the first dial 362 and the first drive shaft 364 are an integrated structure.

In these above-mentioned embodiments, the first dial 362 and the first drive shaft 364 are separate structures, such as two parts, which facilitates separate maintenance and replacement of each part of the first dial 362 and the first drive shaft 364 separately. In some embodiments, the first dial 362 and the first drive shaft 364 can also be an integrated structure, so that the connection strength of the first dial 362 and the first drive shaft 364 can be improved, so that the first dial 362 and the first drive shaft 364 are not easily damaged, and the seamless connection between the first dial 362 and the first drive shaft 364 can be achieved, so that a gap can be prevented from being formed between the first dial 362 and the first drive shaft 364, which is convenient for cleaning.

In one embodiment, the first dial 362 is mounted symmetrically on the first drive shaft 364. This arrangement can make the structure of the product more reasonable and compact, and can also make the structure of the product simpler.

In any of the above-mentioned embodiments, as shown in FIGS. 6-13, the feeding inlet 324 is surrounded by the mounting plate 322 and the side wall of the feeding barrel 32, and the number of the feeding inlet 324 is two, two of the feeding inlets 324 and the mounting plate 322 are all symmetric about the axis of the feeding barrel 32.

In these above-mentioned embodiments, the feeding inlet 324 may be surrounded by the mounting plate 322 and the side wall of the feeding barrel 32, which can simplify the structure of the mounting plate 322 and reduce costs. The number of the feeding inlet 324 is possibly two, which can make each feeding inlet 324 larger, which is convenient for the product to process some large pieces of food materials. Two of the feeding inlets 324 and the mounting plate 322 are symmetrical about the axis of the feeding barrel 32, so that the mounting portion can be mounted just to the center of the working screw 24, and the interior of the feeding barrel 32 can be made more reasonable and compact.

In one embodiment, the mounting plate 322 is composed of a circular plate and two fan-shaped plates symmetrically disposed on both sides of the circular plate, and the first mounting hole 3222 is disposed in the middle of the circular plate.

Figure 12:
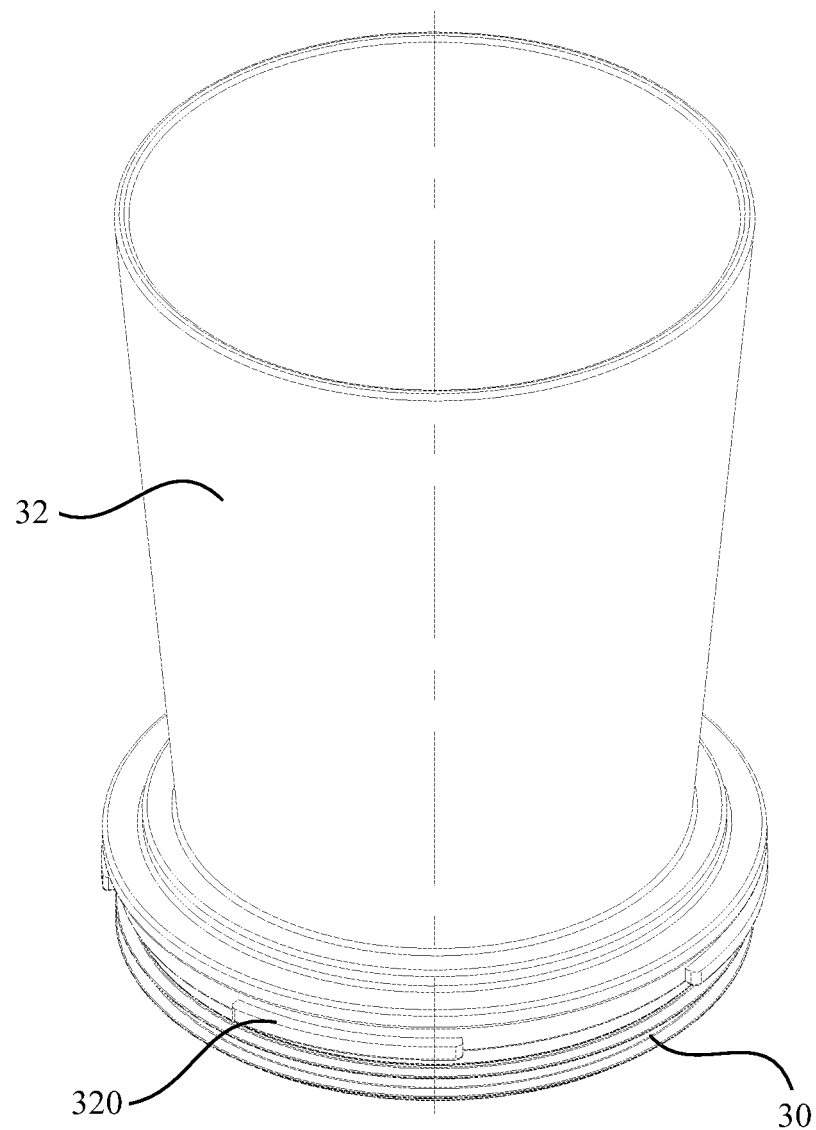
FIG. 12 is a fifth schematic structural diagram of the feeding assembly of the food processor according to an embodiment of the present disclosure.
Figure 13:
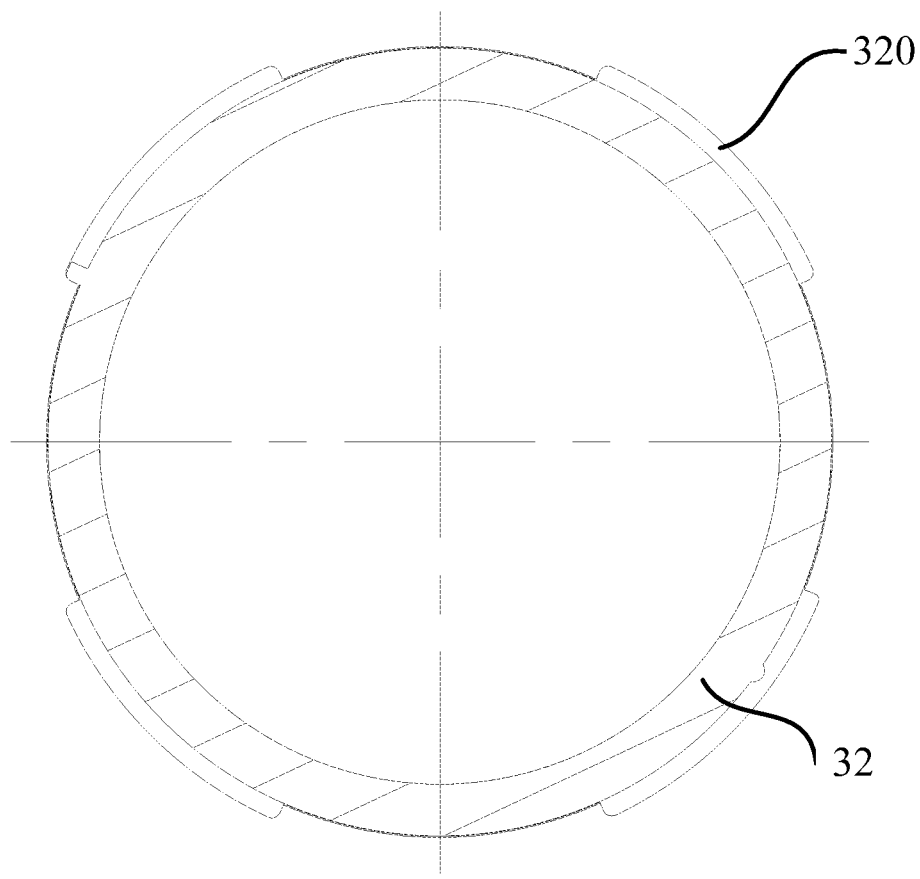
FIG. 13 is a schematic structural diagram of a cross section of the feeding assembly of the food processor according to an embodiment of the present disclosure.
Figure 14:
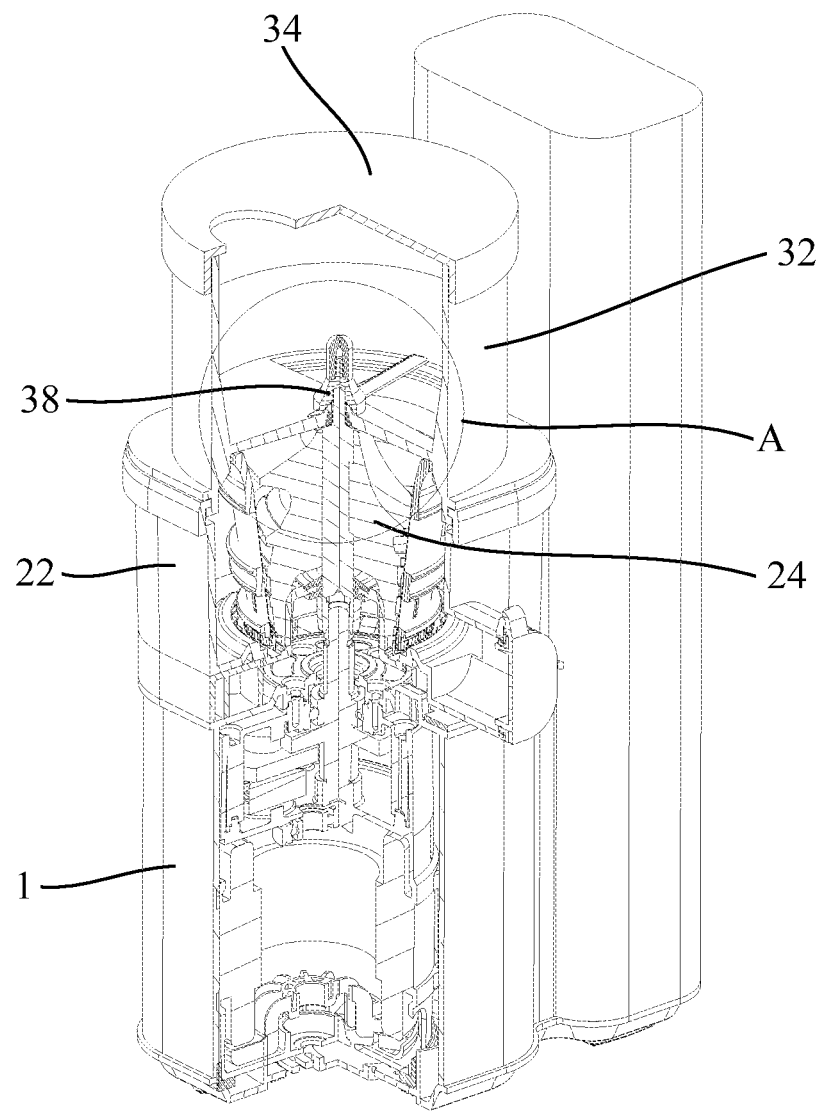
FIG. 14 is a fifth schematic structural diagram of the food processor according to an embodiment of the present disclosure.
Figure 15:
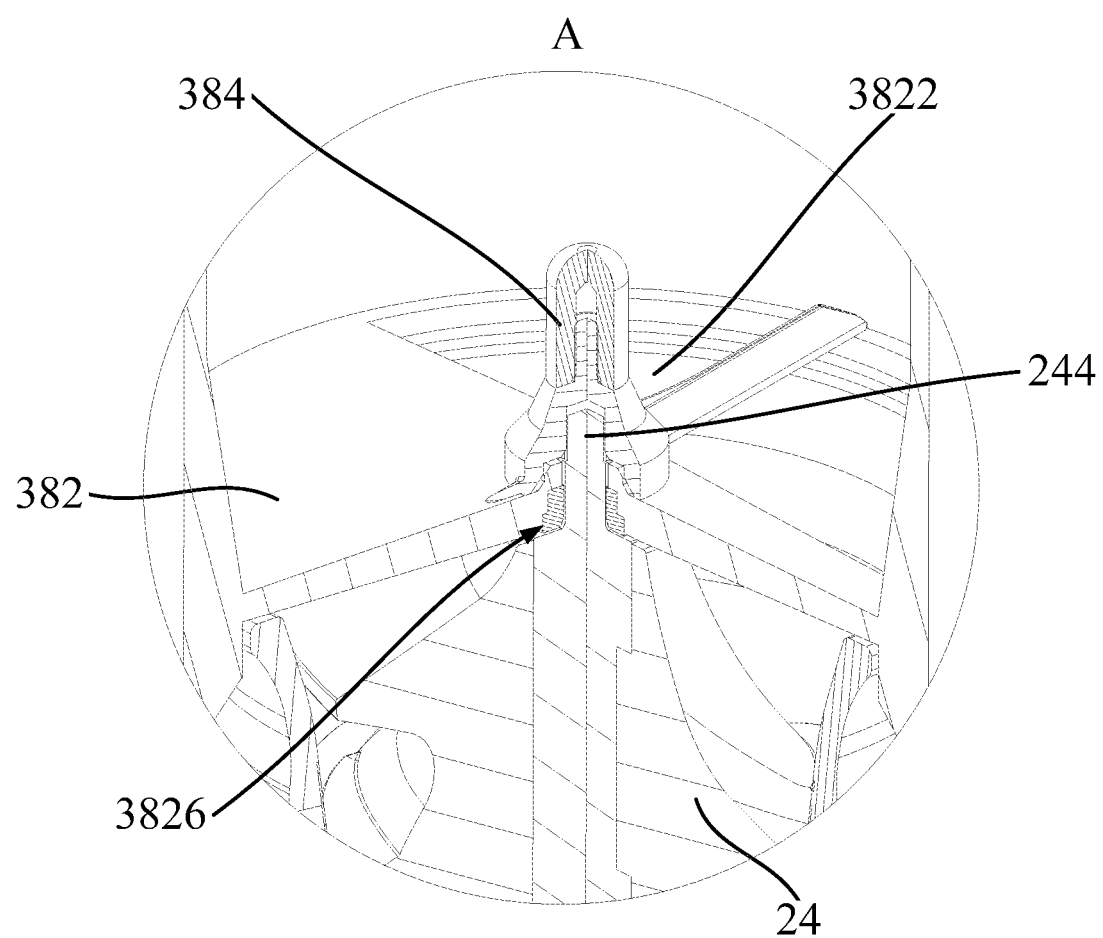
FIG. 15 is a partially enlarged schematic structural diagram of A of the food processor in FIG. 14.

In any of the above-mentioned embodiments, as shown in FIG. 12, the feeding barrel 32 is straight.

In these above-mentioned embodiments, the feeding barrel 32 is possibly straight, that is, the feeding barrel 32 is not bent, so that food materials can flow smoothly from top to bottom. Of course, the feeding barrel 32 can also be bent. In one embodiment, the inner wall and outer wall of the feeding barrel 32 are both arranged vertically.

In any of the above-mentioned embodiments, as shown in FIGS. 6-13, the first dial 362 is a dial lever or a dial sheet.

In these above-mentioned embodiments, the shape of the first dial 362 can be arbitrarily set, it can be a dial lever or a dial sheet.

In any of the above-mentioned embodiments, as shown in FIGS. 6-13, the first drive shaft 364 is provided with one of a first positioning groove 3642 and a first positioning protrusion 242, the working screw 24 is provided with the other one of the first positioning groove 3642 and the first positioning protrusion 242, and the first positioning protrusion 242 can be inserted into the first positioning groove 3642 to position the working screw 24; and the first wear part is provided in the first positioning groove 3642.

In these above-mentioned embodiments, a first positioning protrusion 242 or a first positioning groove 3642 or positioning hole may be provided on the upper end surface of the working screw 24, and a first positioning protrusion 242 or a first positioning groove 3642 or positioning hole may be correspondingly provided on the lower end surface of the first drive shaft 364, so that the positioning of the working screw 24 can be achieved through the cooperation of the first positioning protrusion 242 and the positioning hole or the first positioning protrusion 242 and the positioning shaft, improving the stability of the working screw 24 after installation and reducing the shaking of the working screw 24. By setting the first wear part in the first positioning groove 3642, the wear between the first positioning protrusion 242 and the first positioning groove 3642 can be reduced.

In any of the above-mentioned embodiments, as shown in FIGS. 6-13, a hollow pillar 326 with openings at both ends is provided on a side of the mounting plate 322 near the cup body 22, and the hollow pillar 326 communicates with the feeding inlet 324; one end of the working screw 24 extends from the bottom of the feeding barrel 32 into the hollow pillar 326 and can cooperate with the side wall of the hollow pillar 326 to crush food materials, and one end of the hollow pillar 326 away from the mounting plate 322 is connected to the side wall of the feeding barrel 32, or one end of the hollow pillar 326 away from the mounting plate 322 is suspended.

In these above-mentioned embodiments, one hollow pillar 326 that can communicate with the feeding inlet 324 can be set under the mounting plate 322, and the hollow pillar 326 can be sleeved and installed on the upper end of the working screw 24, so that after the food materials enter the lower part of the mounting plate 322 from the feeding inlet 324, the food materials can be extruded or cut under the effect of the side wall of the hollow pillar 326 and the working screw 24, that is, before the food materials enter the cup body 22, the food materials go through an additional crushing process, which can improve the processing effect of the product on food materials and increase the juice extraction rate. By setting the hollow pillar 326, the effective inner diameter of the lower end of the feeding barrel 32 can be reduced, and the channel formed between the working screw 24 and the side wall of the lower end of the feeding barrel 32 can be made smaller, so the processing power of food materials can be increased. In one embodiment, the end of the hollow pillar 326 away from the mounting plate 322 may be connected to the side wall of the feeding barrel 32, so that the hollow pillar 326 can further support the mounting plate 322, improving the strength of the mounting plate 322, in another embodiment, the end of the hollow pillar 326 away from the mounting plate 322 can also be suspended, that is, it is not connected to the side wall of the feeding barrel 32.

In one embodiment, the hollow pillar 326 is tapered. The upper end of the screw and other structures will increase in order from top to bottom; therefore, the hollow pillar 326 is set as tapered so that the hollow pillar 326 can be adapted to the upper end of the working screw 24, so that the working screw 24 can better cooperate with the hollow pillar 326 to achieve the processing of food materials.

Figure 38:
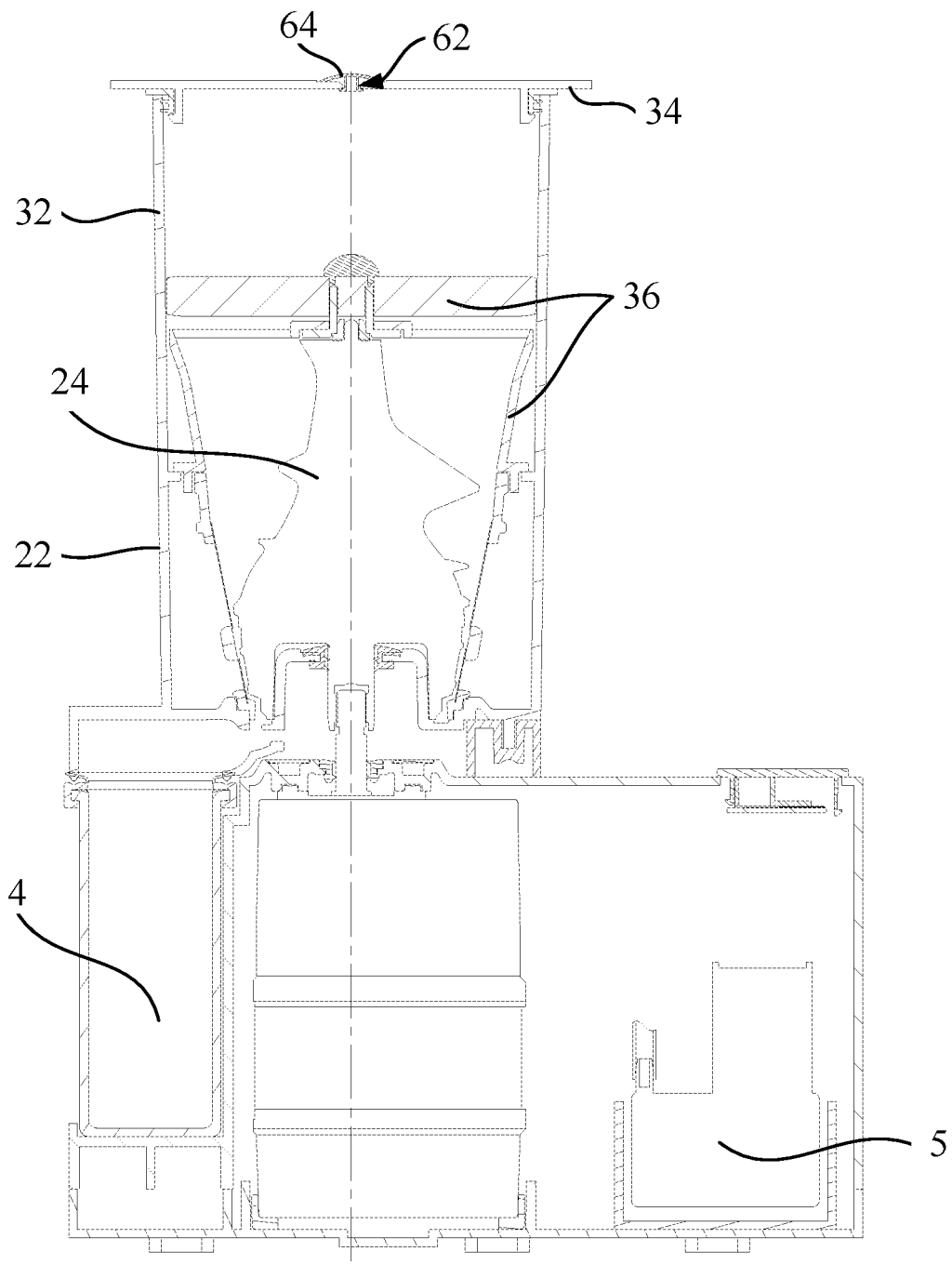
FIG. 38 is an eighth schematic structural diagram of the food processor according to an embodiment of the present disclosure.

In any of the above-mentioned embodiments, as shown in FIGS. 1, 37 and 38, the mounting plate 322 can be detachably mounted to an inner side wall of the feeding barrel 32, or as shown in FIGS. 1, 3, 7 11-17, the mounting plate 322 and the inner side wall of the feeding barrel 32 are an integrated structure.

In these above-mentioned embodiments, the mounting plate 322 can be detachably installed in the feeding barrel 32, so that the storage table 382 can be detached for cleaning the cup body 22 and the storage table 382, and at the same time, this setting can install the mounting plate 322 and the second dial 384 as a whole for installation, maintenance and sales. Of course, the mounting plate 322 and the inner wall of the feeding barrel 32 is also an integrated structure, that is, the mounting plate 322 can also be directly processed on the feed, which can enhance the connection strength of the mounting plate 322 and the feeding barrel 32.

In any of the above-mentioned embodiments, as shown in FIGS. 1, 3 and 4, the feeding barrel 32 can be detachably sealed and mounted to the cup mouth end of the cup body 22, or as shown in FIGS. 37 and 38 the feeding barrel 32 and the cup body 22 are an integrated structure.

In these above-mentioned embodiments, the feeding barrel 32 and the cup body 22 are an integrated structure, so that the feeding and processing of food materials can be achieved through a large cup, this kind of setting does not require an additional feeding barrel 32 or a structure similar to the feeding barrel 32 on the cup body 22 which can simplify the number of parts of the product, in addition, this structure has only one cup body 22, therefore, there is only one opening of the cup body 22, therefore, when sealing the cup, it is only necessary to seal the opening of the cup body 22, in the prior art, the connection between the cup body 22 and the feeding barrel 32 and the opening of the cup body 22 need to be sealed, so at least two places need to be sealed, therefore, compared with the prior art, this structure can also reduce the difficulty of sealing the product. At the same time, in the prior art, there is a possibility of leakage which is located at the connection between the cup body 22 and the feeding barrel 32 and at the opening of the cup body 22, and because the use of the feeding barrel 32 is removed in this application, the entire position of the side wall of the cup body 22 may be strictly sealed, so that the sealing performance of the product is relatively enhanced, so that the product can more effectively alleviate oxidation when the vacuum juice extraction is realized. The feeding barrel 32 and the cup body 22 can be detachably connected, so that the food materials can be crushed and the slag and juice of the food materials can be separated through the cup body 22, at the same time, the feeding barrel 32 can be used to add food materials to the cup body 22, this enables the feeding and processing of food materials to be divided into two cup bodies, which can reduce the height of each cup body 22, so that the product can be better processed and cleaned.

In any of the above-mentioned embodiments, as shown in FIGS. 15-18, the working screw 24 is provided with a first transmission structure 244, and the auxiliary feeding device includes a second auxiliary feeding device 38, and the second auxiliary feeding device 38 includes: a storage table 382 mounted in the feeding barrel 32, and the feeding table is provided with a feeding channel 3822; and a second dial 384 rotatably mounted in the feeding barrel 32, and located on a side of the storage table 382 away from the working screw 24, the second dial 384 is provided with a second transmission structure 3842, and the second transmission structure 3842 can cooperate with the first transmission structure 244 to drivingly connect the working screw 24 with the second dial 384.

In these above-mentioned embodiments, the storage table 382 is installed in the feeding barrel 32 for storing food materials, and the second dial 384 can be rotatably installed in the feeding barrel 32 and above the storage table 382, and when the second dial 384 during rotating, the food materials stored on the storage table 382 can be processed by extrusion, cutting, etc., and can be pushed into the feeding channel 3822 after processing such as extrusion, cutting, so that the food materials can enter the cup body 22, in this way, manual feeding can be avoided, so when the product is actually used, the user can put all the food materials into the feeding barrel 32 through the mouth of the feeding barrel 32 at one time and store it on the storage table 382, after that, the food materials can be automatically and gradually fed under the action of the second dial 384. By setting the first transmission structure 244 on the second dial 384 and setting the second transmission structure 3842 on the working screw 24, the cooperation between the first transmission structure 244 and the second transmission structure 3842 can be used to make the second dial 384 drivingly connected to the working screw 24 and rotating under the driving of the working screw 24, this driving method can realize the driving of the second dial 384 through the working screw 24, so that there is no need to provide an additional mechanism for driving the second dial 384, can simplify the structure of the product to reduce product costs. On the other hand, in this driving method, the working screw 24 and the second dial 384 are directly driven and connected through two transmission structures, so that the transmission can be made more stable, on the other hand, without using any other connection shaft and other structures, it can further simplify product structure and reduce product costs.

In any of the above-mentioned embodiments, the cup body 22 and the feeding barrel 32 are an integrated structure, or the cup body 22 and the feeding barrel 32 are separate structures, when the cup body 22 and the feeding barrel 32 are an integrated structure, the storage table 382 can be detachably mounted in the feeding barrel 32, when the cup body 22 and the feeding barrel 32 are separate structures, the storage table 382 can be detachably mounted in the feeding barrel 32, or the storage table 382 and the feeding barrel 32 are an integrated structure.

In these above-mentioned embodiments, the feeding barrel 32 and the cup body 22 are an integrated structure, so that the feeding and processing of food materials can be achieved through a large cup, this kind of setting does not require additionally set a structure similar to the feeding barrel 32 on the cup body 22 which can simplify the number of parts of the product, in addition, this structure has only one cup body 22, therefore, there is only one opening of the cup body 22, therefore, when sealing the cup, it is only necessary to seal the opening of the cup body 22, in the prior art, the connection between the cup body 22 and the feeding barrel 32 and the opening of the cup body 22 need to be sealed, so at least two places need to be sealed, therefore, compared with the prior art, this structure can also reduce the difficulty of sealing the product. At the same time, in the prior art, there is a possibility of leakage which is located at the connection between the cup body 22 and the feeding barrel 32 and at the opening of the cup body 22, and because the use of the feeding barrel 32 is removed in this application, the entire position of the side wall of the cup body 22 may be strictly sealed, so that the sealing performance of the product is relatively enhanced, so that the product can more effectively alleviate oxidation when the vacuum juice extraction is realized. The feeding barrel 32 and the cup body 22 can be detachably connected, so that the food materials can be crushed and the slag and juice of the food materials can be separated through the cup body 22, at the same time, the feeding barrel 32 can be used to add food materials to the cup body 22, this enables the feeding and processing of food materials to be divided into two cup bodies, which can reduce the height of each cup body 22, so that the product can be better processed and cleaned.

Meanwhile, when the feeding barrel 32 and the cup body 22 are set as a large cup, the storage table 382 can be detachably installed in the feeding barrel 32, so that the storage table 382 can be detached for cleaning the cup body 22 and the storage table 382. When the feeding barrel 32 and the cup body 22 are set as two cups, the storage table 382 can be detachably installed in the feeding barrel 32, or the storage table 382 can be integrally installed in the feeding barrel 32.

In any of the above-mentioned embodiments, as shown in FIGS. 15-18, the storage table 382 is provided with a second mounting hole 3824, the first transmission structure 244 is one of a transmission hole and a second drive shaft, and the second transmission structure 3842 is the other one of the transmission hole and the second drive shaft, the second drive shaft can be inserted into the transmission hole through the second mounting hole 3824, so that the working screw 24 is drivingly connected to the second dial 384.

Figure 17:
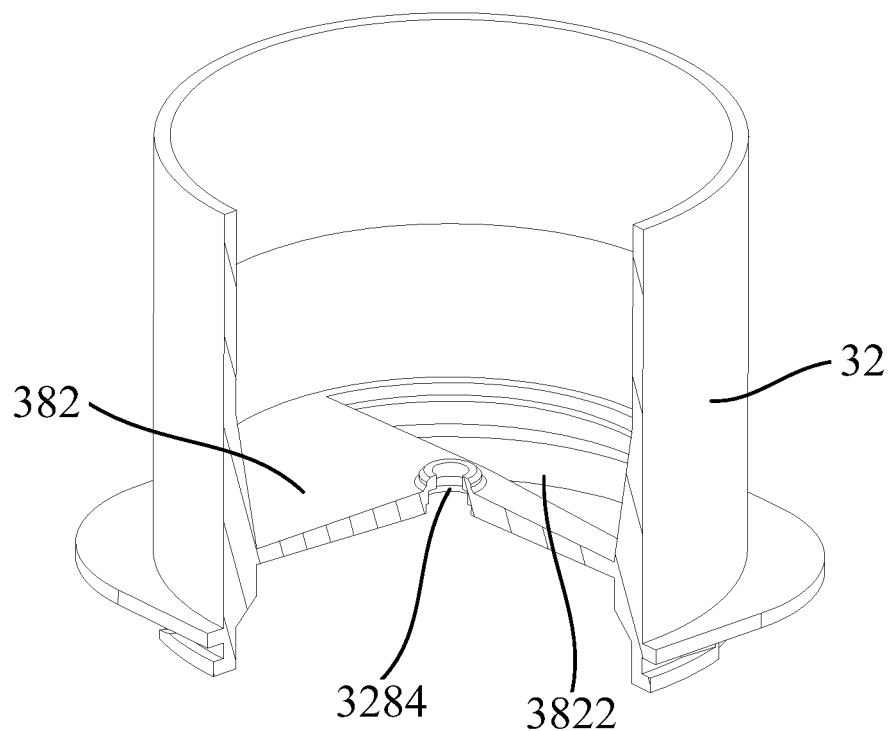
FIG. 17 is a partial schematic structural diagram of the feeding assembly of the food processor in FIG. 14.
Figure 18:
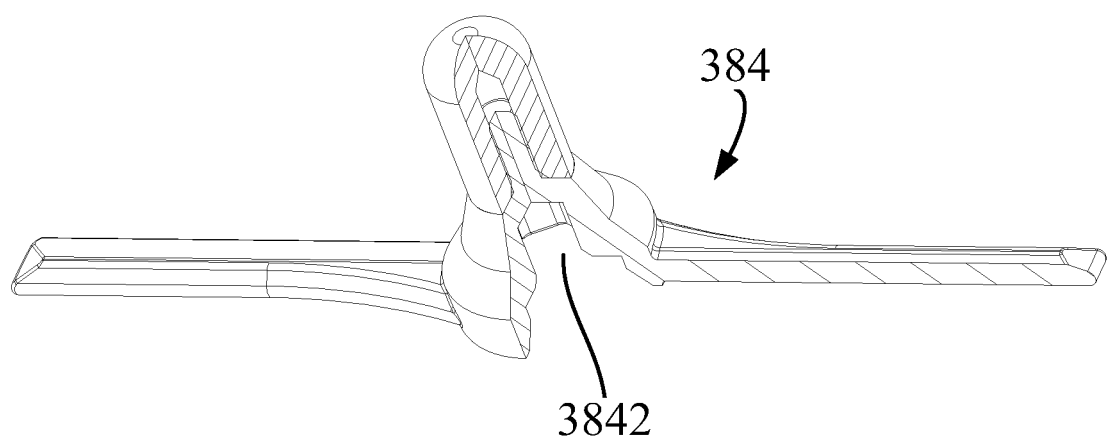
FIG. 18 is a schematic structural diagram of the second dial of the food processor in FIG. 14.
Figure 19:
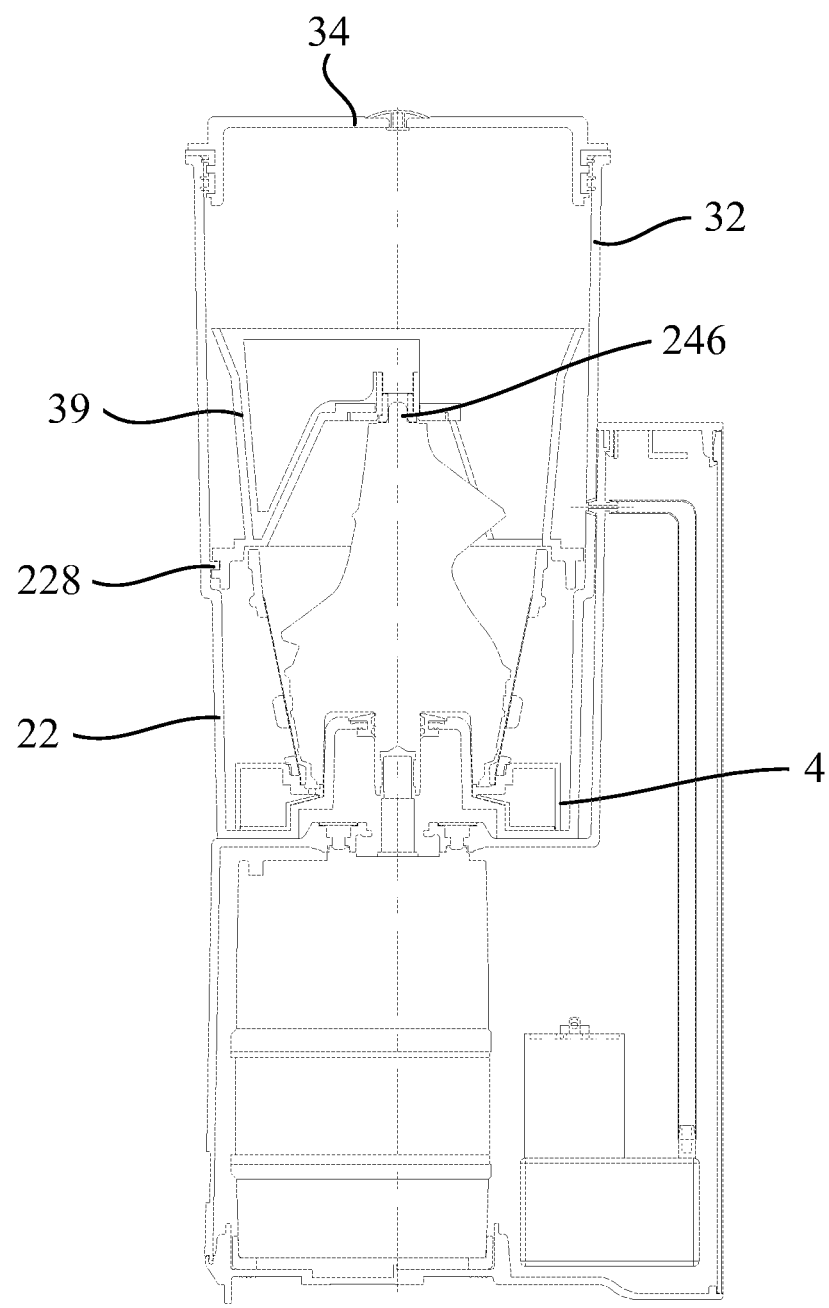
FIG. 19 is a schematic structural diagram of the food processor according to further another embodiment of the present disclosure.
Figure 20:
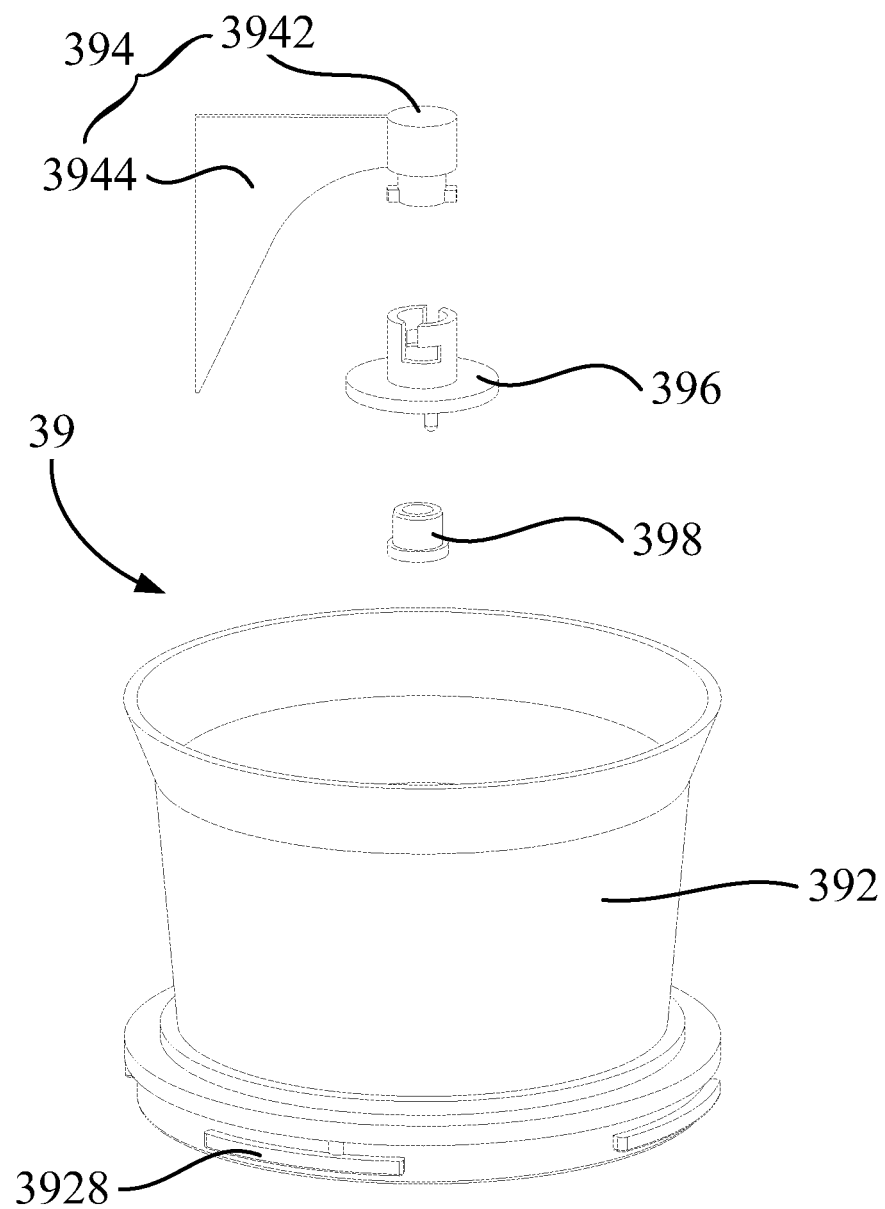
FIG. 20 is an exploded schematic structural diagram of the third auxiliary feeding device of the food processor according to an embodiment of the present disclosure.
Figure 21:
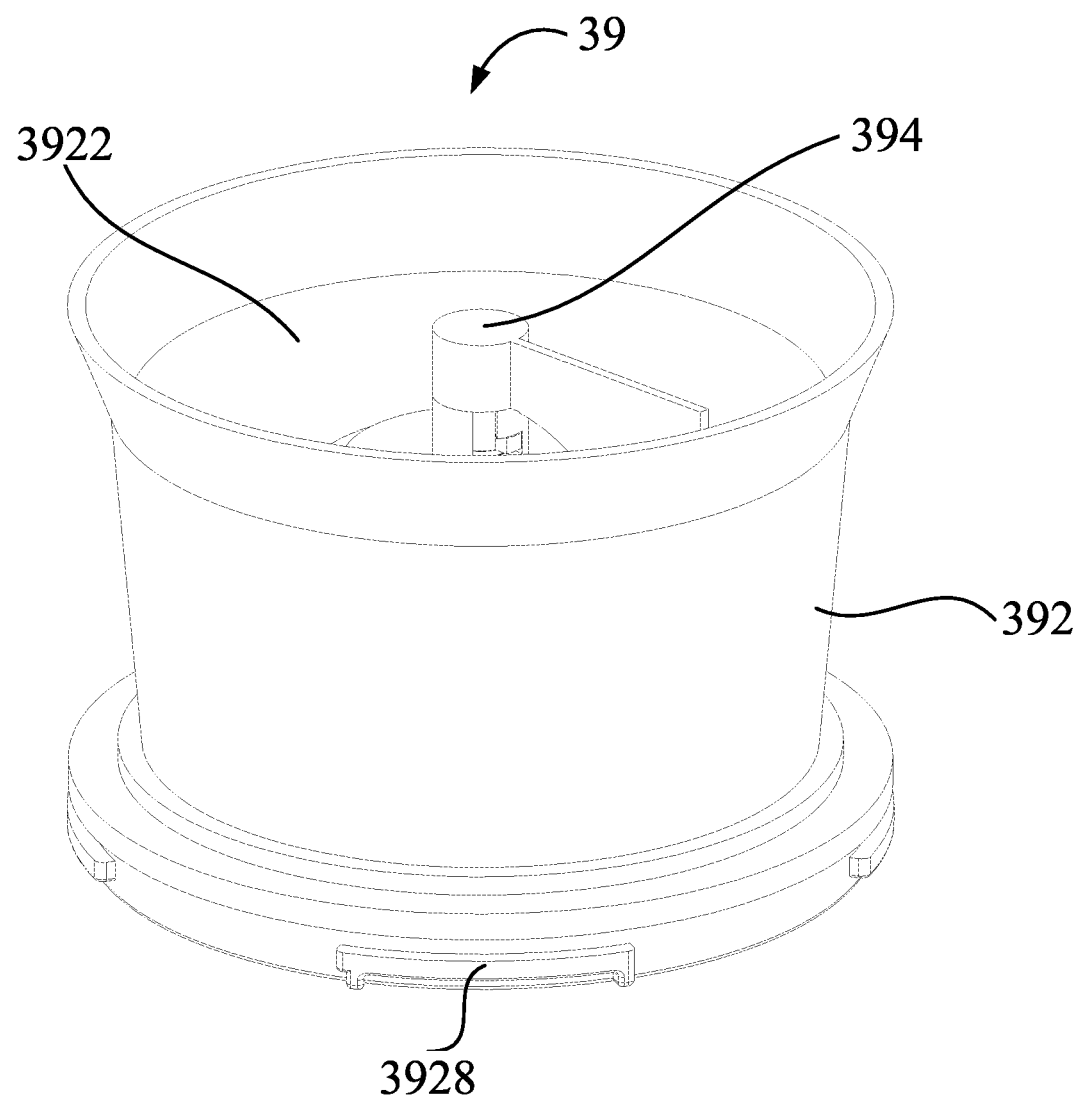
FIG. 21 is a schematic structural diagram of the third auxiliary feeding device of the food processor according to an embodiment of the present disclosure.
Figure 22:
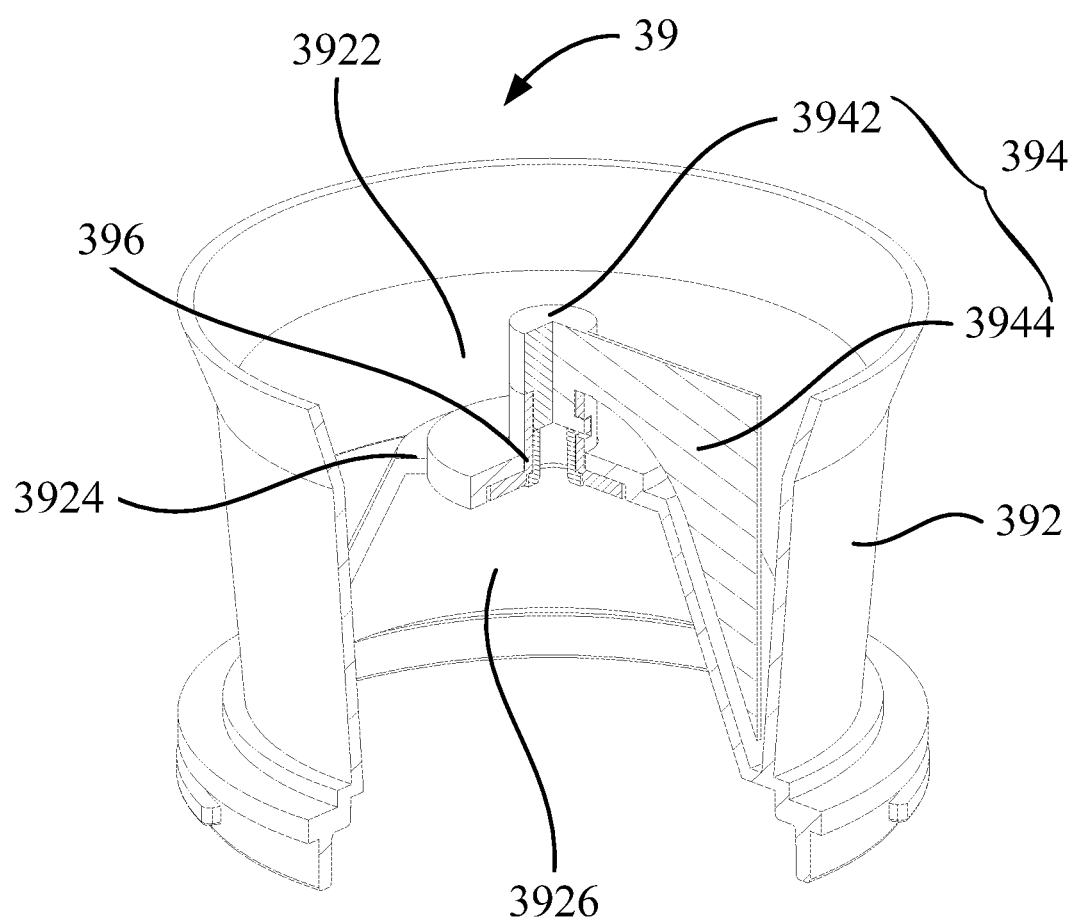
FIG. 22 is further another schematic structural diagram of the third auxiliary feeding device of the food processor according to an embodiment of the present disclosure.
Figure 23:
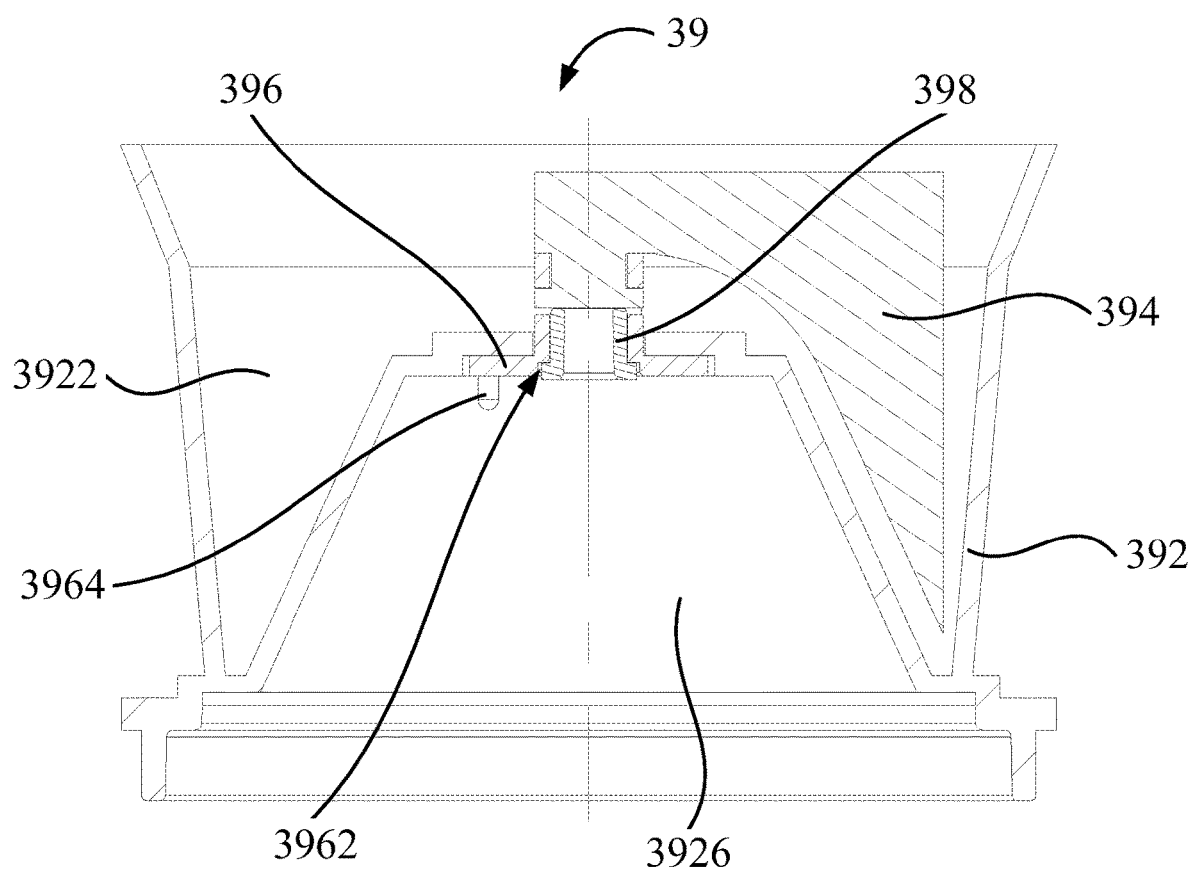
FIG. 23 is further another schematic structural diagram of the third auxiliary feeding device of the food processor according to an embodiment of the present disclosure.
Figure 24:
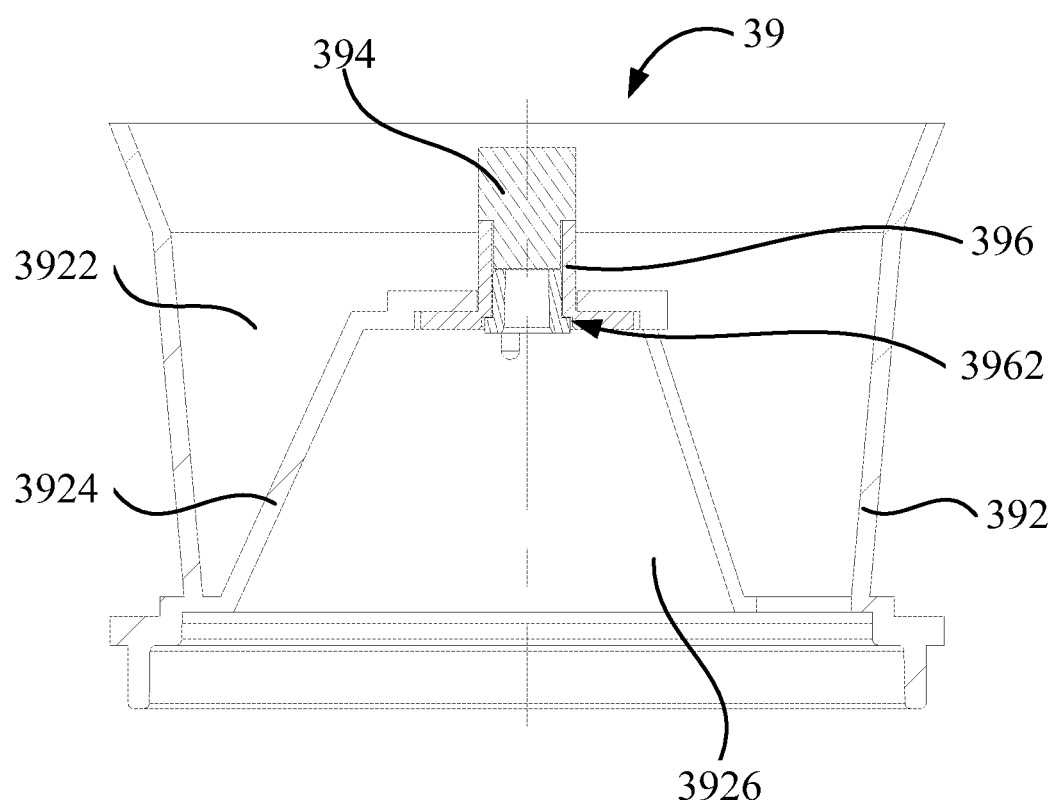
FIG. 24 is still another schematic structural diagram of the third auxiliary feeding device of the food processor according to an embodiment of the present disclosure.
Figure 25:
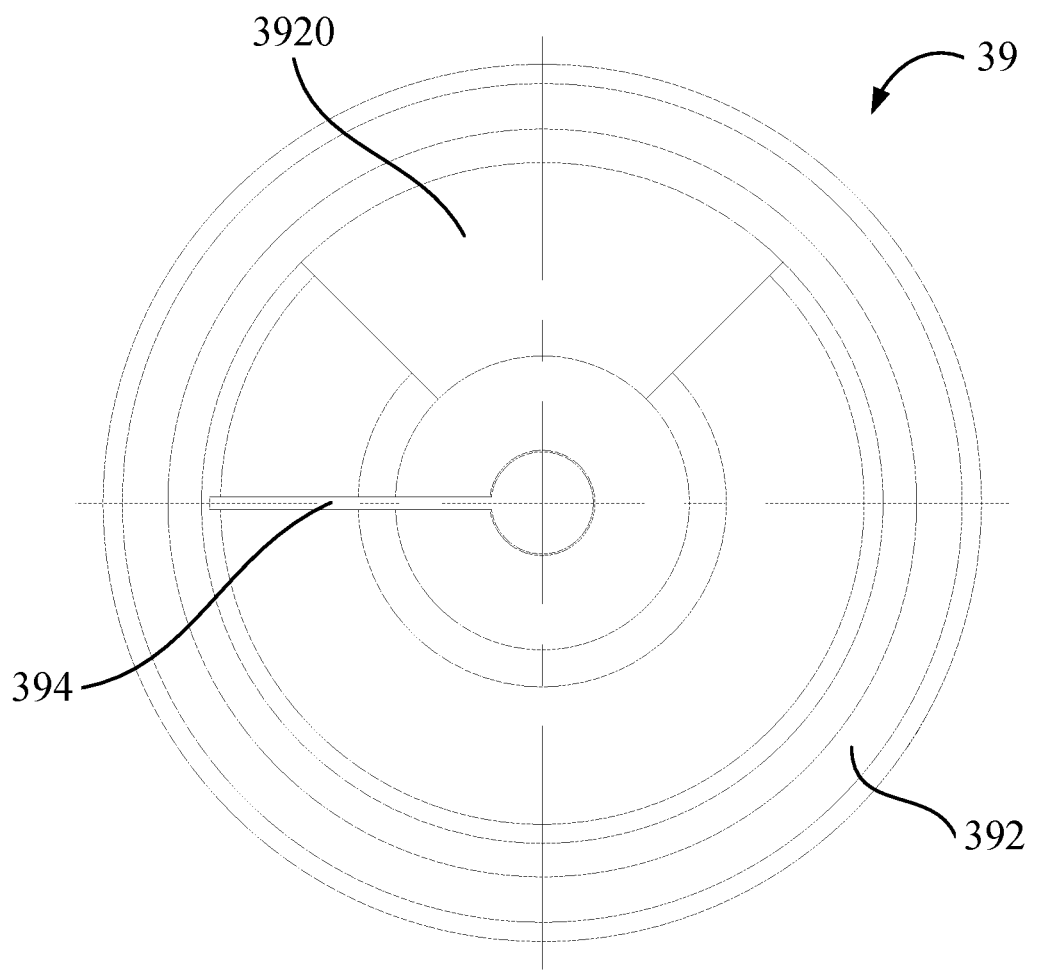
FIG. 25 is a fifth schematic structural diagram of the third auxiliary feeding device of the food processor according to an embodiment of the present disclosure.
Figure 26:
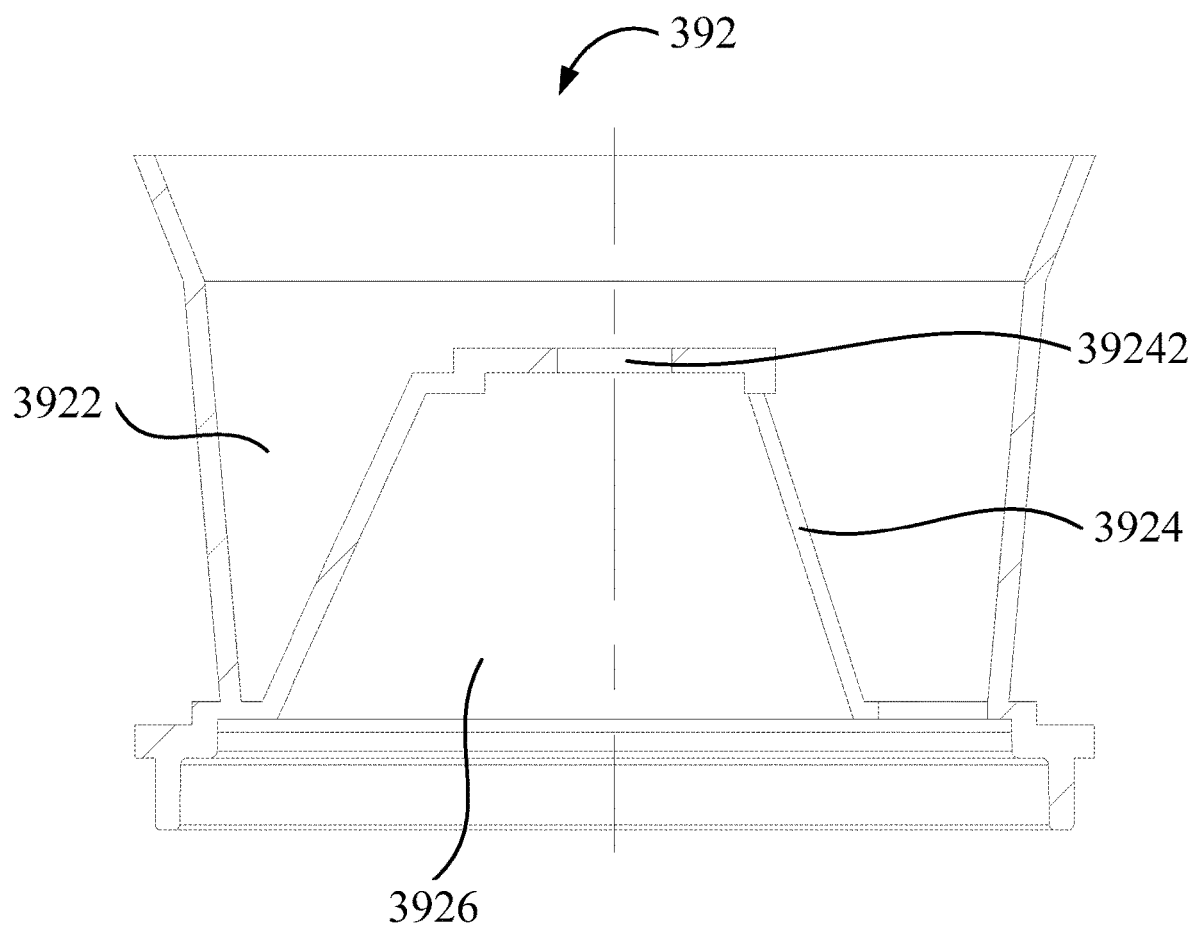
FIG. 26 is a schematic structural diagram of the storage base of the third auxiliary feeding device of the food processor according to an embodiment of the present disclosure.
Figure 27:
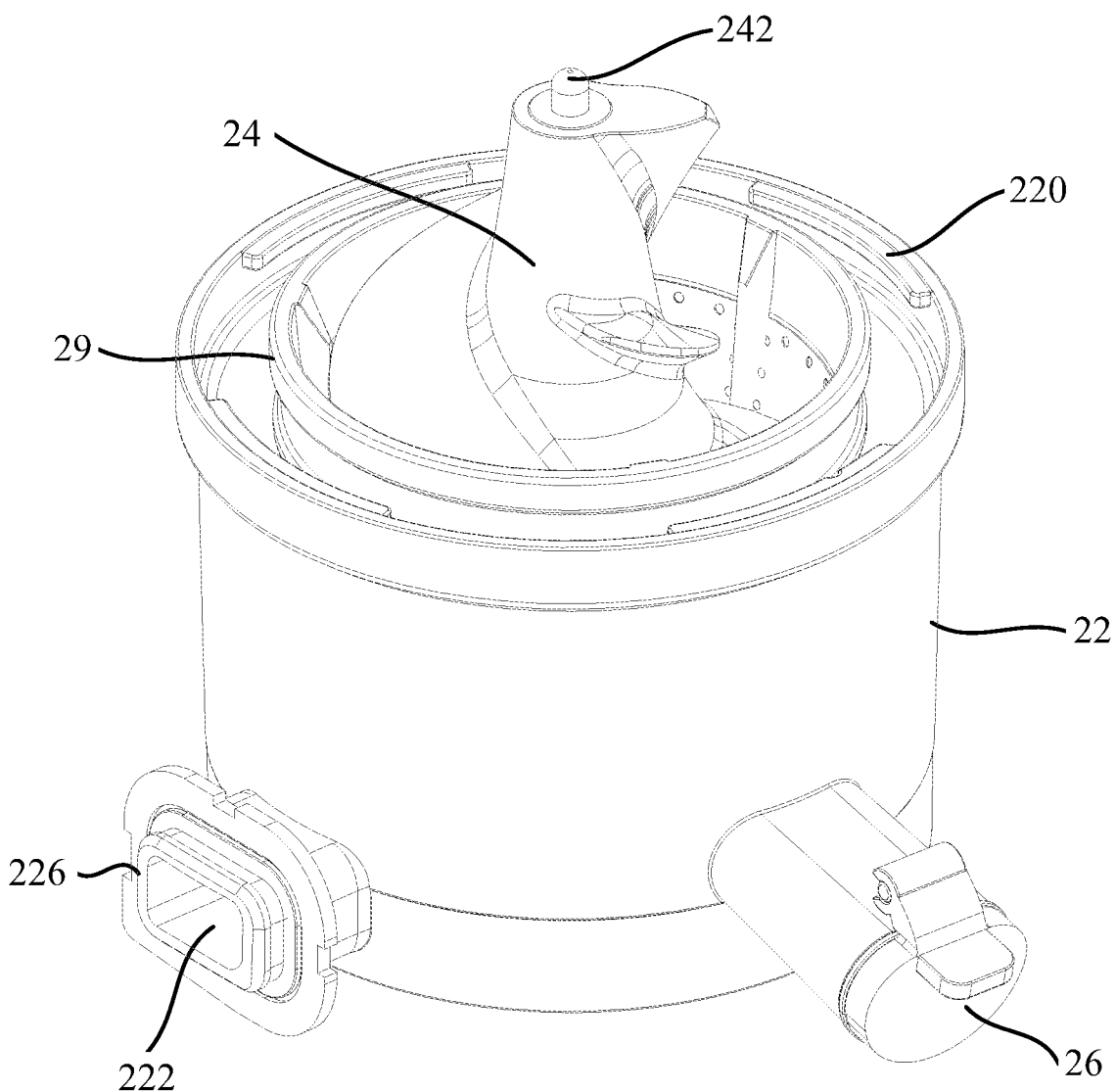
FIG. 27 is a schematic structural diagram of the food processing cup of the food processor according to an embodiment of the present disclosure.
Figure 28:
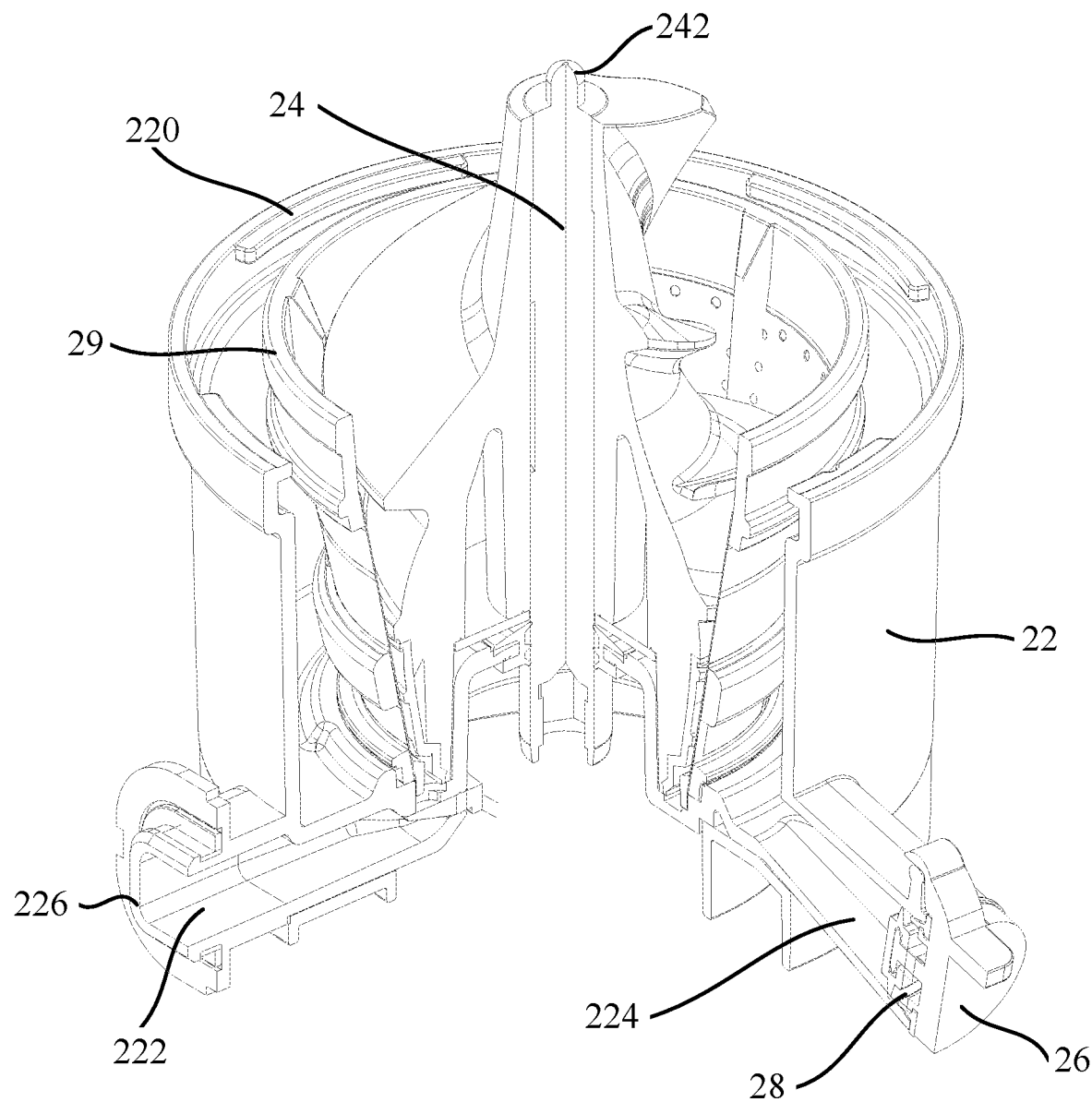
FIG. 28 is another schematic structural diagram of the food processing cup of the food processor according to an embodiment of the present disclosure.

In these above-mentioned embodiments, as shown in FIG. 17, a second mounting hole 3824 may be provided on the storage table 382, so that the working screw 24 and the dial can be connected to each other through the second mounting hole 3824, and the first transmission structure 244 may be one transmission hole or a second drive shaft, that is, either one transmission hole or a second drive shaft can be provided on the dial, and the working screw 24 can be provided with a second drive shaft or one transmission hole, so that the cooperation of the transmission hole and the second drive shaft can realize the direct driving of the second dial 384 by the working screw 24, so that the second dial 384 can be driven to rotate above the storage table 382 in the feeding barrel 32, cutting, squeezing or pushing of food materials can be realized, so automatic feeding can be achieved.

In any of the above-mentioned embodiments, as shown in FIGS. 15-18, a first mounting groove 3826 is provided on a side of the storage table 382 near the working screw 24 and around the second mounting hole 3824, and the food processor further includes: a second wear part mounted in the first mounting groove 3826 and sleeved on the second drive shaft, and located between a contact surface of the working screw 24 and the storage table 382.

In these above-mentioned embodiments, one circle of the first mounting groove 3826 can be set around the second mounting hole 3824 on the lower surface of the storage table 382, so that the positioning and installation of the second wear part can be achieved through the first mounting groove 3826, and the second wear part is arranged between the storage table 382 and the upper end surface of the working screw 24, which can reduce the mutual wear between the working screw 24 and the storage table 382, improving the service life of the working screw 24 and the storage table 382.

In any of the above-mentioned embodiments, as shown in FIGS. 15-18, the transmission hole is a polygonal hole, and the second drive shaft is a polygonal shaft adapted to the polygonal hole; and/or the first transmission structure 244 is the second drive shaft, and the second transmission structure 3842 is the transmission hole.

In these above-mentioned embodiments, the transmission hole is a polygonal hole, and the second drive shaft is a polygonal shaft adapted to the polygonal hole, in this way, the driving between the working screw 24 and the second dial 384 can be achieved through a non-circular surface, enabling increasing the contact area between the transmission hole and the second drive shaft to increase the driving force, improving the transmission efficiency and ensuring the reliability of the transmission. And a second drive shaft is provided on the working screw 24, and one transmission hole is correspondingly provided on the second dial 384, so that the working screw 24 can better cooperate with the second dial 384.

In any of the above-mentioned embodiments, as shown in FIGS. 19-27, the auxiliary feeding device comprises a third auxiliary feeding device 39, and the third auxiliary feeding device 39 comprises: a storage base 392 mounted in the feeding barrel 32 and located at a side of the working screw 24 away from the bottom of the cup body 22, the storage base 392 is provided with a storage cavity 3922, and the storage cavity 3922 has an opening at the end away from the working screw 24, and the storage base 392 is provided with at least one of the feeding hole 3920, and the feeding hole 3920 is in communication with the storage cavity 3922 and the cup body 22; and a third dial 394 can be rotatably mounted in the storage cavity 3922, and rotated at an angle greater than or equal to 30°, and the storage base 392 is used to store food materials, the third dial 394 is used to cut and/or squeeze food materials in the storage cavity 3922, and push food materials stored in the storage cavity 3922 into the feeding hole 3920.

In these above-mentioned embodiments, the third auxiliary feeding device 39 includes a storage base 392 located above the working screw 24, and a third dial 394 rotatably installed in the storage base 392. The storage base 392 is also provided with a feeding hole 3920, so in actual use, food materials can be directly placed into the storage base 392 to actually use the storage base 392 to realize the storage of food materials, and the third dial can be rotatably installed in the storage base 392, and the storage base 392 is also provided with a feeding hole 3920 communicating with the storage cavity 3922, so that the rotation of the third dial 394 can push the food materials stored on the storage base 392 to rotate, and during the rotation of food materials, preliminary cutting and/or extrusion processing of the food materials is achieved by friction and squeezing between food materials and food materials, or by friction and squeezing between food materials and the side wall of the feeding barrel 32, or by friction and squeezing between food materials and the third dial 394, so that the smaller food materials after preliminary cutting and/or extrusion processing can fall from the feeding hole 3920 to the lower part of the storage base 392 under the action of the third dial 394, and the larger food materials will be stuck at the feeding hole 3920, at this time, the third dial 394 does not stop rotating, that is, the third dial 394 will continue to rotate, so that the third dial 394 can form a pinching force on the food materials between the side wall of the feeding hole 3920, and then it can apply a squeezing or cutting force to food materials stuck in the feeding hole 3920, which can squeeze or cut food materials into smaller pieces, through continuous rotation of the third dial 394, after squeezing or cutting food materials into a size block in turn, food materials pass through the feeding hole 3920 and enter the cup body 22 in turn, and the food materials entering the cup body 22 can be crushed or cut under the dual action of the working screw 24 and the side wall of the cup body 22, then the separation of the juice from slag of food materials can be achieved through the filter 29 or the double cup body 22 double screw. In the third auxiliary feeding device 39, when the juice is actually squeezed, the user can put all the food materials into the storage base 392 at one time and store them in the storage base 392, after that, the food materials can be automatically and gradually fed under the action of the third dial 394, so that the user does not need to gradually feed in the actual juice extraction, so one-time feeding can be achieved, and in the actual process, all the food materials can be put into the storage base 392 first, then control the product through the reservation assembly and so on to make it temporarily inoperative, but can start to work after a fixed period of time, so that the advance reservation processing of food materials can be realized, which can reduce the user's waiting time and improve the user experience, that is, this structure provides the possibility for the product to realize the reserved juice extraction, so that a reservation assembly can be set on the food processor to realize the reservation function. At the same time, this kind of setting can realize automatic feeding under the action of the third dial 394 after one-time feeding, so there is no need to use a push rod or the like to implement manual push, so that the user's operation amount can be reduced, make the juice extraction function of the product more convenient and simple, so that it can improve the user experience, and eliminate the structure of the push rod, to avoid a series of problems with the use of the push rod, such as the placement of the push rod and the use of potential safety hazards of the rod. In addition, this kind of setting can cut or squeeze the food materials in advance through the third dial 394 when the food materials fall into the cup body 22 through the feeding hole 3920, so that the food materials entering the cup body 22 are small, so the difficulty of the working screw 24 can be reduced, the wear of the working screw 24 can be reduced, the processing effect of food materials can be improved, and the juice extraction rate can be improved. In addition, this setting can also effectively prevent the working screw 24 from being stuck and prevent the slag outlet from being blocked. In addition, the storage cavity 3922 is set in the storage base 392, so that the third auxiliary feeding device 39 itself has the function of containing food materials, therefore, when the food materials are put in, the third auxiliary feeding device 39 can be moved to the position of the food materials, and it is not necessary to move the food materials to the product for feeding, thus making the operation of placing food materials more convenient and faster. In addition, in this kind of setting when the food materials are cut and/or squeezed, the side walls of the storage cavity 3922 can be directly used to block and squeeze the food materials, so there is no need to rely on the side walls of the feeding barrel 32, so the part of the storage base 392 corresponding to the side wall of the feeding barrel 32 will not directly contact to the food materials, so the processing requirements of the side wall of the feeding barrel 32 can be reduced to reduce product costs, and to ensure that the feeding barrel 32 is clean, reduce the difficulty of cleaning the feeding barrel 32. There is also a setting of the storage cavity 3922 in the storage base 392, compared with the scheme of setting the storage base 392 as a stock plate; it can also prevent food materials from getting stuck between the stock plate and the side wall of the feeding barrel 32, thus, the waste of food materials can be prevented.

In one embodiment, the angle that the third dial 394 can rotate is greater than or equal to 30°, so that the third dial 394 has a more reasonable rotation angle, so that the food materials on the storage base 392 can be fully crushed and pushed into the feeding hole 3920, in order to improve the smoothness of the feeding of the product, the rotation angle of the third dial 394 can be prevented from being too small, which may cause the feeding failure.

In any of the above-mentioned embodiments, as shown in FIGS. 19-27, the storage base 392 is further provided with a third mounting hole 39242, and the third auxiliary feeding device 39 further comprises: a third drive shaft 396, one end of the third drive shaft 396 is located in the storage cavity 3922, and drivingly connected to the third dial 394, and the other end of the third drive shaft 396 protrudes from the third mounting hole 39242, and drivingly connected to the working screw 24.

In these above-mentioned embodiments, a third dial such as a rotatable paddle, a dial lever, and the like can be provided in the storage cavity 3922 and drivingly connected to the working screw 24 through the third drive shaft 396, so that when the working screw 24 rotates, the third dial 394 is driven to rotate by the third drive shaft 396, to achieve cutting and/or extrusion of food materials. After cutting and/or squeezing, the food materials can further enter the cup body 22 from the feeding hole 3920 under the action of the third dial 394. Of course, the third dial 394 can drivingly connected to the working screw 24 in other ways, or the third dial 394 may not be connected to the working screw 24, but additionally be provided with a driving structure for driving its rotation.

In any of the above-mentioned embodiments, a receiving groove 3926 is provided on the outer bottom wall of the storage base 392, one end of the working screw 24 can be extended into the receiving groove 3926, and a mounting protrusion 3924 is provided on the inner bottom wall of the storage base 392, the third mounting hole 39242 runs through the mounting protrusion 3924 and the receiving groove 3926, and one end of the third drive shaft 396 is located in the receiving groove 3926 for drivingly connected to the working screw 24, the other end of the third drive shaft 396 extends into the storage cavity 3922 through the third mounting hole 39242 and drivingly connected to the third dial 394.

In these above-mentioned embodiments, a mounting protrusion 3924 is provided on the inner bottom wall surface of the storage base 392, on the one hand, the third dial 394 can be installed higher by using the mounting protrusion 3924, and in addition, this arrangement can also increase the area of the inner wall of the storage base 392, so that the third dial 394 can cooperate with a larger area of the inner wall to achieve cutting and/or extrusion processing of food materials, increase the squeezing force of the third auxiliary feeding device 39 on the food materials at work, and further improve the processing effect of food materials. At the same time, after setting the mounting protrusion 3924, the receiving groove 3926 can be set corresponding to the mounting protrusion 3924, so that the thickness of the bottom wall of the storage base 392 will not be increased, and the strength of the bottom wall of the storage base 392 can be ensured. The receiving groove 3926 is provided on the outer bottom wall surface of the storage base 392, so that the storage base 392 is covered on one end of the working screw 24, so that the working screw 24 can also cooperate with the side wall of the receiving groove 3926 to achieve further cutting and/or extrusion processing of food materials, therefore, the processing effect of food materials can be further improved.

In any of the above-mentioned embodiments, as shown in FIGS. 19-27, the feeding hole 3920 extends from an edge of one end surface of the mounting protrusion 3924 away from the storage cavity 3922 to the bottom of the storage base 392.

In these above-mentioned embodiments, the feeding hole 3920 extends from the edge of one end surface of the mounting protrusion 3924 away from the storage cavity 3922 to the bottom of the storage base 392, so that the feeding hole 3920 is opened larger, so the feeding smoothness can be improved.

In one embodiment, the number of the feeding holes 3920 is one or more, and when the number of the feeding holes 3920 is plural, the plurality of the feeding holes 3920 are symmetrically disposed.

In any of the above-mentioned embodiments, as shown in FIGS. 19-27, the side wall surface of the mounting protrusion 3924 is inclined outward from one end of the mounting protrusion 3924 away from the bottom wall of the storage base 392 to one end of the mounting protrusion 3924 near the bottom wall of the storage base 392; and/or a shape of the receiving groove 3926 is adapted to a shape of one end of the working screw 24 protruding into the receiving groove 3926.

In these above-mentioned embodiments, the outer wall of the mounting protrusion 3924 is inclined outward from the opening of the storage cavity 3922 to the bottom wall of the storage cavity 3922, so that after cutting and/or squeezing the food materials, the food materials can flow down along the outer side wall of the mounting protrusion 3924, so that food materials can also accelerate downward movement under the action of gravity, so that food materials can be smoothly fed through the feeding hole 3920. In addition, this setting also enables the receiving groove 3926 to better cooperate with the upper end of the working screw 24, and also makes the structure of the third auxiliary feeding device 39 more reasonable.

In any of the above-mentioned embodiments, as shown in FIGS. 19-27, the bottom wall of the storage base 392 is recessed into the storage cavity 3922 to form the receiving groove 3926 and the mounting protrusion 3924.

In these above-mentioned embodiments, the bottom wall of the storage base 392 can be recessed into the storage base 392 to form a mounting protrusion 3924 on the inner bottom wall surface and a receiving groove 3926 on the outer bottom wall surface, this structure can quickly and simply process the mounting protrusion 3924 and the receiving groove 3926 on the bottom wall of the storage base 392, so that it can reduce the processing difficulty and reduce the processing costs.

In any of the above-mentioned embodiments, the third dial 394 includes a fixed seat 3942 located on the mounting protrusion 3924, and mounted to the third drive shaft 396; and a dialing structure 3944, one end of the dialing structure 3944 is connected to the fixed seat 3942, and the other end of the dialing structure 3944 extends to the bottom wall of the storage cavity 3922; and the dialing structure 3944 is a dial sheet, a dial lever or a dial stick.

In these above-mentioned embodiments, the third dial 394 includes a base and a dialing structure 3944, and the base is used to connect with the third drive shaft 396 and implement the installation of the dialing structure 3944, and the dialing structure 3944 is used for cutting and/or squeezing food materials and dialing food materials. When the mounting protrusion 3924 is provided in the storage cavity 3922, the third dial 394 can be installed on the top of the mounting protrusion 3924, so that one end of the third dial 394 can be installed higher, and the other end of the third dial 394 can be drooped to the bottom of the storage cavity 3922, so that the third dial 394 can cut and/or squeeze food materials of different heights in the storage cavity 3922, which can improve the processing effect of food materials and increase the juice extraction rate. Conversely, if the storage cavity 3922 is not provided with the mounting protrusion 3924 on the bottom wall, the third dial 394 can only be installed on the bottom wall of the storage cavity 3922, so that the height at which the third dial 394 can process food materials is limited by the height of the dialing structure 3944, so when the dialing structure 3944 is set short, it will reduce its processing effect on food materials, but if the entire dialing structure 3944 is set higher, in order to ensure the strength of the dialing structure 3944, the height of the mounting base has to be set higher at the same time, which will cause the structure of the third dial 394 to be more complicated, and also reduce the connection strength between the third drive shaft 396 and it.

In one embodiment, the dialing structure 3944 may be sheet-shaped, pole-shaped, or stick-shaped, specifically, the shape of the dialing structure 3944 may be selected according to actual conditions.

In any of the above-mentioned embodiments, as shown in FIGS. 19-27, at least one of a second drive protrusion 3964 is provided on the third drive shaft 396, and the second drive protrusion 3964 can cooperate with the working screw 24 to rotate under the driving of the working screw 24.

In these above-mentioned embodiments, one or more of second drive protrusions 3964 can be provided on the lower end surface of the third drive shaft 396, so that the second drive protrusion 3964 can be matched with the upper side of the working screw 24 to achieve the drive connection between the third drive shaft 396 and the working screw 24, of course, the third drive shaft 396 can also be drivingly connected to the working screw 24 through other structures.

In any of the above-mentioned embodiments, the third dial 394 and the third drive shaft 396 are separate structures, or the third dial 394 and the third drive shaft 396 are an integrated structure.

In these above-mentioned embodiments, the third dial 394 and the third drive shaft 396 can be separate structures, such as two parts, which facilitates separate maintenance and replacement of each part of the third dial 394 and the third drive shaft 396 separately. In some embodiments, the third dial 394 and the third drive shaft 396 can also be an integrated structure, so that the connection strength of the third dial 394 and the third drive shaft 396 can be improved, so that the third dial 394 and the third drive shaft 396 are not easily damaged, and the seamless connection between the third dial 394 and the third drive shaft 396 can be realized, so that a gap can be prevented from being formed between the third dial 394 and the third drive shaft 396, which is convenient for cleaning.

In any of the above-mentioned embodiments, one of the second positioning groove 3962 and the second positioning protrusion 246 is provided on the third drive shaft 396, the other one of the second positioning groove 3962 and the second positioning protrusion 246 is provided on the working screw 24, and the second positioning protrusion 246 can be inserted into the second positioning groove 3962 to position the working screw 24; and a third wear part 398 is provided in the second positioning groove 3962.

In these above-mentioned embodiments, a second positioning protrusion 246 or a second positioning groove 3962 may be provided on the upper end surface of the working screw 24, and a second positioning protrusion 246 or a second positioning groove 3962 may be provided correspondingly on the lower end of the third drive shaft 396, in this way, the positioning of the working screw 24 can be achieved through the second positioning protrusion 246 and the cooperation of the second positioning protrusion 246 with the positioning axis, improving the stability of the working screw 24 after installation and reducing the shaking of the working screw 24. By setting the third wear part 398 in the second positioning groove 3962, the wear between the second positioning protrusion 246 and the second positioning groove 3962 can be reduced.

In any of the above-mentioned embodiments, the third auxiliary feeding device 39 can be detachably mounted in the feeding barrel 32, or the third auxiliary feeding device 39 is located in the feeding barrel 32, and the storage base 392 of the third auxiliary feeding device 39 and the side wall of the feeding barrel 32 is an integrated structure, or the third buckle 228 is provided on the inner side wall of the feeding barrel 32, the fourth buckle 3928 is provided on the outer side wall of the storage base 392, and the storage base 392 can be snap-fitted in the feeding barrel 32 through cooperation of the third buckle 228 and the fourth buckle 3928; and/or the side wall of the storage cavity 3922 is arranged in an inclined manner from the opening of the storage cavity 3922 to the bottom of the storage cavity 3922 into the storage cavity 3922.

In these above-mentioned embodiments, the third auxiliary feeding device 39 is installed in the feeding barrel 32 and above the working screw 24, so that the third auxiliary feeding device 39 can be installed through the feeding barrel 32, and at the same time, it can be installed in the feeding barrel 32, the feeding barrel 32 can also be used to prevent food materials in the third auxiliary feeding device 39 from splashing out, preventing waste of food materials. In addition, the storage base 392 and the feeding barrel 32 of the third auxiliary feeding device 39 can be set as an integrated structure, and the storage base 392 of the third auxiliary feeding device 39 can be detachably installed in the feeding barrel 32. When the feeding barrel 32 and the cup body 22 are combined to be a large cup, the third auxiliary feeding device 39 can be detachably installed in the feeding barrel 32.

Further, the fourth buckle 3928 may be provided on the outer side wall of the storage base 392, and the third buckle 228 may be provided on the inner side wall of the feeding barrel 32, so that through cooperation between the third buckle 228 and the fourth buckle 3928, the third auxiliary feeding device 39 is snap-fitted in the feeding barrel 32. This setting enables the third auxiliary feeding device 39 to be detached from the feeding barrel 32 at will, facilitating cleaning and maintenance of the third auxiliary feeding device 39.

In any of the above-mentioned embodiments, as shown in FIGS. 27-30, the food processing cup further comprises: a filter 29 set between the cup body 22 and the working screw 24, and a positioning step surface 328 is provided on an inner side wall of the feeding barrel 32 corresponding to one end of the filter 29 near the feeding barrel 32, and the positioning step surface 328 is used to cooperate with the filter 29 to position the filter.

In these above-mentioned embodiments, when the food processor is a single cup body 22 and a single working screw 24, one filter 29 can be set between the cup body 22 and the working screw 24 so that the filter 29 can be used to realize the separation of slag and juice of food materials after the food materials are crushed. In addition, one positioning step surface 328 on the inner wall of the feeding barrel 32 corresponding to the upper end of the filter, so that press the filter 29 using the positioning step surface 328 to achieve the axial positioning and installation of the filter 29, this can improve the installation reliability of the filter 29.

In any of the above-mentioned embodiments, as shown in FIGS. 1, 2, 31, 33, 37, and 38, the food processor further comprises: a pressure relief hole 62 provided on any one or more of the cup body 22, the feeding assembly 3, and the slag receiving device 4, which can communicate with the sealed cavity; and a pressure relief plug 64, which can be mounted at the pressure relief hole 62 to open or seal the pressure relief hole 62.

In these above-mentioned embodiments, a pressure relief hole 62 communicating with the sealed cavity can be provided on any one or more of the cup body 22, the feeding assembly 3, and the slag receiving device 4, and the pressure relief plug 64 can be used to open or seal the pressure relief hole 62. In this setting, the pressure relief plug 64 can be closed before the product is started to seal the pressure relief hole 62, so that the inside of the cup body 22, the feeding assembly 3 and the slag receiving device 4 can be completely sealed, so that the extraction assembly 5 removes the air to form a vacuum, and food materials can be processed in a vacuum or near vacuum state, preventing oxidation of food materials. After the food materials are processed, the pressure relief hole 62 can be opened through the pressure relief plug 64 to make the product communicate with the outside, and then the negative pressure in the cup body 22, the feeding assembly 3, and the slag receiving device 4 can be gradually unloaded, pressure relief can be easily and quickly achieved. Of course, in other embodiments, the pressure can also be relieved in other ways, such as delivering air inward through the extraction assembly 5 to achieve pressure relief.

Figure 32:
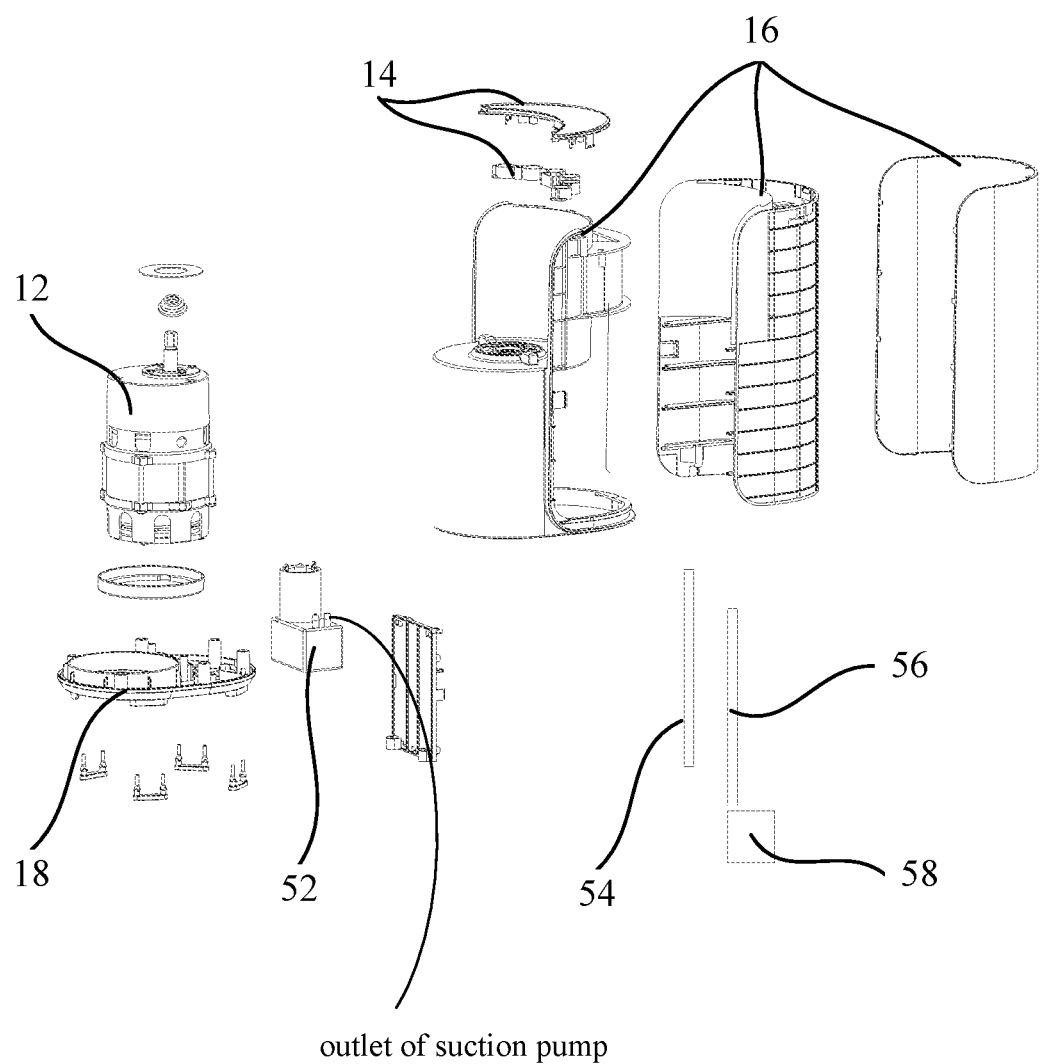
FIG. 32 is an exploded schematic structural diagram of the base assembly of the food processor according to an embodiment of the present disclosure.

In any of the above-mentioned embodiments, as shown in FIG. 32, the extraction assembly 5 comprises: a suction pump 52; and an extraction channel 54, one end of the extraction channel 54 is connected to the suction pump 52, and the other end of the extraction channel 54 communicates with the sealed cavity.

In these above-mentioned embodiments, one suction pump 52 can be used to extract air, and the extraction channel 54 is used to expel air.

In any of the above-mentioned embodiments, as shown in FIG. 32, the extraction assembly 5 further comprises: an exhaust channel 56 connected to the outlet of the suction pump 52 for expelling air; and a noise reduction device 58 provided on the exhaust channel 56.

In these above-mentioned embodiments, by setting an exhaust channel 56 to perform expelling air, and the exhaust channel 56 can be an exhaust pipe. The noise reduction device 58 can reduce the noise of the extraction assembly 5 and improve the user experience.

In any of the above-mentioned embodiments, as shown in FIG. 32, the suction pump 52 is provided on any one of the base assembly 1, the cup body 22, and the feeding assembly 3, or the suction pump 52 is independently disposed with respect to the base assembly 1, the cup body 22, and the feeding assembly 3.

In these above-mentioned embodiments, the suction pump 52 can be set at any position, specifically, such as on the base assembly 1, the cup body 22, or the feeding assembly 3, of course, the suction pump 52 can also be independently disposed with respect to the base assembly 1, the cup body 22 and the feeding assembly 3, that is, the suction pump 52 can also be peripheral to the base assembly 1, the cup body 22, and the feeding assembly 3.

In any of the above-mentioned embodiments, the extraction channel 54 is a suction pipe.

In these above-mentioned embodiments, the extraction channel 54 is a suction pipe, of course, the extraction channel 54 may also be another channel structure provided on the housing of the food processor.

In any of the above-mentioned embodiments, as shown in FIG. 32, the suction pump 52 is an electric pump or a manual pump or a foot pump.

In these above-mentioned embodiments, the suction pump 52 is an electric pump, which can be used to drive the suction pump 52 with electricity, so that manual suction is not required, of course, the suction pump 52 can also be a manual pump or a foot pump.

In any of the above-mentioned embodiments, the suction pump 52 is a vacuum pump.

In these above-mentioned embodiments, the suction pump 52 is a vacuum pump, because the vacuum pumps are more common, they are easy to purchase, in addition, the vacuum pump has a strong ability to vacuum, so it can extract a large amount of air inside the food processor to ensure that vacuum effect in the cup body 22 when processing food materials.

Figure 30:
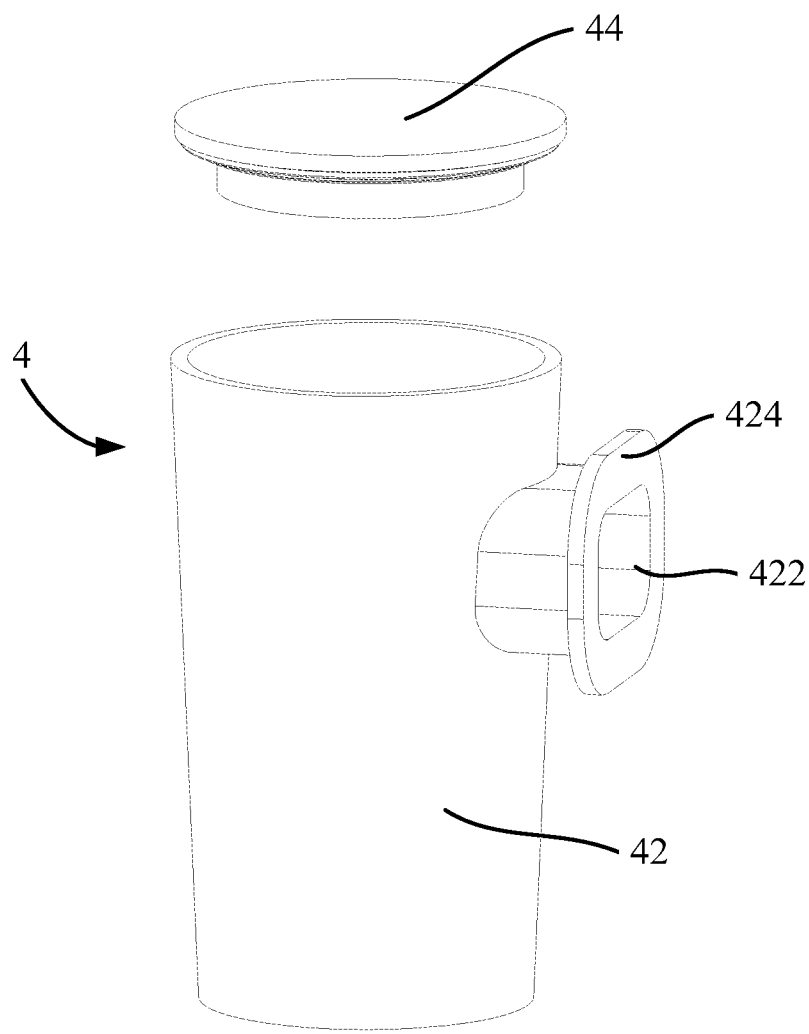
FIG. 30 is a schematic structural diagram of the slag receiving device of the food processor according to an embodiment of the present disclosure.
Figure 31:
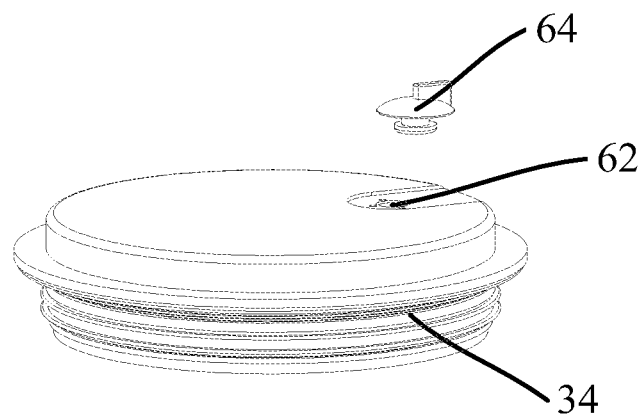
FIG. 31 is a schematic structural diagram of the feeding barrel cover and a pressure relief device of the food processor according to an embodiment of the present disclosure.

In any of the above-mentioned embodiments, as shown in FIG. 30, a first slag outlet 222 is provided on the cup body 22, and the slag receiving device 4 is hermetically connected to the first slag outlet 222, the slag receiving device 4 includes: a slag receiving cup 42, which can be detachably sealed and mounted at the first slag outlet 222, and the side wall of the slag receiving cup 42 is provided with a slag inlet 422, and the slag inlet 422 and the first slag outlet 222 conduct to each other; a slag receiving cover 44, the sealing cover 366 is mounted on the open end of the slag receiving cup 42; and a second seal provided at the connection between the slag receiving cover 44 and the slag receiving cup 42, for hermetically connecting the slag receiving cover 44 and the slag receiving cup 42; and a mounting post 226 is provided on one of the slag receiving cup 42 and the cup body 22, and a mounting sleeve 424 is provided on the other one of the slag receiving cup 42 and the cup body 22, the slag receiving cup 42 can be detachably sealed and mounted at the first slag outlet 222 through the cooperation of the mounting post 226 and the mounting sleeve 424.

In these above-mentioned embodiments, a first slag outlet 222 is provided on the cup body 22, and when the slag receiving device 4 is installed outside the cup body 22, the slag receiving device 4 is set as structure include the slag receiving cup 42 and the slag receiving cover 44, so that the slag receiving cup 42 can perform the slag receiving process, and the slag receiving cup 42 can be opened and closed by the slag receiving cover 44. The slag receiving cup 42 can be detachably connected to the cup body 22, which is convenient for removing the slag receiving cup 42 from the cup body 22 for slag pouring or cleaning. At the same time, a mounting sleeve 424 can be set on one of the slag receiving cup 42 and the cup body 22, and a mounting post 226 can be set on the other, so that, the detachable installation between the slag receiving cup 42 and the cup body 22 can be achieved through the sleeved installation of the mounting sleeve 424 and the mounting post 226. At the same time, a second seal may be provided between the mounting sleeve 424 and the mounting post 226, so that the mounting sleeve 424 and the mounting post 226 can be hermetically connected.

Of course, the slag receiving device 4 may also be other types of structures, such as a slag receiving bag, or other cavity structures.

In any of the above-mentioned embodiments, the food processor further includes: a slag discharge pressure adjusting assembly provided at the first slag outlet 222 for adjusting the slag discharge pressure at the first slag outlet 222.

In these above-mentioned embodiments, a slag discharge pressure adjusting assembly can be set at the first slag outlet 222, so that the slag outlet pressure at the first slag outlet 222 can be adjusted by the slag discharge pressure adjusting assembly so that the slag outlet pressure can be controlled reasonably, therefore, the food slag can be further squeezed before being discharged, so that the juice is separated from slag more completely. Specifically, the slag discharge pressure adjusting assembly may have only one gear pressure, that is, the slag discharge pressure is a fixed value, and after the product is assembled the user cannot change the slag discharge pressure. Of course, the slag discharge pressure adjusting assembly can also have multiple gear pressures, that is, the slag discharge pressure includes multiple gear values, in the actual process, the user can operate the slag discharge pressure adjusting assembly to make the product have multiple slag discharge pressures, so that when processing different food materials, the slag pressure can be adjusted freely according to the type of food materials and the needs of the user, so that on the one hand it can better meet the various needs of users, and on the other hand it can adjust the slag pressure based on the type of food materials reasonably to prevent some soft food materials, such as grapes, from being crushed too much, resulting in loss of nutrients and poor taste, and prevent some crude fiber food materials, such as sugar cane, ginger, and carrots are insufficiently squeezed, resulting in a low juice extraction rate, this can ensure the nutrition and taste of the food materials and increase the juice extraction rate of the product. In one embodiment, the slag pressure can be adjusted by a damping silicone. The specific structure of the slag discharge pressure adjusting assembly may be a structure for adjusting the slag discharge pressure on the existing juice machine, juicer and the like.

In any of the above-mentioned embodiments, one end of the feeding assembly 3 can be detachably snap-fitted into the open end of the cup body 22.

In these above-mentioned embodiments, a first buckle 320 can be set on the feeding assembly 3, such as the lower end of the feeding barrel 32, and a second buckle 220 capable of cooperating with the first buckle 320 is provided on the inner side wall of the upper end of the cup body 22, so that one end of the feeding assembly 3 can be hermetically installed in the open end of the cup body 22 through the snap-fitting of the first buckle 320 and the second buckle 220.

In any of the above-mentioned embodiments, the cup body 22 includes a crushing cup and a squeezing cup, the feeding assembly 3 is hermetically covered on the mouth end of the crushing cup, and the other end of the crushing cup is provided with a communication port, the squeezing cup communicates with the crushing cup through the communication port, the working screw 24 includes a crushing screw mounted in the crushing cup and a squeezing screw mounted in the squeezing cup, and the first slag outlet 222 is provided on the cup body 22, and when the slag receiving device 4 is hermetically connected to the first slag outlet 222, the first slag outlet 222 is provided on the squeezing cup, and the slag receiving device 4 communicates with the squeezing cup through the first slag outlet 222, the base assembly 1 is provided with a first driving shaft and a second driving shaft, and the first driving shaft is drivingly connected to the crushing screw for driving the crushing screw to crush food, and the second driving shaft drivingly connected to the squeezing screw for driving the squeezing screw to squeeze food materials to separate the juice from the slag of the food materials.

In these above-mentioned embodiments, after the food materials entered into the crushing cup, the crushing screw is driven by the first driving shaft to cooperate with the side wall of the crushing cup to crush the food, the crushed food materials enter the squeezing cup under the action of crushing screw, and the squeezing screw squeezes the food materials under the driving of the second driving shaft to separate the juice from slag of the food materials. This embodiment separates the crushing process and juice squeezing and discharging process of food materials, in the crushing process, since the juice squeezing and discharging process is not required, there is no need to set the filter 29 and rotating brush and other parts the crushing cup, so that the food materials in the crushing cup can be crushed under the combined effect of the crushing cup and the crushing screw, at the same time, the squeezing screw can be set approximately horizontally during the juice squeezing and discharging process, and the juice squeezing and discharging system can be set as horizontal, so it is very easy to separate the juice from slag of food materials, this kind of setting can ensure the juice extraction rate of the food processor on the one hand, and can avoid using the filter 29, rotating brush and other parts, which makes the structure of the food processor simple and easy to install, and because the filter 29 is eliminated, it can reduce the cleaning difficulty for the user, improving the user experience.

In any of the above-mentioned embodiments, the angle between the axis of the squeezing cup and the axis of the crushing cup is greater than or equal to 75° and less than or equal to 180°, or the angle between the axis of the squeezing cup and the axis of the crushing cup is greater than or equal to 90° and less than or equal to 135°.

In this embodiment, an angle can be set between the squeezing cup and the crushing cup, as long as food materials can enter the crushing cup from the squeezing cup, and, the angle between the axis of the squeezing cup and the axis of the crushing cup is greater than or equal to 75° and less than or equal to 180°, the squeezing cup is set horizontally or obliquely downward, therefore when the food materials enter the squeezing cup or flow to the first slag outlet 222 in the squeezing cup, at least the gravity of the food materials need not to be overcome, which makes the flow of the food materials smoother, and the angle between the axis of the squeezing cup and the axis of the crushing cup is greater than 90° and less than or equal to 135°, in this kind of setting, in addition to relying on the squeeze force of the squeeze screw to flow out, the food materials can also rely on the gravity of the food materials to flow out, therefore, on the one hand, it can speed up the flow rate of food materials to increase the speed of juice, on the other hand, it can fully squeeze the food materials to improve the juice extraction rate, at the same time, this setting combines vertical and horizontal machines, so that the product can have both the advantages of good crushing effect of the vertical machine and the advantages of sufficient extrusion of the horizontal machine, which can then make the food materials fully crushed and can be fully squeezed, which can improve juice extraction rate.

Further, an angle between the axis of the squeezing cup and the axis of the crushing cup is 90°.

In one embodiment, an angle between the axis of the squeezing screw and the axis of the crushing screw is greater than or equal to 75° and less than or equal to 180°, or an angle between the axis of the squeezing screw and the axis of the crushing screw is greater than or equal to 90° and less than or equal to 135°. This setting enables the squeezing cup to be set horizontally or obliquely downward, so that the food materials enter the squeezing cup or flow to the first slag outlet 222 in the squeezing cup, at least the gravity of the food materials need not to be overcome, which makes the flow of the food materials smoother.

Further, an angle between the axis of the squeezing screw and the axis of the crushing screw is 90°.

In one embodiment, as shown in FIG. 32, the base assembly 1 further includes a base 18 and a housing assembly 16, and the housing assembly 16 is installed on the base 18.

Figure 34:
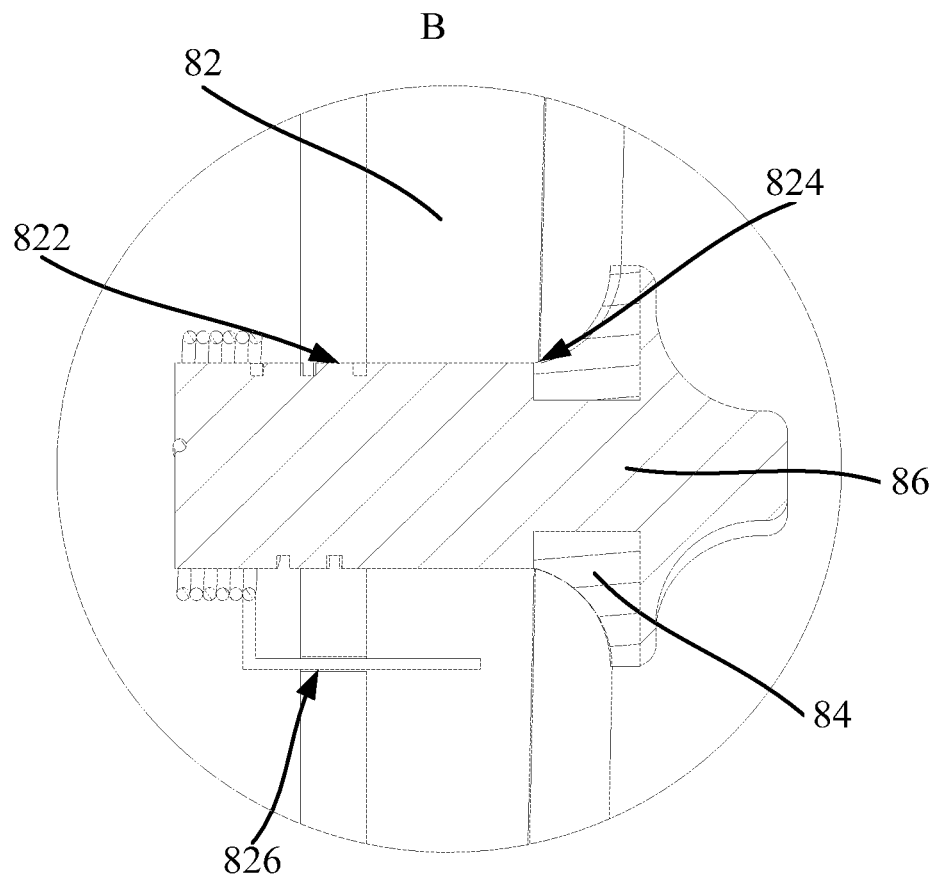
FIG. 34 is a partially enlarged schematic structural diagram of B of the food processor in FIG. 33.
Figure 35:
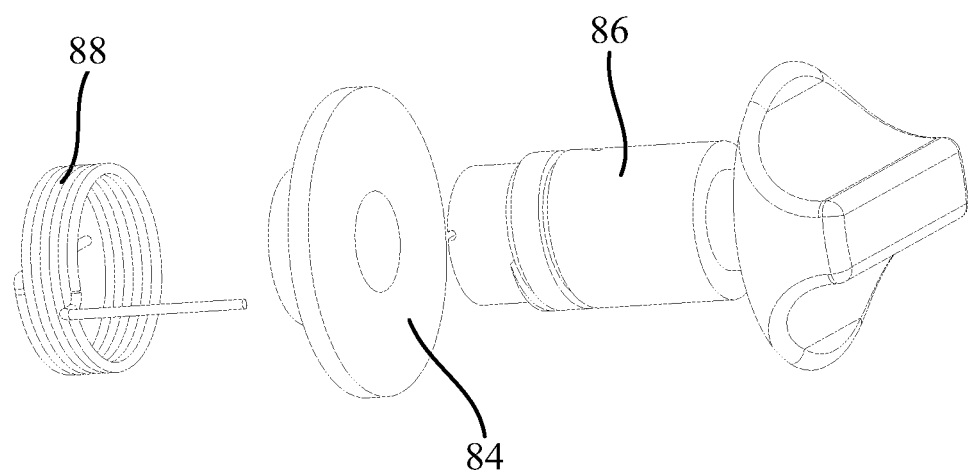
FIG. 35 is an exploded schematic structural diagram of a partial structure of the food processor in FIG. 33.
Figure 36:
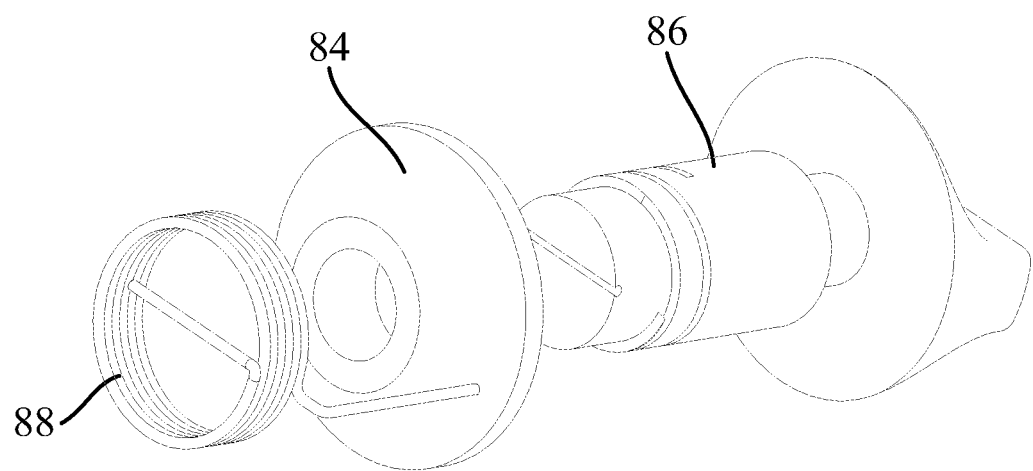
FIG. 36 is further another exploded schematic structural diagram of the partial structure of the food processor in FIG. 33.

In any of the above-mentioned embodiments, as shown in FIGS. 33 and 34, the cup body 22 is provided with a first slag outlet 222, and the slag receiving device 4 is hermetically connected to the first slag outlet 222, the food processor further includes: a first pressure relief channel, one end of the first pressure relief channel communicates with the cup body 22, and the other end of the first pressure relief channel communicates with the outside; a second pressure relief channel, one end of the second pressure relief channel communicates with the slag receiving device 4, and the other end of the second pressure relief channel communicates with the outside; and a fifth seal 84 mounted on one end of the first pressure relief channel communicating with the outside and one end of the second pressure relief channel communicating with the outside, for opening or closing the first pressure relief channel and the second pressure relief channel.

In these above-mentioned embodiments, when the slag receiving device is set outside the cup body 22, a first pressure relief channel communicating with the cup body 22 is set, the pressure can be released from the cup body 22 through the first pressure relief channel after the vacuum extraction is completed, and a second pressure relief channel communicating with the slag receiving device 4 is set, the pressure can be released from the slag receiving device 4 through the second pressure relief channel after the vacuum extraction is completed, the fifth seal 84 is hermetically connected to the end where the first pressure relief channel and the second pressure relief channel communicate with the outside, in this way, whether the first pressure relief channel and the second pressure relief channel are communicate with the outside can be controlled by turning on or off the fifth seal 84, when the juice is vacuumed, the first pressure relief channel and the second pressure relief channel can be closed to ensure that the cup body 22 can be sealed, after the juice is finished, the fifth seal 84 can be opened to make the first pressure relief channel and the second pressure relief channel are opened, so that the pressure of the cup body 22 and the slag receiving device 4 can be relieved simultaneously, in this kind of setting, since the cup body 22 and the slag receiving device 4 are provided with corresponding pressure relief channels, the cup body 22 and the slag receiving device 4, the slag receiving device 4 can be relieved when the pressure is released, respectively, in this way, regardless of whether the first slag outlet 222 of the cup body 22 is blocked by food slag, the slag receiving device 4 can release pressure in time, so that the slag receiving device 4 can be easily and conveniently disassembled for slag pouring or cleaning after the juice extraction is completed, which can solve a series of problems caused by the slag receiving device 4's failure to release pressure in time due to the clogging of food slag, which can improve the overall performance of the product and improve user experience.

In any of the above-mentioned embodiments, as shown in FIGS. 33 and 34, one end of the first pressure relief channel communicating with the outside and one end of the second pressure relief channel communicating with the outside are merged into the same channel; a connection channel 82 is provided in a side wall of the cup body 22, and one end of the connection channel 82 extends to the first slag outlet 222 and communicates with the first slag outlet 222, the inner side wall of the connection channel 82 is provided with a second through hole 822 communicating with the cup body 22, a third through hole 824 is provided on the outer side wall of the connection channel 82, and the fifth seal 84 can be opened or hermetically mounted at the third through hole 824.

In these above-mentioned embodiments, combining one end of the first pressure relief channel and the second pressure relief channel communicate with the outside, that is, the air intake end to form one channel, so that only a fifth seal 84 is needed to realize the simultaneous opening or closing of the first pressure relief channel and the second pressure relief channel at the same time, so when the cup body 22 and the slag receiving device 4 are closed for vacuuming, it is only needed to install the fifth seal 84 in place, when the pressure is released, it is only necessary to open the fifth seal 84, which can simplify the operation of the user during juice extraction and pressure relief, reduce the workload of the user when using the product, and improve the user experience.

At the same time, a connection channel 82 is provided in a side wall of the cup body 22, so that the end where the first pressure relief channel communicates with the outside and the end where the second pressure relief channel communicates with the outside can be merged into the same channel. Specifically, one end of the connection channel 82 communicates with the first slag outlet 222, so that the connection channel 82 can communicate with the slag receiving device 4, the second through hole 822 is set on the side wall of the connection channel 82, so that the connection channel 82 can communicate with the cup body 22, so that the connection channel 82 can be used as the channel shared by the first pressure relief channel and the second pressure relief channel, so that the cup body 22 and the slag receiving device 4 can simultaneously close and release pressure through the connection channel 82. The third through hole 824 on the outer wall of the connection channel 82 is an air inlet that connects the channel and communicates with the outside, by opening and closing the third through hole 824, the cup body 22 and the slag receiving device 4 can be sealed or relieve pressure at the same time.

Of course, other structures can also be used to achieve the purpose of merging one end of the first pressure relief channel communicating with the outside and one end of the second pressure relief channel communicating with the outside into the same channel, such as a shunt tube including an inlet and two outlets can be embedded in the side wall of the cup body 22, so that the pressure relief of the cup body 22 and the slag receiving device 4 can be realized through the shunt tube at the same time.

In any of the above-mentioned embodiments, as shown in FIGS. 33-36, the fifth seal 84 is a sealing plug, and the food processor further comprises: a valve stem 86, one end of the valve stem 86 is inserted and mounted in the third through hole 824, and can move along the axis of the third through hole 824, and the other end of the valve stem 86 is located outside the cup body 22, the sealing plug is sleeved on one end of the valve stem 86 located outside the cup body 22, and can be hermetically mounted at the third through hole 824 or open the third through hole 824 under the action of the valve stem 86; and a return spring 88 provided in the cup body 22 or the connection channel 82 and connected to the valve stem 86 for resetting the valve stem 86 after the valve stem 86 moves.

In these above-mentioned embodiments, the fifth seal 84 can be set as a sealing plug, such as a rubber plug and a silicone plug, so that the third through hole 824 can be opened and closed through a sealing plug, thus, the entire pressure relief channel can be opened and closed. The valve stem 86 is used to implement the installation of the sealing plug and drive the sealing plug along the axis of the third through hole 824, so that the sealing plug can be opened and closed by the movement of the valve stem 86. The return spring 88 is used to reset the valve stem 86 after the pressure relief is completed, so that the valve stem 86 and the sealing plug can be automatically reset to the initial position after the pressure relief, to achieve the sealing of the third through hole 824, in this kind of setting, after the pressure is released, the valve stem 86 can be reset automatically, so the user does not need to close the third through hole 824, which simplifies the workload of the user, and also prevents the user from forgetting to reset the valve stem 86 when the next juice is pressed, which will cause the product not to be sealed and vacuum extraction not to occur.

In any of the above-mentioned embodiments, as shown in FIGS. 33-36, one end of the valve stem 86 inserted into the third through hole 824 is inserted into the second through hole 822 and extended into the cup body 22, an internal thread is provided on the inner side wall of the second through hole 822, the side wall of the valve stem 86 cooperating with the second through hole 822 is provided with an external thread, and the valve stem 86 is mounted in the second through hole 822 through the cooperation of the external thread and the internal thread.

In these above-mentioned embodiments, the internal thread is provided in the second through hole 822, and the external thread is correspondingly provided on the side wall where the valve stem 86 is matched with the second through hole 822, so that the valve stem 86 can be installed on the cup body 22 by means of a threaded connection, so that the valve stem 86 can be rotated in and out by rotation, and the valve stem 86 can be moved back and forth along the axis of the third through hole 824, so that the sealing plug opens and closes the third through hole 824. With this structure, the valve stem 86 can be simply and conveniently mounted on the cup body 22 by means of a threaded connection, so that the sealing plug can open and close the third through hole 824 simply and conveniently, enabling the overall structure of the product relatively simple.

In any of the above-mentioned embodiments, as shown in FIGS. 33-36, one end of the valve stem 86 inserted into the third through hole 824 is inserted into the second through hole 822 and extended into the cup body 22, and a second mounting groove is provided on one end of the valve stem 86 inserted into the cup body 22, and the inner side wall of the connection channel 82 is further provided with a fourth through hole 826, the return spring 88 is the torsion spring, and the torsion spring is sleeved and mounted on one end of the valve stem 86 that extended into the cup body 22, the first torsion spring arm of the torsion spring is mounted in the second mounting groove, and the second torsion spring arm of the torsion spring is inserted and mounted in the fourth through hole 826 and can slide along the axial direction of the fourth through hole 826.

In these above-mentioned embodiments, the valve stem 86 can be extended into the third through hole 824, and continue to pass through the first through hole 3622 and extend into the cup body 22, and the return spring 88 is a torsion spring, so that after the valve stem 86 turning, the torsion spring can reset the valve stem 86 automatically. The torsion spring is sleeved on the end of the valve stem 86 that extended into the cup body 22, so that the torsion spring can be installed in the cup body 22, which can more easily install the torsion spring. The end of the valve stem 86 is provided with a second mounting slot, so that the torsion spring can be fixed through the cooperation of the second mounting slot and the first torsion spring arm, preventing the torsion spring from rotating with the valve stem 86, and the fourth through hole 826 is used to fix and guide the second torsion spring arm, so that when the valve stem 86 rotates, the torsion spring can normally twist and deform, so that the corresponding elastic potential energy can be gathered, so that after the valve stem 86 is released, the valve stem 86 can return to its original position under the action of elastic potential energy.

In any of the above-mentioned embodiments, as shown in FIGS. 33-36, a pressure plate is provided on one end of the valve stem 86 located outside the cup body 22, and the pressure plate can press the sealing plug to be mounted at the third through hole 824, and the pressure plate is provided with an operating handle.

In these above-mentioned embodiments, by setting the pressure plate at the end of the valve stem 86, the sealing plug can be pressed at the third through hole 824 through the pressure plate, so that the sealing plug can reliably seal the third through hole 824. An operating handle is provided on the pressure plate, and the valve stem 86 can be rotated directly through the operating handle when in use, facilitating the user's operation.

In any of the above-mentioned embodiments, the food processor is a juice machine or a juicer. Of course, the food processor can also be other structures besides a juice machine and a juicer, such as a fruit juice machine, a wall breaking machine, etc.

In the description of the present specification, the terms "mounting", "connected", "connection", "fixing" and the like should be understood in a broad sense. For example, "connection" may be a fixed connection, a removable connection or an integrated connection; the term "connected" may refer to being directly connected and may also refer to being indirectly connected through an intermediary.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

What is claimed is:

1. A food processor, comprising:
a base assembly;
a food processing cup can be mounted on the base assembly, and including a cup body and a working screw rotatably mounted in the cup body, the cup body can be used to store food juice, wherein a first slag outlet is provided on the cup body;
a feeding assembly sealed and mounted on a cup mouth end of the cup body;
a slag receiving device hermetically connected to the first slag outlet for collecting food waste;
a sealed cavity formed by the cup body, the feeding assembly, and the slag receiving device to communicate to each other; and
an extraction assembly can communicate with the sealed cavity and is used for extracting air in the sealed cavity;
wherein the slag receiving device comprises:

a slag receiving cup can be detachably sealed and mounted at the first slag outlet, a side wall of the slag receiving cup is provided with a slag inlet, and the slag inlet and the first slag outlet conduct to each other;
a slag receiving cover sealed and covered on an open end of the slag receiving cup; and
a second seal provided at a connection between the slag receiving cover and the slag receiving cup for hermetically connecting the slag receiving cover and the slag receiving cup;
wherein a mounting post is provided on one of the slag receiving cup and the cup body, and a mounting sleeve is provided on other one of the slag receiving cup and the cup body, the slag receiving cup can be detachably sealed and mounted at the first slag outlet through the mounting post and the mounting sleeve.

2. The food processor of claim 1, wherein the feeding assembly comprises:
a feeding barrel, one end of the feeding barrel is hermetically mounted to the cup mouth end of the cup body;
a feeding cover sealed and covered on other end of the feeding barrel and used to open or close the feeding barrel; and
an auxiliary feeding device can be mounted in the feeding barrel for auxiliary feeding.

3. The food processor of claim 2, wherein the food processing cup further comprises:
a filter set between the cup body and the working screw, wherein a positioning step surface is provided on an inner side wall of the feeding barrel corresponding to one end of the filter adjacent the feeding barrel, and the positioning step surface is used to cooperate with the filter so as to position the filter.

4. The food processor of claim 1, further comprising:
a pressure relief hole provided on one or more of the cup body, the feeding assembly, or the slag receiving device, and can be communicated with the sealed cavity; and
a pressure relief plug can be mounted at the pressure relief hole so as to open or seal the pressure relief hole.

5. The food processor of any one of claim 1, wherein the extraction assembly comprises:
a suction pump; and
an extraction channel, one end of the extraction channel is connected to the suction pump, and other end of the extraction channel communicates with the sealed cavity.

6. The food processor of claim 5, wherein the extraction assembly further comprises:
an exhaust channel connected to an outlet of the suction pump for expelling air.

7. The food processor of claim 1, further comprising:
a slag discharge pressure adjusting assembly provided at the first slag outlet for adjusting a slag discharge pressure at the first slag outlet.

8. The food processor of claim 1, wherein:
the cup body comprises a crushing cup and a squeezing cup, the feeding assembly is hermetically covered on a mouth end of the crushing cup, and the other end of the crushing cup is provided with a communication port, the squeezing cup communicates with the crushing cup through the communication port,
the working screw comprises a crushing screw mounted in the crushing cup and a squeezing screw mounted in the squeezing cup,
wherein the first slag outlet is provided on the cup body, and when the slag receiving device is hermetically connected to the first slag outlet, the first slag outlet is provided on the squeezing cup, and the slag receiving device communicates with the squeezing cup through the first slag outlet, the base assembly is provided with a first driving shaft and a second driving shaft, and the first driving shaft is drivingly connected to the crushing screw for driving the crushing screw to crush food, and the second driving shaft drivingly connected to the squeezing screw for driving the squeezing screw to squeeze food materials so as to separate the juice from slag of the food materials.

\* \* \* \* \*